(12) United States Patent
Liao et al.

(10) Patent No.: US 11,036,981 B1
(45) Date of Patent: Jun. 15, 2021

(54) DATA MONITORING SYSTEM

(71) Applicant: SAS Institute Inc., Cary, NC (US)

(72) Inventors: Yuwei Liao, Cary, NC (US); Anya Mary McGuirk, Holly Springs, NC (US); Byron Davis Biggs, Cary, NC (US); Arin Chaudhuri, Raleigh, NC (US); Allen Joseph Langlois, Apex, NC (US); Vincent L. Deters, Durham, NC (US)

(73) Assignee: SAS INSTITUTE INC., Cary, NC (US)

( * ) Notice: Subject to any disclaimer, the term of this patent is extended or adjusted under 35 U.S.C. 154(b) by 0 days.

(21) Appl. No.: 17/167,633

(22) Filed: Feb. 4, 2021

Related U.S. Application Data

(60) Provisional application No. 63/076,542, filed on Sep. 10, 2020, provisional application No. 62/983,802, (Continued)

(51) Int. Cl.
*G06K 9/00* (2006.01)
*G06N 7/00* (2006.01)
*G06F 17/16* (2006.01)

(52) U.S. Cl.
CPC ......... *G06K 9/00563* (2013.01); *G06F 17/16* (2013.01); *G06K 9/0053* (2013.01); *G06N 7/005* (2013.01)

(58) Field of Classification Search
CPC .. G06K 9/00563; G06K 9/0053; G06N 7/005; G06F 17/16
(Continued)

(56) References Cited

U.S. PATENT DOCUMENTS 2,806,082 A 9/1957 Woods
7,549,907 B2 6/2009 Bromenshenk et al.
(Continued)

FOREIGN PATENT DOCUMENTS

EP 3259985 A1 12/2017
GB 2489435 A 10/2012
(Continued)

OTHER PUBLICATIONS

Hrncir et al., Insect Sounds and Communication: Physiology, Behaviour, Ecology and Evolution, Chapter 32 Vibratory and Airborne-Sound Signals in Bee Communication (Hymenoptera) pp. 421-436, Nov. 2005.
(Continued)

*Primary Examiner* — Tan V Mai
(74) *Attorney, Agent, or Firm* — Bell & Manning, LLC

(57) ABSTRACT

A computing system determines if an event has occurred. A first window is defined that includes a subset of a plurality of observation vectors modeled as an output of an autoregressive causal system. A magnitude adjustment vector is computed from a mean computed for a matrix of magnitude values that includes a column for each window of a plurality of windows. The first window is stored in a next column of the matrix of magnitude values. Each cell of the matrix of magnitude values includes an estimated power spectrum value for a respective window and a respective frequency. A second matrix of magnitude values is updated using the magnitude adjustment vector. Each cell of the second matrix of magnitude values includes an adjusted power spectrum value for the respective window and the respective frequency. A peak is detected from the next column of the second matrix of magnitude values.

30 Claims, 60 Drawing Sheets
(23 of 60 Drawing Sheet(s) Filed in Color)

Related U.S. Application Data filed on Mar. 2, 2020, provisional application No. 62/981,604, filed on Feb. 26, 2020.

(58) Field of Classification Search
USPC .......................................................... 708/311
See application file for complete search history.

(56) References Cited

U.S. PATENT DOCUMENTS

| | | | |
|---|---|---|---|
| 10,684,618 B1 | 6/2020 | McGuirk et al. | |
| 2019/0339687 A1* | 11/2019 | Cella .................... | G06N 3/0472 |

FOREIGN PATENT DOCUMENTS

| | | |
|---|---|---|
| WO | WO2015/060375 A1 | 4/2015 |
| WO | WO2015/185899 | 12/2015 |
| WO | WO2020/014081 A1 | 1/2020 |

OTHER PUBLICATIONS

Peter L. Borst, "A Closer Look @ the Hive, Hive Sounds The Signal in the Noise," American Bee Journal, Sep. 2019, pp. 1041-1046.
WH Kirchner, "Acoustical communication in Honeybees," *Apidologie* (1993) 24, 297-307.
WH Kirchner, "Acoustical communication in Social Insects," *Orientation and Communication in Arthropods*, 1997, pp. 273-300.
Margina et al., "Implementing the Levinson-Durbin Algorithm on the StarCore™ SC140/SC1400 Cores," Freescale Semiconducor, Inc. Rev. 1, Jan. 2005.
Apivox Smart Monitor Diagnostic of the State of Bees' Families, on the Basis of Analysis of Vibro-Acoustic Signals Emitted by the Bees, https://apivox-smart-monitor.weebly,com, copyright 2016, 28 pages.
Apivox Auditor the Beekeepers Acoustic Assistant—The Bee Zone Nov. 1, 2016, 11 pages.
Bee Health Guru—a smartphone app for beekeepers by David Firth—Kickstarter, http://www.kickstarter.com/projects/beehealthguru/bee-health-guru-a-smartphone-app-for-beekeepers, 2020, printed Sep. 17, 2020.
SAS Visual Forecasting 8.1 Programming Guide, Chapter 3, Time Frequency Analysis Action Set, SAS Institute Inc., Cary, NC 2017.
Bromenshenk et al., "Decoding the Songs of Bees," *Bee Culture,,* May 2019, pp. 36-39.
E.F. Woods, "Electronic Prediction of Swarming in Bees," *Nature*, vol. 184, Sep. 19, 1959, pp. 842-844.
SAS Event Stream Processing: Using Streaming Analytics, SAS Institute, Institute, 2021.
Latest Loss Survey Results 2018-2019, Jun. 19, 2019 by the Bee Informed Team.
Rex Boys, Beekeeping in a Nutshell, "Listen to the Bees," 1999.
Beng et al., "Remote Hive Monitoring," Apimondia Kiev 2013, 11 pages.
Statistical Spectral Analysis, A Nonprobabilistic Theory, Chapter 9, Parametric Methods, Dr. William A. Gardner, 1988 by Prentice-Hall Inc.
Michelsen et al., "The tooting and quacking vibration signals of honeybee queens: a quantitative analysis," *J Comp Physiol a* (1986) 158:605-611.
Dr. Gloria DeGrandi-Hoffman, The Well Managed Hives Podcast, Nature, 2019.
Nolasco et al., "To Bee or Not to Bee: Investigating Machine Learning Approaches for Beehive Sound Recognition," *Detection and Classification of Acoustic Scenes and Events* 2018.
Kulyukin et al., "Toward Audio Beehive Monitoring: Deep Learning vs. Standard Machine Learning in Classifying Beehive Audio Samples," Applied Sciences, 2018, 8, 1573.
USGS Pamphlet Why are Bees Important?, printed Sep. 16, 2020.
Pratt et al., "Worker piping associated with foraging in undisturbed queenright colonies of honey bees," *Apidologie* (1996) 27, 13-20.
J. Monge-Álvarez, C. Hoyos-Barceló, P. Lesso and P. Casaseca-de-la-Higuera, "Robust Detection of Audio-Cough Events Using Local Hu Moments," in *IEEE Journal of Biomedical and Health Informatics*, vol. 23, No. 1, pp. 184-196, Jan. 2019, doi: 10.1109/JBHI.2018.2800741.
Yan Shi, He Liu, Yixuan Wang, Maolin Cai, Weiqing Xu, "Theory and Application of Audio-Based Assessment of Cough", Journal of Sensors, vol. 2018, Article ID 9845321, 10 pages, 2018. https://doi.org/10.1155/2018/9845321.
The sound of Covid-19? New app to identify symptoms through voices and coughs, https://cordis.europa.eu/article/id/417988-the-sound-of-covid-19-new-app-to-identify-symptoms-through-voices-and-coughs retrieved Sep. 16, 2020.
Caroline Tien, "The Sound of Your Cough Could Help Screen for COVID-19," Verywellhealth, COVID-19 Vaccines: Updates and Resources Dec. 8, 2020.
Kiktova, Eva & Lojka, Martin & Pleva, Mattis & Juhár, Jozef & Čžmár, Anton. (2015). Gun type recognition from gunshot audio recordings. 3rd International Workshop on Biometrics and Forensics, IWBF 2015. 10.1109/IWBF.2015.7110240.
Raponi et al., "Sound of Guns: Digital Forensics of Gun Audio Samples ;meets Artificial Intelligence," https://arxiv.org/abs/2004.07948, Mar. 2021.
Acoustic Gunshot Detection, https://www.eff.org/pages/gunshot-detection, printed Mar. 3, 2021.
SAS Visual Data Mining and Machine Learning 8.1 Data Mining and Machine Learning Procedures, Chapters 3 and 10; SAS Institute Inc., Cary, NC, 2017.
SAS Forecast Server 14.3 Time Series Packages, SAS Institute Inc., Cary, NC; 2017.

* cited by examiner

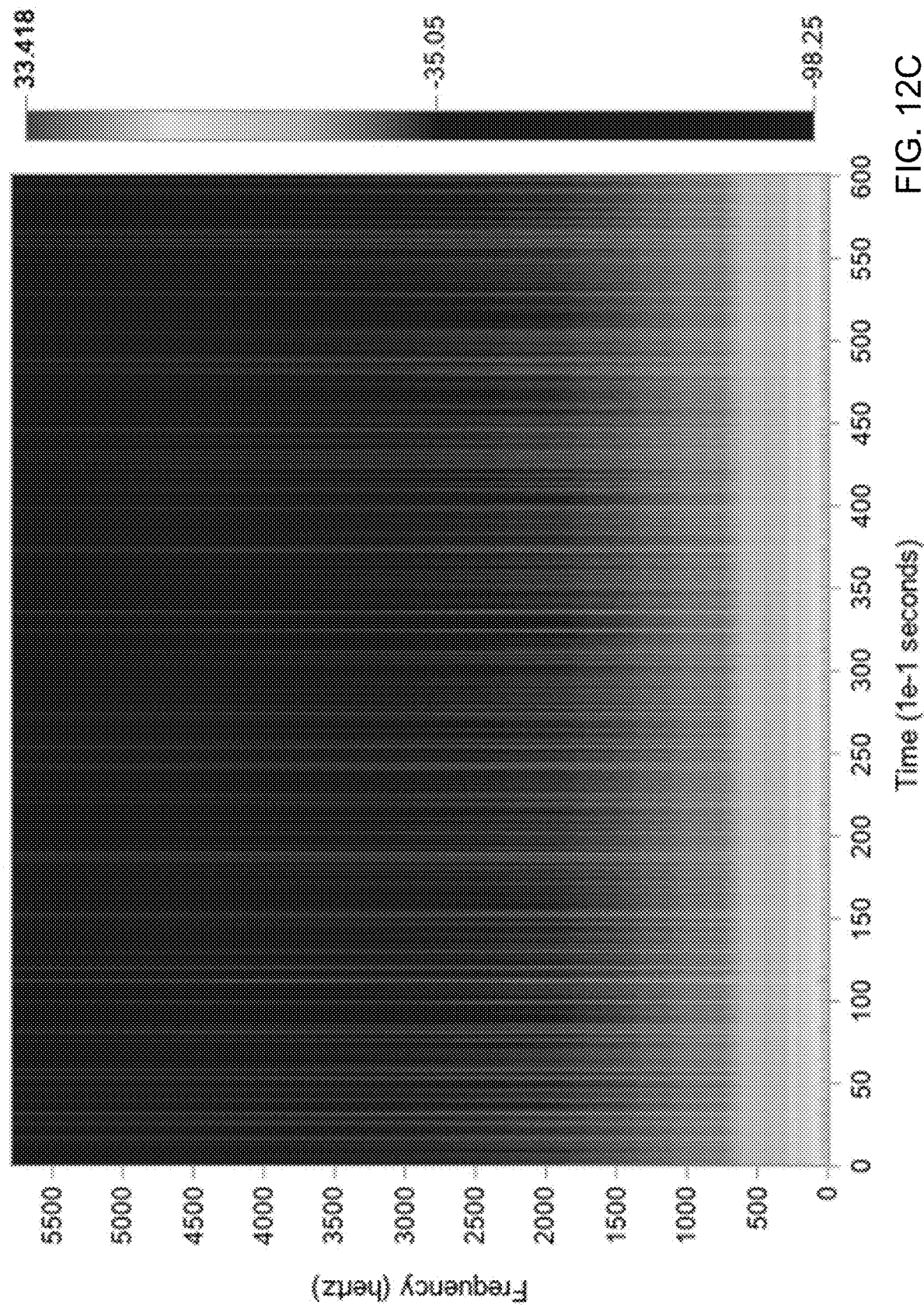

US 11,036,981 B1

DATA MONITORING SYSTEM

CROSS-REFERENCE TO RELATED APPLICATIONS

The present application claims the benefit of 35 U.S.C. § 119(e) to U.S. Provisional Patent Application No. 63/076,542 filed on Sep. 10, 2020, to U.S. Provisional Patent Application No. 62/983,802 filed on Mar. 2, 2020, and to U.S. Provisional Patent Application No. 62/981,604 filed on Feb. 26, 2020, the entire contents of which are hereby incorporated by reference.

BACKGROUND

Non-invasive system monitoring through acoustic data is important in many application areas. For example, beekeepers can benefit from the non-invasive monitoring of bee boxes to maintain healthy bee colonies without time-consuming and disruptive manual inspections. Farmers can benefit from the non-invasive monitoring of chicken stress in chicken coops, which can result in suppressed feed intake and a decline in production. Healthcare professionals can benefit from non-invasive monitoring to diagnose different types of diseases by automated classification of various types of cough sounds. Law enforcement departments can utilize a gunshot detection system to identify, discriminate, and report gunshots to the police, so police resources are not wasted by dispatching units to false alarms.

SUMMARY

In an example embodiment, a non-transitory computer-readable medium is provided having stored thereon computer-readable instructions that, when executed by a computing device, cause the computing device to determine if an event has occurred. (A) A first window is defined that includes a subset of a plurality of observation vectors. Each observation vector of the plurality of observation vectors includes a sensor value measured by a sensor. The plurality of observation vectors includes the sensor value measured as a function of time. (B) The subset of the plurality of observation vectors is modeled as an output of an autoregressive (AR) causal system to estimate a power spectrum for the subset of the plurality of observation vectors. (C) A magnitude adjustment vector is computed from a mean computed for a matrix of magnitude values. The matrix of magnitude values includes a column for each window of a plurality of windows. The first window is stored in a next column of the matrix of magnitude values. Each cell of the matrix of magnitude values includes an estimated power spectrum value for a respective window and a respective frequency. (D) A second matrix of magnitude values is updated using the computed magnitude adjustment vector. Each cell of the second matrix of magnitude values includes an adjusted power spectrum value for the respective window and the respective frequency. (E) A peak is detected from the next column of the second matrix of magnitude values. (F) Whether a peak is detected within a predefined frequency range is determined. (G) When the peak is detected within the predefined frequency range, an event indicator is output to indicate an event has occurred.

In another example embodiment, a computing device is provided. The computing device includes, but is not limited to, a processor and a non-transitory computer-readable medium operably coupled to the processor. The computer-readable medium has instructions stored thereon that, when executed by the computing device, cause the computing device to determine if an event has occurred.

In yet another example embodiment, a method of determining if an event has occurred is provided.

Other principal features of the disclosed subject matter will become apparent to those skilled in the art upon review of the following drawings, the detailed description, and the appended claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Illustrative embodiments of the disclosed subject matter will hereafter be described referring to the accompanying drawings, wherein like numerals denote like elements.

FIG. 12C shows a heatmap of a low-rank matrix computed by applying RPCA to the heatmap data of FIG. 12A in accordance with an illustrative embodiment.

DETAILED DESCRIPTION

Monitoring and processing of acoustic data can provide a determination of a general health or status of a system. For example, analysis of acoustic data of a beehive can be used to determine a status of the beehive, and analysis of acoustic data of a chicken coop can be used to determine stress of chickens. Analysis of acoustic and/or vibration data of a machine can be used to determine whether the machine is faulting. Analysis of acoustic data of a person's cough can be used to determine whether the cough is a dry cough, a wet cough, or a wheezing cough to evaluate a health of the person. Analysis of acoustic data can be used to determine whether a gun has been fired and what type of gun, whether fireworks have been released, etc. The real-time analysis of acoustic and/or vibration data requires analytical tools that can handle a large volume of data and turn this data into actionable insights at second to sub-second rates despite extraneous sounds making it difficult to detect the sounds being monitored.

Figure 1:
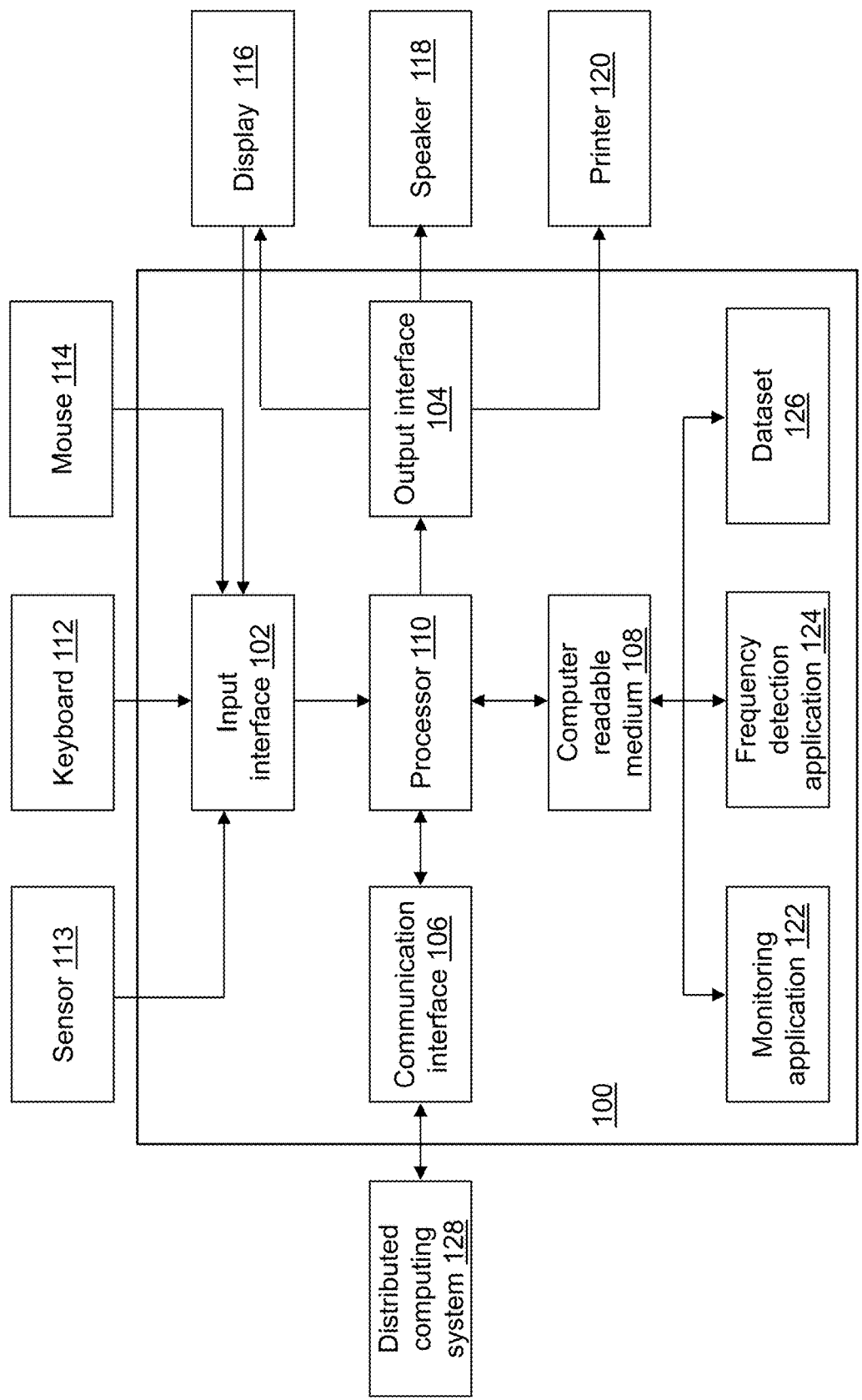
FIG. 1 depicts a block diagram of a monitoring device in accordance with an illustrative embodiment.

Referring to FIG. 1, a block diagram of a monitoring device 100 is shown in accordance with an illustrative embodiment. Monitoring device 100 may include an input interface 102, an output interface 104, a communication interface 106, a non-transitory computer-readable medium 108, a processor 110, a monitoring application 122, a frequency detection application 124, and a dataset 126. Fewer, different, and/or additional components may be incorporated into monitoring device 100.

Input interface 102 provides an interface for receiving information from the user or another device for entry into monitoring device 100 as understood by those skilled in the art. Input interface 102 may interface with various input technologies including, but not limited to, a keyboard 112, a mouse 114, a display 116, a track ball, a keypad, one or more buttons, etc. to allow the user to enter information into monitoring device 100 or to make selections presented in a user interface displayed on display 116.

Input interface 102 may also interface with various input technologies such as a sensor 113. For example, sensor 113 may produce a sensor signal value referred to as a measurement data value representative of a measure of a physical quantity in an environment to which sensor 113 is associated and generate a corresponding measurement datum that may be associated with a time that the measurement datum is generated. The environment to which sensor 113 is associated for monitoring may include a power grid system, a telecommunications system, a fluid (oil, gas, water, etc.) pipeline, a transportation system, an industrial device, a medical device, an appliance, a vehicle, a computing device, a beehive, a person, a geographic location, etc. Example sensor types of sensor 113 include an acoustic sensor, a pressure sensor, a temperature sensor, a position or location sensor, a velocity sensor, an acceleration sensor, a fluid flow rate sensor, a voltage sensor, a current sensor, a frequency sensor, a phase angle sensor, a data rate sensor, a humidity sensor, a light sensor, a motion sensor, an electromagnetic field sensor, a force sensor, a torque sensor, a load sensor, a strain sensor, a chemical property sensor, a resistance sensor, a radiation sensor, an irradiance sensor, a proximity sensor, a distance sensor, a vibration sensor, etc. that may be mounted to various components used as part of the system. For example, sensor 113 may be a microphone that detects sound waves or a vibration meter that detects vibrations.

The same interface may support both input interface 102 and output interface 104. For example, display 116 comprising a touch screen provides a mechanism for user input and for presentation of output to the user. Monitoring device 100 may have one or more input interfaces that use the same or a different input interface technology. The input interface technology further may be accessible by monitoring device 100 through communication interface 106.

Output interface 104 provides an interface for outputting information for review by a user of monitoring device 100 and/or for use by another application or device. For example, output interface 104 may interface with various output technologies including, but not limited to, display 116, a speaker 118, a printer 120, etc. Monitoring device 100 may have one or more output interfaces that use the same or a different output interface technology. The output interface technology further may be accessible by monitoring device 100 through communication interface 106.

Communication interface 106 provides an interface for receiving and transmitting data between devices using various protocols, transmission technologies, and media as understood by those skilled in the art. Communication interface 106 may support communication using various transmission media that may be wired and/or wireless. Monitoring device 100 may have one or more communication interfaces that use the same or a different communication interface technology. For example, monitoring device 100 may support communication using an Ethernet port, a Bluetooth antenna, a telephone jack, a USB port, etc. Data and messages may be transferred between monitoring device 100 and another computing device of a distributed computing system 128 using communication interface 106.

Computer-readable medium 108 is an electronic holding place or storage for information so the information can be accessed by processor 110 as understood by those skilled in the art. Computer-readable medium 108 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. Monitoring device 100 may have one or more computer-readable media that use the same or a different memory media technology. For example, computer-readable medium 108 may include different types of computer-readable media that may be organized hierarchically to provide efficient access to the data stored therein as understood by a person of skill in the art. As an example, a cache may be implemented in a smaller, faster memory that stores copies of data from the most frequently/recently accessed main memory locations to reduce an access latency. Monitoring device 100 also may have one or more drives that support the loading of a memory media such as a CD, DVD, an external hard drive, etc. One or more external hard drives further may be connected to monitoring device 100 using communication interface 106.

Processor 110 executes instructions as understood by those skilled in the art. The instructions may be carried out by a special purpose computer, logic circuits, or hardware circuits. Processor 110 may be implemented in hardware and/or firmware. Processor 110 executes an instruction, meaning it performs/controls the operations called for by that instruction. The term "execution" is the process of running an application or the carrying out of the operation called for by an instruction. The instructions may be written using one or more programming language, scripting language, assembly language, etc. Processor 110 operably couples with input interface 102, with output interface 104, with communication interface 106, and with computer-readable medium 108 to receive, to send, and to process information. Processor 110 may retrieve a set of instructions from a permanent memory device and copy the instructions in an executable form to a temporary memory device that is generally some form of RAM. Monitoring device 100 may include a plurality of processors that use the same or a different processing technology.

Some machine-learning approaches may be more efficiently and speedily executed and processed with machine-learning specific processors (e.g., not a generic central processing unit (CPU)). Such processors may also provide additional energy savings when compared to generic CPUs. For example, some of these processors can include a graphical processing unit, an application-specific integrated circuit, a field-programmable gate array, an artificial intelligence accelerator, a purpose-built chip architecture for machine learning, and/or some other machine-learning specific processor that implements a machine learning approach using semiconductor (e.g., silicon, gallium arsenide) devices. These processors may also be employed in heterogeneous computing architectures with a number of and a variety of different types of cores, engines, nodes, and/or layers to achieve additional various energy efficiencies, processing speed improvements, data communication speed improvements, and/or data efficiency targets and improvements throughout various parts of the system.

Monitoring application 122 performs operations associated with monitoring a system based on one or more observation vectors included in dataset 126. Data describing the current system may be output to support various data analysis functions as well as provide alert/messaging related to the monitoring. Some or all of the operations described herein may be embodied in monitoring application 122. The operations may be implemented using hardware, firmware, software, or any combination of these methods.

Referring to the example embodiment of FIG. 1, monitoring application 122 is implemented in software (comprised of computer-readable and/or computer-executable instructions) stored in computer-readable medium 108 and accessible by processor 110 for execution of the instructions that embody the operations of monitoring application 122. Monitoring application 122 may be written using one or more programming languages, assembly languages, scripting languages, etc. Monitoring application 122 may be integrated with other analytic tools. As an example, monitoring application 122 may be part of an integrated data analytics software application and/or software architecture such as that offered by SAS Institute Inc. of Cary, N.C., USA. For example, monitoring application 122 may be implemented using or integrated with one or more SAS software tools such as SAS® Enterprise Miner™, Base SAS, SAS/STAT®, SAS® High Performance Analytics Server, SAS® LASR™, SAS® In-Database Products, SAS® Scalable Performance Data Engine, SAS/OR®, SAS/ETS®, SAS® Inventory Optimization, SAS® Inventory Optimization Workbench, SAS® Visual Analytics, SAS® Viya™, SAS In-Memory Statistics for Hadoop®, SAS® Forecast Server, SAS® Event Stream Processing, all of which are developed and provided by SAS Institute Inc. of Cary, N.C., USA. Data mining is applicable in a wide variety of industries. For illustration, monitoring application 122 may be executed by a procedure implemented as part of SAS® Viya™.

Monitoring application 122 may be integrated with other system processing tools to automatically process data received through input interface 102 and/or communication interface 106 generated as part of operation of an enterprise, device, system, facility, etc. to monitor changes in the data that may be output using output interface 104 and/or communication interface 106 so that appropriate action can be initiated in response to changes in the monitored data.

Monitoring application 122 may be implemented as a Web application. For example, monitoring application 122 may be configured to receive hypertext transport protocol (HTTP) responses and to send HTTP requests. The HTTP responses may include web pages such as hypertext markup language (HTML) documents and linked objects generated in response to the HTTP requests. Each web page may be identified by a uniform resource locator (URL) that includes the location or address of the computing device that contains the resource to be accessed in addition to the location of the resource on that computing device. The type of file or resource depends on the Internet application protocol such as the file transfer protocol, HTTP, H.323, etc. The file accessed may be a simple text file, an image file, an audio file, a video file, an executable, a common gateway interface application, a Java applet, an extensible markup language (XML) file, or any other type of file supported by HTTP.

Frequency detection application 124 performs operations associated with monitoring a status of a system by detecting certain frequencies through processing of one or more observation vectors included in dataset 126. An indicator of the monitoring status of the system may be output to support various data analysis functions as well as provide alert/messaging related to the monitoring status. Dependent on the type of data stored in dataset 126, frequency detection application 124 may identify anomalies as part of process control, for example, of a manufacturing process, for machine condition monitoring, may identify a health status of a beehive or a person, may identify a gun being fired, etc. Frequency detection application 124 can be used to identify anomalies that occur based on the data as or shortly after the data is generated. Some or all of the operations described herein may be embodied in frequency detection application 124. The operations may be implemented using hardware, firmware, software, or any combination of these methods.

Referring to the example embodiment of FIG. 1, frequency detection application 124 is implemented in software (comprised of computer-readable and/or computer-executable instructions) stored in computer-readable medium 108 and accessible by processor 110 for execution of the instructions that embody the operations of frequency detection application 124. Frequency detection application 124 may be written using one or more programming languages, assembly languages, scripting languages, etc. Frequency detection application 124 may be integrated with other analytic tools such as monitoring application 122. As another example, frequency detection application 124 may be part of an integrated data analytics software application and/or software architecture such as that offered by SAS Institute Inc. of Cary, N.C., USA. For example, frequency detection application 124 may be implemented using or integrated with one or more SAS software tools such as SAS® Enterprise Miner™, Base SAS, SAS/STAT®, SAS® High Performance Analytics Server, SAS® LASR™, SAS® In-Database Products, SAS® Scalable Performance Data Engine, SAS/OR®, SAS/ETS®, SAS® Inventory Optimization, SAS® Inventory Optimization Workbench, SAS® Visual Analytics, SAS® Viya™, SAS In-Memory Statistics for Hadoop®, SAS® Forecast Server, SAS® Event Stream Processing, all of which are developed and provided by SAS Institute Inc. of Cary, N.C., USA. Data mining is applicable in a wide variety of industries. For illustration, frequency detection application 124 may be executed by a procedure implemented as part of SAS® Viya™.

Frequency detection application 124 may be integrated with other system processing tools to automatically process data generated as part of operation of an enterprise, device, system, facility, beehive, geographic location, etc., to identify any events in new data, to monitor changes in the data, and/or to provide a warning or alert associated with the monitored data using input interface 102, output interface 104, and/or communication interface 106 so that appropriate action can be initiated in response to changes in the monitored data. For example, if a machine is being monitored and begins to malfunction, a warning or alert message may be sent to a user's smartphone or tablet through communication interface 106 so that the machine can be shut down before damage to the machine occurs. Frequency detection application 124 may be implemented as a Web application.

Dataset 126 may include, for example, a plurality of rows and a plurality of columns. The plurality of rows may be referred to as observation vectors or records (observations), and the columns may be referred to as variables. Dataset 126 may be transposed. The plurality of variables may define multiple dimensions for each observation vector. An observation vector $x_i$ may include a value for each of the plurality of variables associated with the observation i. All or a subset of the columns may be used as variables that define observation vector $x_i$. Each variable of the plurality of variables may describe a characteristic of a physical object. For example, dataset 126 may include sound measurements produced when a physical object vibrates that is captured as a function of time for one or more physical objects by a microphone that detects sound pressure waves and generates an electrical signal described by data stored in dataset 126. As another example, dataset 126 may include vibration measurements captured as a function of time for one or more physical objects by a vibration meter that detects the acceleration, velocity, and/or displacement of the vibrations and generates an electrical signal described by data stored in dataset 126. The physical object may be a machine or device of some type, the ground, a living object such as a person, an insect, an animal, the air surrounding a geographic location, etc.

The data stored in dataset 126 may be generated by and/or captured from a variety of sources including one or more sensors of the same or different type, one or more computing devices, etc. The data stored in dataset 126 may be received directly or indirectly from the source and may or may not be pre-processed in some manner. For example, the data may be pre-processed using an event stream processor such as SAS® Event Stream Processing. As used herein, the data may include any type of content represented in any computer-readable format such as binary, alphanumeric, numeric, string, markup language, etc. The data may be organized using delimited fields, such as comma or space separated fields, fixed width fields, using a SAS® dataset, etc. The SAS dataset may be a SAS® file stored in a SAS® library that a SAS® software tool creates and processes. The SAS dataset contains data values that are organized as a table of observations (rows) and variables (columns) that can be processed by one or more SAS software tools.

Dataset 126 may be stored on computer-readable medium 108 or on one or more computer-readable media of distributed computing system 128 and accessed by monitoring device 100 using communication interface 106, input interface 102, and/or output interface 104. Data stored in dataset 126 may be continually received for processing by monitoring application 122. Data stored in dataset 126 may be sensor measurements or signal values captured by sensor 113. The data stored in dataset 126 may include any type of content represented in any computer-readable format such as binary, alphanumeric, numeric, string, markup language, etc. The content may include sensor data, textual information, graphical information, image information, audio information, numeric information, etc. that further may be encoded using various encoding techniques as understood by a person of skill in the art. The data stored in dataset 126 may be captured at different time points periodically, intermittently, when an event occurs, continuously, etc. One or more columns of dataset 126 may include a time and/or date value.

Dataset 126 may include data captured under normal operating conditions of the physical object. Dataset 126 may include data captured at a high data rate such as 200 or more observations per second for one or more physical objects. For example, data stored in dataset 126 may be generated as part of the IoT, where things (e.g., machines, devices, phones, sensors) can be connected to networks and the data from these things collected and processed within the things and/or external to the things before being stored in dataset 126. For example, the IoT can include sensors, such as sensor 113, in many different devices and types of devices, and high value analytics can be applied to identify hidden relationships and drive increased efficiencies. This can apply to both big data analytics and real-time analytics. Some of these devices may be referred to as edge devices and may involve edge computing circuitry. These devices may provide a variety of stored or generated data, such as network data or data specific to the network devices themselves. Some data may be processed with an event stream processing engine (ESPE), which may reside in the cloud or in an edge device before being stored in dataset 126.

Dataset 126 may be stored using various data structures as known to those skilled in the art including one or more files of a file system, a relational database, one or more tables of a system of tables, a structured query language database, etc. on monitoring device 100 or on distributed computing system 128. Monitoring device 100 may coordinate access to dataset 126 that is distributed across distributed computing system 128 that may include one or more computing devices. For example, dataset 126 may be stored in a cube distributed across a grid of computers as understood by a person of skill in the art. As another example, dataset 126 may be stored in a multi-node Hadoop® cluster. For instance, Apache™ Hadoop® is an open-source software framework for distributed computing supported by the Apache Software Foundation. As another example, dataset 126 may be stored in a cloud of computers and accessed using cloud computing technologies, as understood by a person of skill in the art. The SAS® LASR™ Analytic Server may be used as an analytic platform to enable multiple users to concurrently access data stored in dataset 126. The SAS® Viya™ open, cloud-ready, in-memory architecture also may be used as an analytic platform to enable multiple users to concurrently access data stored in dataset 126. Some systems may use SAS In-Memory Statistics for Hadoop® to read big data once and analyze it several times by persisting it in-memory for the entire session. Some systems may be of other types and configurations.

Figure 2A:
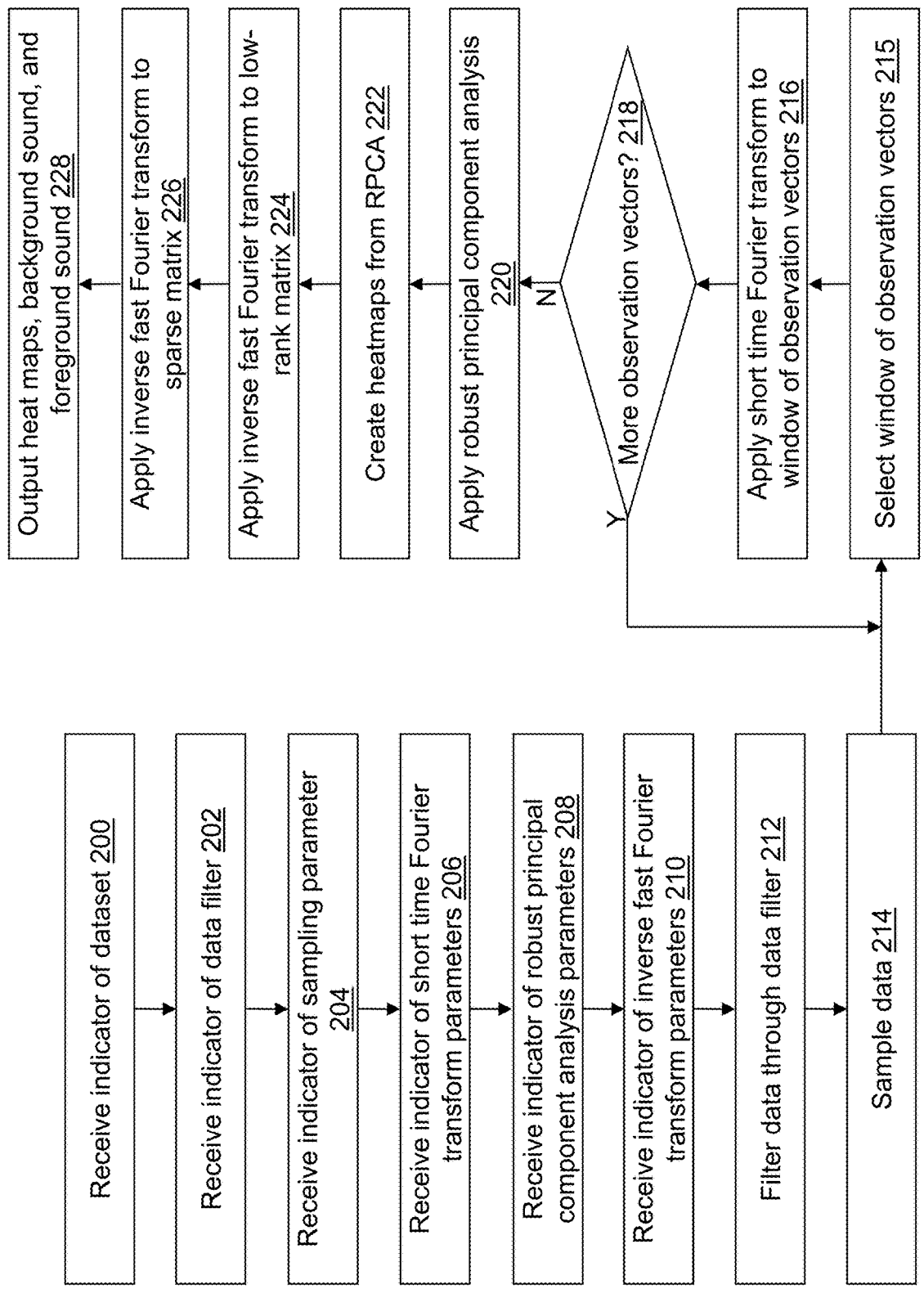
FIG. 2A depicts a flow diagram illustrating examples of monitoring operations performed by the monitoring device of FIG. 1 in accordance with an illustrative embodiment.

Referring to FIG. 2A, example operations associated with monitoring application 122 are described. Additional, fewer, or different operations may be performed depending on the embodiment of monitoring application 122. The order of presentation of the operations of FIG. 2A is not intended to be limiting. Although some of the operational flows are presented in sequence, the various operations may be performed in various repetitions, concurrently (in parallel, for example, using threads and/or distributed computing system 128), and/or in other orders than those that are illustrated. For example, a user may execute monitoring application 122, which causes presentation of a first user interface window, which may include a plurality of menus and selectors such as drop-down menus, buttons, text boxes, hyperlinks, etc. associated with monitoring application 122 as understood by a person of skill in the art. The plurality of menus and selectors may be accessed in various orders. An indicator may indicate one or more user selections from a user interface, one or more data entries into a data field of the user interface, one or more data items read from computer-readable medium 108 or otherwise defined with one or more default values, etc. that are received as an input by monitoring application 122.

In an operation 200, a first indicator may be received that indicates dataset 126. For example, the first indicator indicates a location and a name of dataset 126. As an example, the first indicator may be received by monitoring application 122 after selection from a user interface window or after entry by a user into a user interface window. In an alternative embodiment, dataset 126 may not be selectable. For example, a most recently created dataset may be used automatically or dataset 126 may refer to streaming data as discussed in an alternative embodiment below. The first indicator may further indicate a plurality of variables of dataset 126 to define $x_i$. The first indicator may indicate that all or only a subset of the variables stored in dataset 126 be monitored. For example, the first indicator indicates a list of variables to use by name, column number, etc. As another example, all of the variables may be used automatically.

In an operation 202, a second indicator is received that indicates a type of data filter to apply and any parameters associated with the indicated type of data filter. In an alternative embodiment, the second indicator may not be received. For example, a default data filter may be used automatically with any parameters used by the data filter defined using default values or using the second indicator or no data filter may be used. As an example, a data filter type may be selected from "Median", "Butterworth low pass", "Chebyshev I", "Chebyshev II", etc. Of course, the filter type may be labeled or selected in a variety of different manners by the user as understood by a person of skill in the art. For illustration, when a "Butterworth low pass" data filter type is selected, an upper frequency value may be indicated or defined by using a default value to define a frequency band of frequencies to keep. A filter window size further may be defined by a default value or using the second indicator.

In an operation 204, a third indicator is received that indicates a sampling parameter value such as a subsampling rate. In an alternative embodiment, the third indicator may not be received. For example, the value for the sampling parameter value may be stored, for example, in computer-readable medium 108 and used automatically or no sampling may be performed. For illustration, the sampling parameter value may be 0.25.

In an operation 206, a fourth indicator is received that indicates a value for one or more parameters to define a short time Fourier transform (STFT) application. In an alternative embodiment, the fourth indicator may not be received. For example, a default value for the one or more parameters to define the STFT may be stored, for example, in computer-readable medium 108 and used automatically. In another alternative embodiment, the value for the one or more parameters to define the STFT application may not be selectable. Instead, fixed, predefined values may be used. For example, the fourth indicator may indicate an STFT window type, an STFT window length, an STFT duration, an STFT overlap ratio, and/or a fast Fourier transform (FFT) length. For illustration, the STFT window length may be in the range of 100 to 200 milliseconds, because the spectral characteristics of acoustic signals usually is stationary within this time frame. For illustration, a default value for the STFT overlap ratio may be 50% though other values may be used. Larger overlap ratios create more windows to be processed, smaller overlap ratios generate more obvious spectral discontinuity between windows. The FFT length defines a number of FFT points to be calculated, and is usually chosen to be a value of a power of 2 and must be greater than the STFT window length. For example, if the STFT window length is 150 milliseconds and a data sampling rate is 12 kilohertz, the STFT window length in terms of samples is 0.15*12000=1800. The minimum FFT length may be 2048 though a larger value of 4096 or 8196 may be preferable for higher spectral resolution if computation speed is not an issue.

In an operation 208, a fifth indicator is received that indicates one or more parameters to define a robust principal component analysis (RPCA) application. In an alternative embodiment, the fifth indicator may not be received. For example, a default value for the one or more parameters to define the RPCA may be stored, for example, in computer-readable medium 108 and used automatically. In another alternative embodiment, the value for the one or more parameters to define the RPCA application may not be selectable. Instead, fixed, predefined values may be used. For example, the fifth indicator may indicate a value for $\lambda$ such as $\lambda=0.009$.

In an operation 210, a sixth indicator is received that indicates a value for one or more parameters to define an inverse fast Fourier transform (IFFT) application. In an alternative embodiment, the sixth indicator may not be received. For example, a default value for the one or more parameters to define the IFFT may be stored, for example, in computer-readable medium 108 and used automatically. In another alternative embodiment, the value for the one or more parameters to define the IFFT application may not be selectable. Instead, fixed, predefined values may be used. For example, the seventh indicator may indicate an IFFT window type, an IFFT window length, an IFFT duration, and/or an FFT length. In an illustrative embodiment, the IFFT parameters may have the same values as the STFT parameters.

In an operation 212, the data filter is applied to the data read from dataset 126 based on the filter type and/or the filter parameters indicated in operation 202, if any.

In an operation 214, the filtered data is sampled based on the sampling parameter value indicated in operation 202, if any.

In an operation 215, a window of observation vectors is defined from the sampled data based on the values for the STFT window length and/or the STFT duration indicated in operation 206.

In an operation 216, a vector of magnitude values V is computed for the defined window of observation vectors. For example, the frequency spectrum can be computed using the STFT method available in the Time Frequency Analysis (TFA) package of the TIMEDATA procedure in the SAS® Visual Forecasting product on SAS® Viya®. The vector of magnitude values V is added as a next column of a matrix of magnitude values M. The vector of magnitude values V may be computed using $V=\sqrt{r_j^2+i_j^2}$, $j=1, \ldots, n$, where r is a real part of the STFT output, i is an imaginary part of the STFT output, and n is the STFT window length used to define a number point to be computed using the STFT method.

In an operation 218, a determination is made concerning whether there are additional observation vectors in dataset 126 to sample and process. When there are additional observation vectors, processing continues in operation 215 to define another window of observation vectors and apply the STFT to add another column to the matrix of magnitude values M. When there are not additional observation vectors, processing continues in an operation 220.

In an operation 220, the RPCA is applied to the matrix of magnitude values M with the RPCA parameters indicated in operation 208 to define a sparse matrix S and a low-rank matrix L, where M=L+S. For example, the frequency spectrum can be computed using the RPCA procedure available in SAS® Viya®.

Figure 11A:
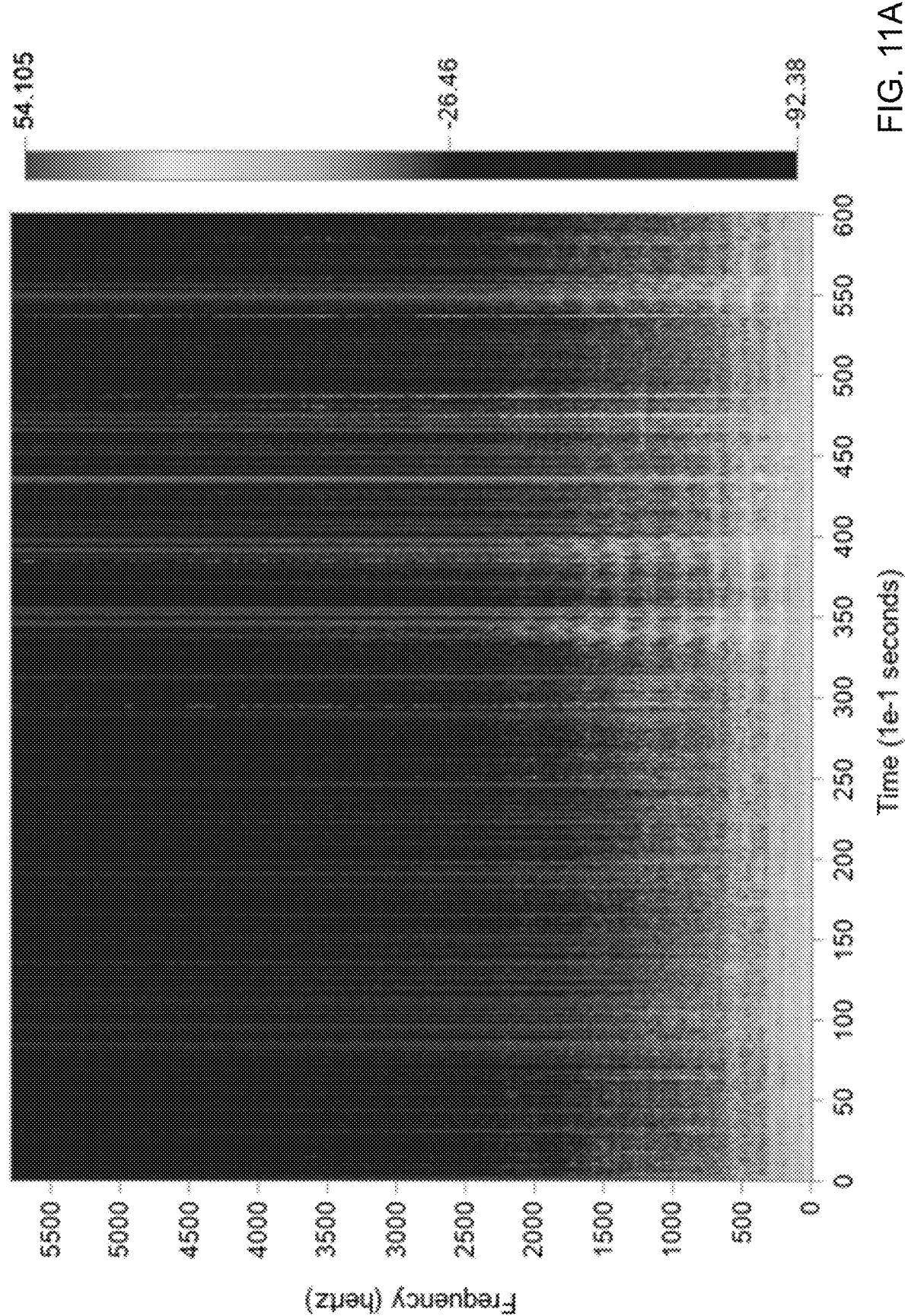
FIG. 11A shows a heatmap of one-minute of frequency data of a beehive during a first time interval generated using a short time Fourier transform (STFT) in accordance with an illustrative embodiment.
Figure 11B:
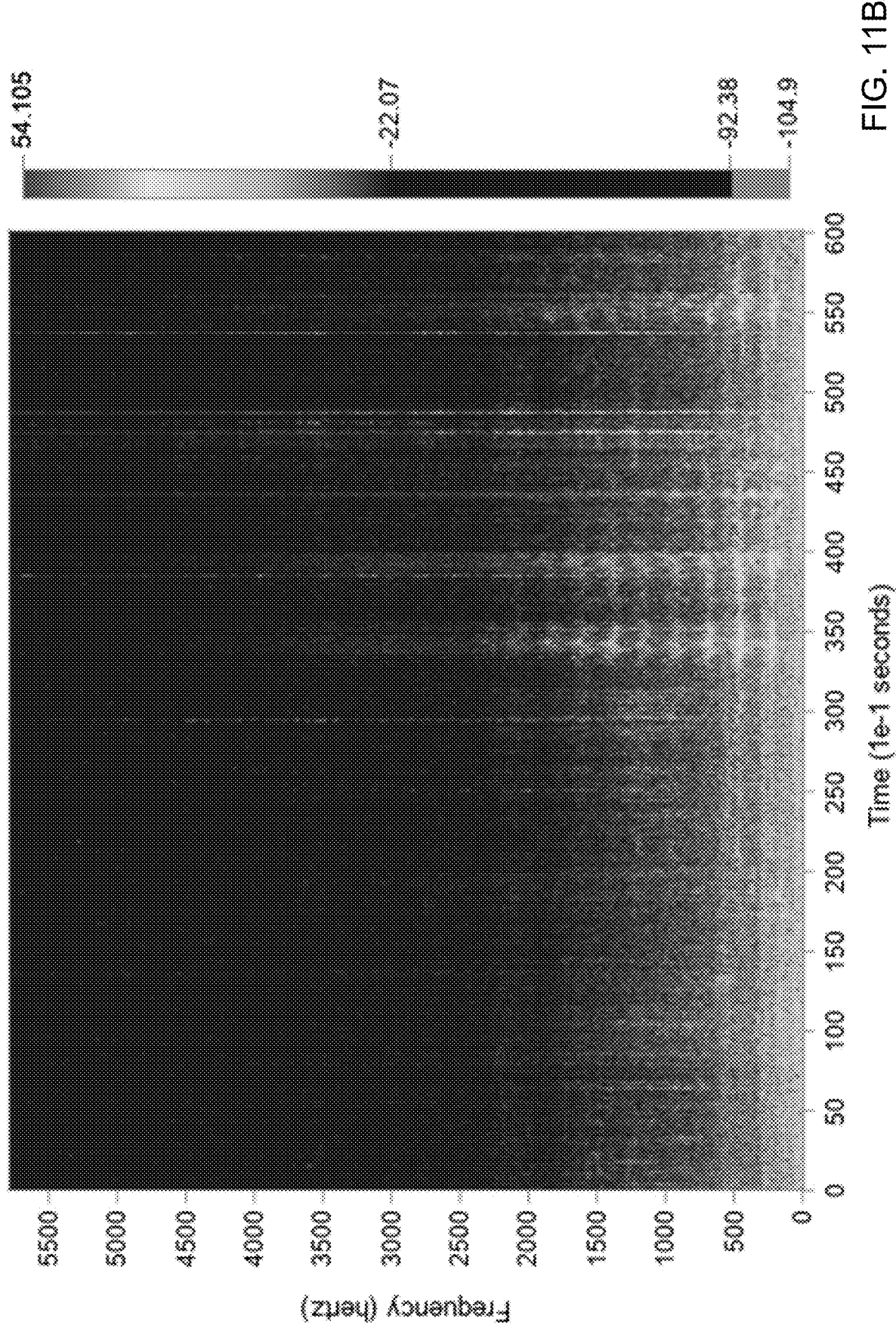
FIG. 11B shows a heatmap of a sparse matrix computed by applying robust principal component analysis (RPCA) to the heatmap data of FIG. 11A in accordance with an illustrative embodiment.
Figure 11C:
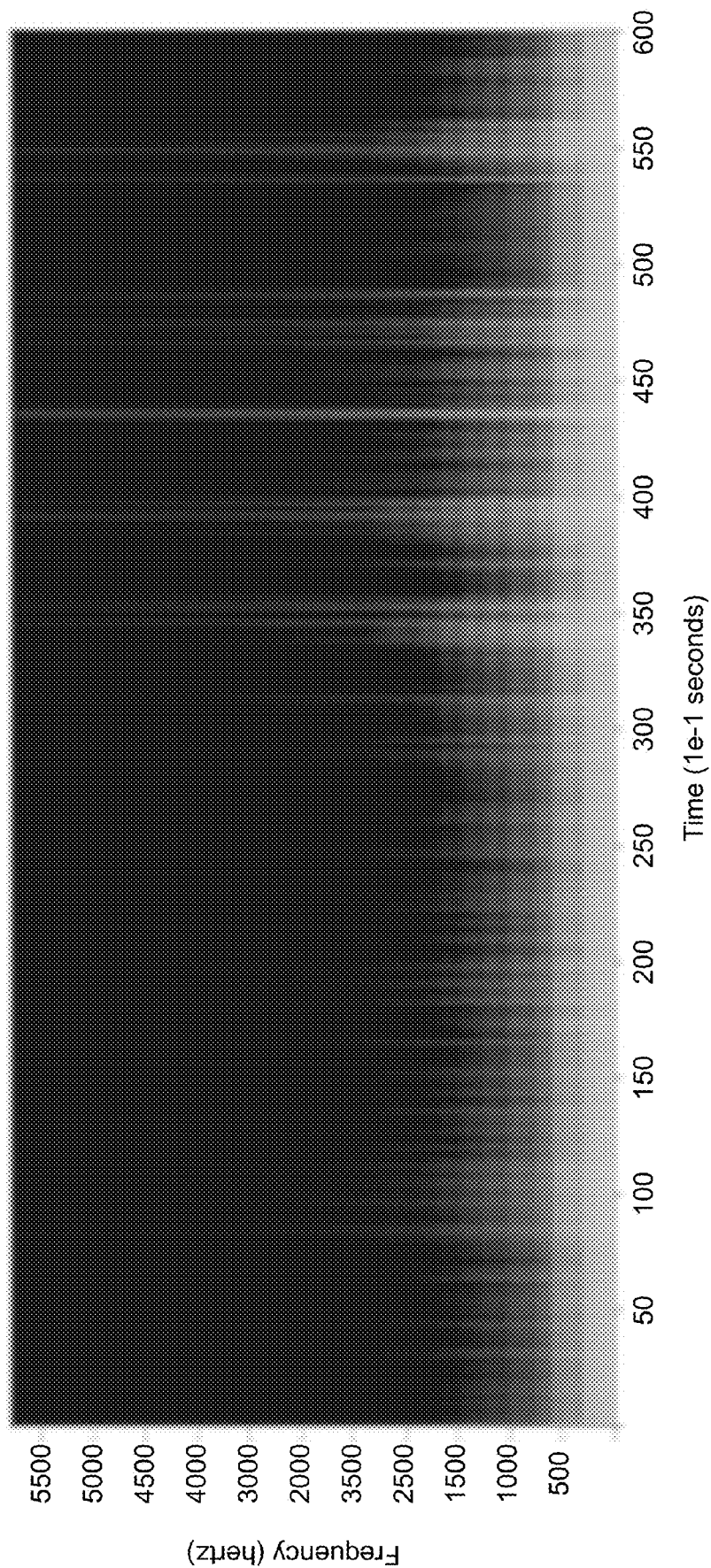
FIG. 11C shows a heatmap of a low-rank matrix computed by applying RPCA to the heatmap data of FIG. 11A in accordance with an illustrative embodiment.

In an operation 220, one or more heatmaps may be created from the RPCA matrices. For illustration, referring to FIG. 11A, a heatmap is shown in accordance with an illustrative embodiment that presents the matrix of magnitude values M in decibels (dB). FIG. 11A shows a heatmap of one-minute of acoustic frequency data of a beehive during a first time interval in accordance with an illustrative embodiment. The first time interval included sounds characterized as from a frantic bee. Referring to FIG. 11B, a sparse matrix heatmap is shown in accordance with an illustrative embodiment that presents the sparse matrix S computed from the matrix of magnitude values M in FIG. 11A. Referring to FIG. 11C, a low-rank matrix heatmap is shown in accordance with an illustrative embodiment that presents the low-rank matrix L computed from the matrix of magnitude values M in FIG. 11A. Though not shown, FIG. 11C has the same heatmap scale as that shown referring to FIG. 11A.

Figure 12A:
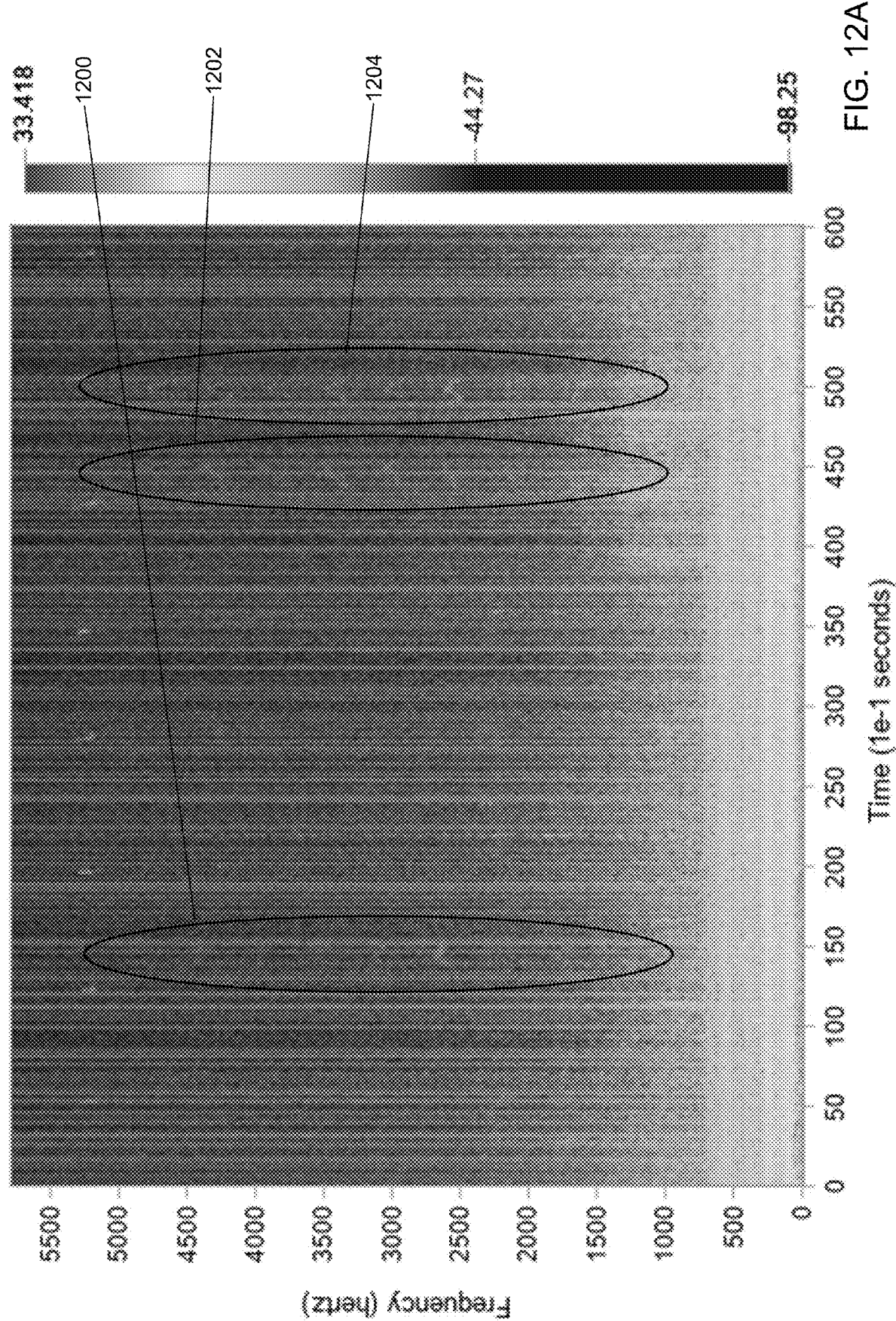
FIG. 12A shows a heatmap of one-minute of frequency data of a beehive during a second time interval generated using STFT in accordance with an illustrative embodiment.
Figure 12B:
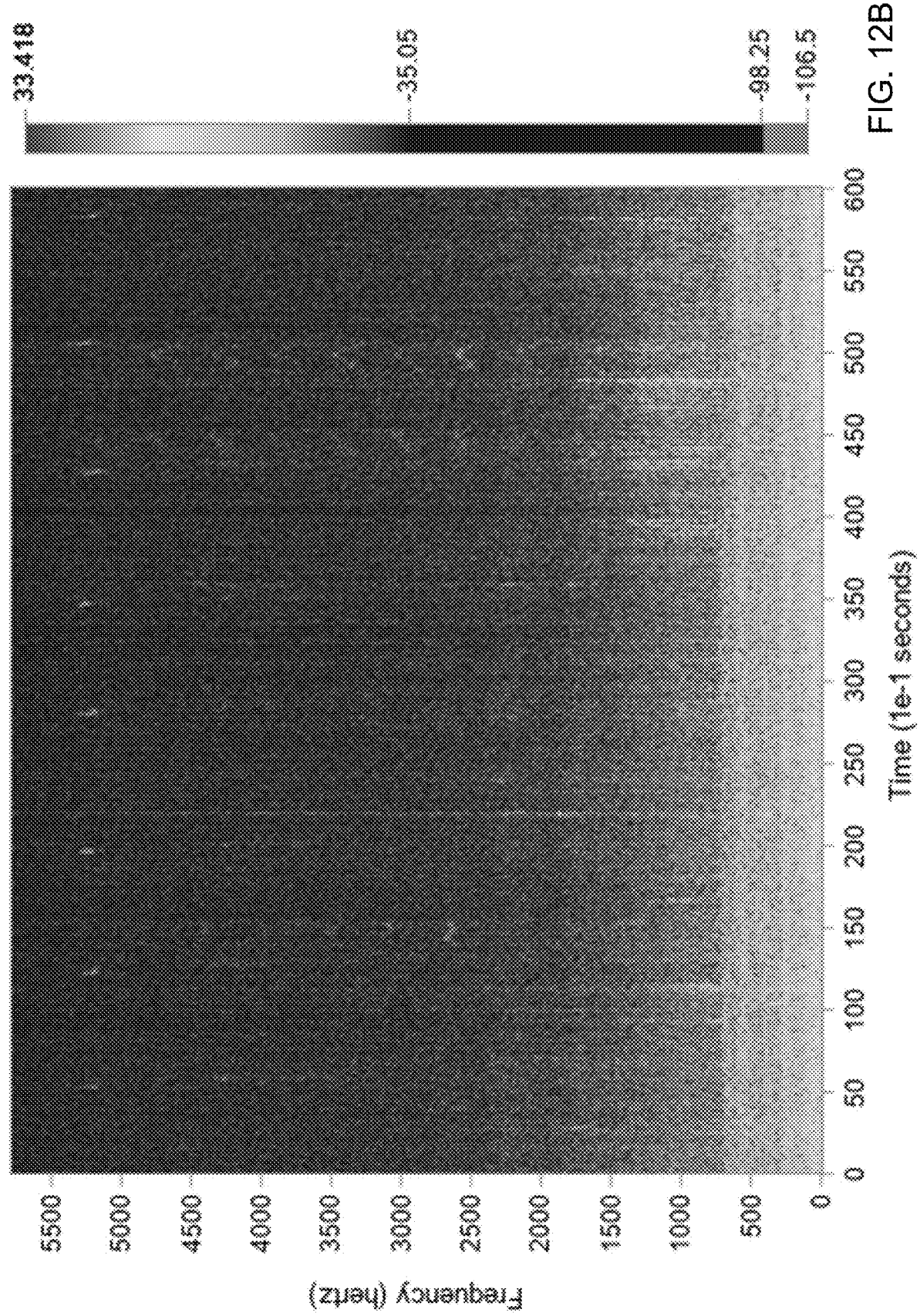
FIG. 12B shows a heatmap of a sparse matrix computed by applying RPCA to the heatmap data of FIG. 12A in accordance with an illustrative embodiment.

For further illustration, referring to FIG. 12A, a heatmap is shown in accordance with an illustrative embodiment that presents the matrix of magnitude values M in dB. FIG. 12A shows a heatmap of one-minute of acoustic frequency data of the beehive during a second time interval in accordance with an illustrative embodiment. The second time interval included sounds characterized as from a worker bee piping. For illustration, a first worker bee piping 1220, a second worker bee piping 1202, and a third worker bee piping 1204 are circled. Referring to FIG. 12B, a sparse matrix heatmap is shown in accordance with an illustrative embodiment that presents the sparse matrix S computed from the matrix of magnitude values M in FIG. 12A. Referring to FIG. 12C, a low-rank matrix heatmap is shown in accordance with an illustrative embodiment that presents the low-rank matrix L computed from the matrix of magnitude values M in FIG. 12A.

The two 1-minute segments of FIGS. 11A and 12A were selected from two different 10-minute segments of 21 hours of recorded beehive sounds. The 21 hours of recorded beehive sounds were converted into 10-minute sound files stored in dataset 126. The 21 hours of recorded beehive sounds also included external sounds from birds, crickets, cars, trains, and other sources. The STFT parameters were a rectangular window with a window length and FFT length of 16,384 and a window duration of 341.2 milliseconds (ms). $\lambda=0.009$ was used, and the IFFT parameters were set equal to the STFT parameter values. The beehive sounds were recorded for a newly made colony that was purposely made queenless. The new hive had eggs from one to three days old so the worker bees could make their own queen as soon as they realized they were queenless. Referring to FIGS. 11A to 11C and 12A to 12C, the low-rank matrix L contains little evidence of the random noises that otherwise obscure a general hum of the beehive. As a result, the low-rank matrix L provides a reasonable approximation of the general hum of the beehive. The low-rank results describing the hum were relatively consistent over each 10-minute period. As a result, the hum of the beehive can be measured by calculating a median magnitude for each frequency bin over a 10-minute period.

Figure 13A:
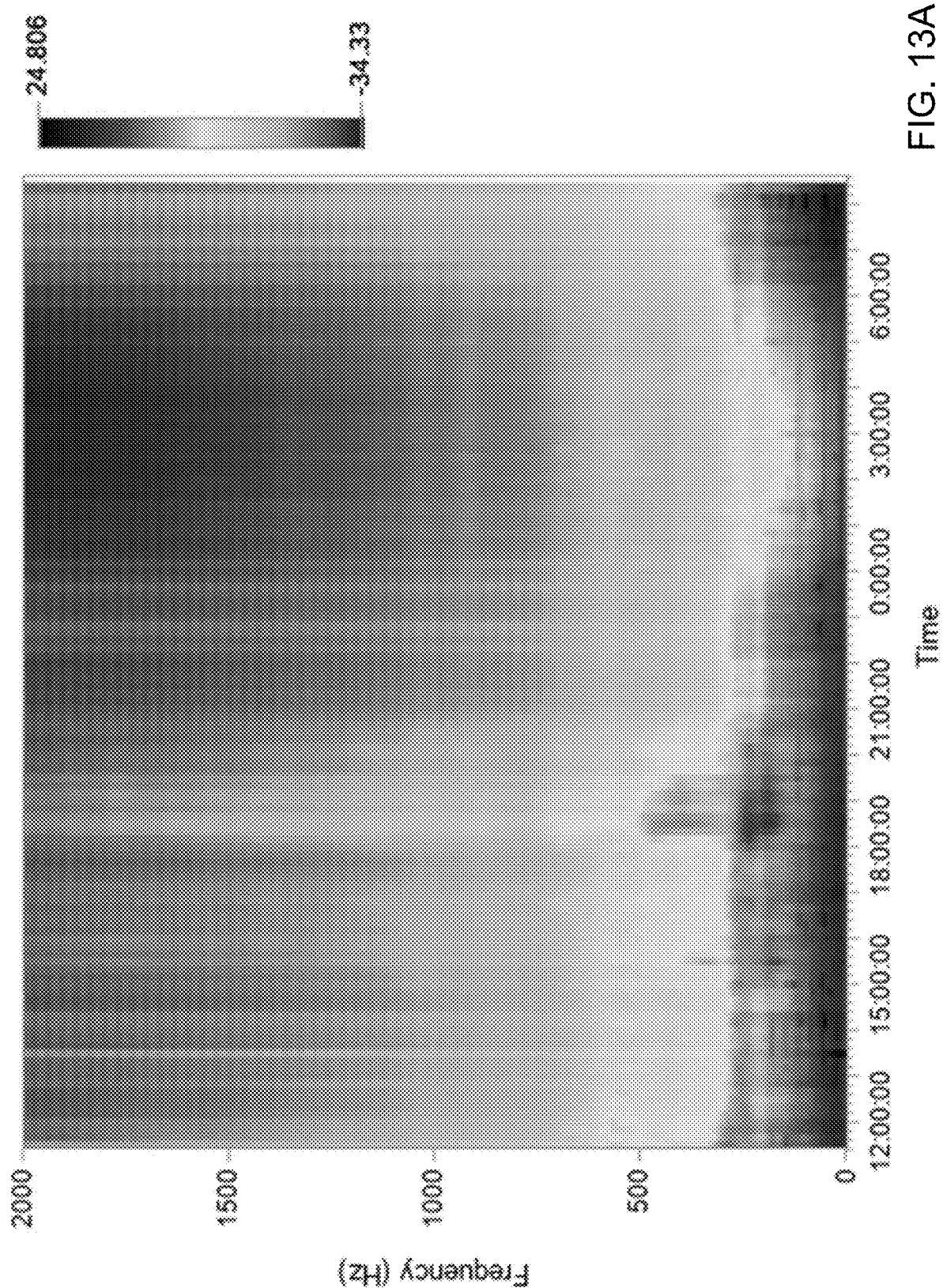
FIG. 13A shows a heatmap of a low-rank matrix computed by applying RPCA to a 21-hour period of frequency data of a beehive generated using STFT in accordance with an illustrative embodiment.
Figure 13B:
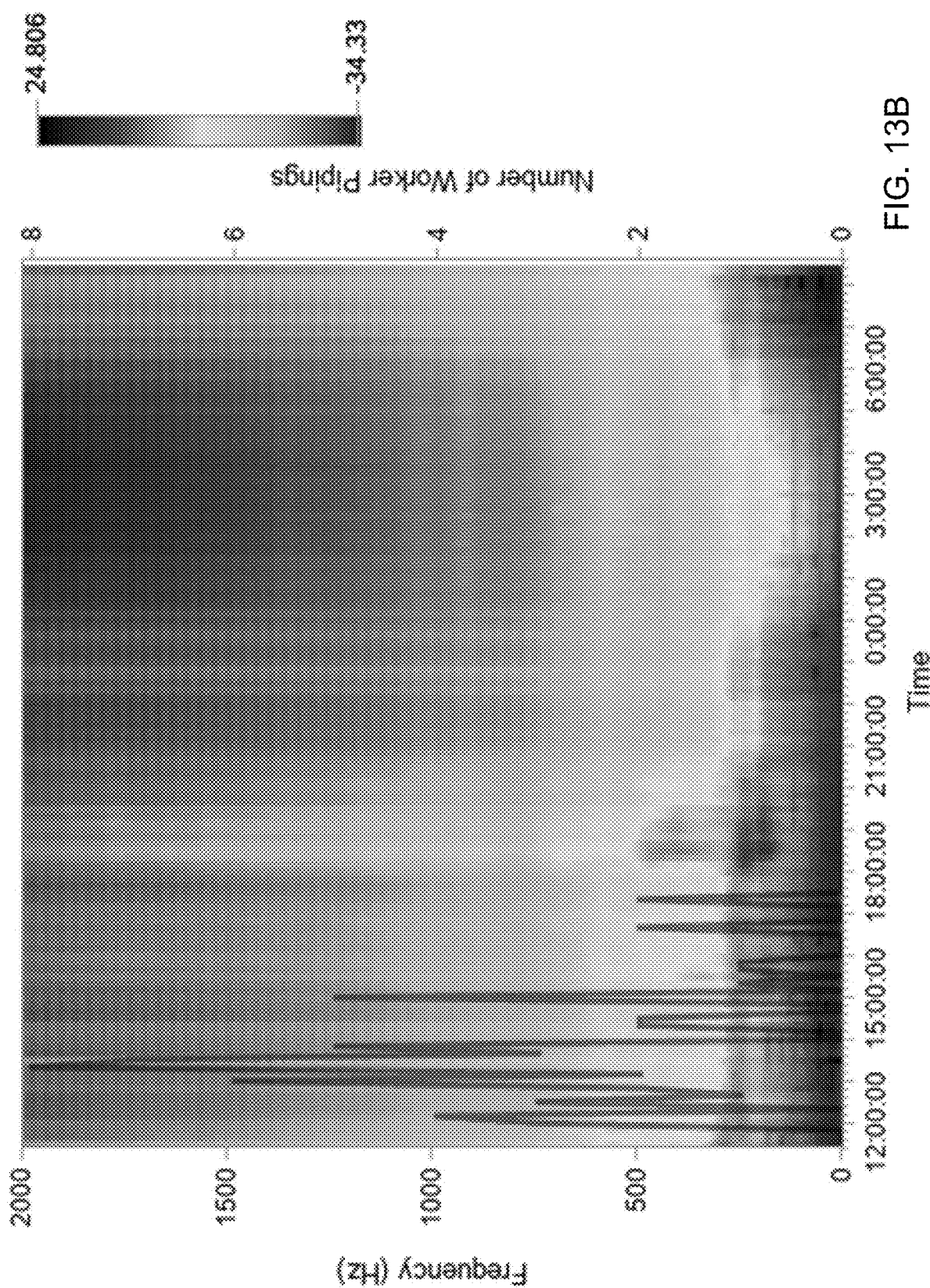
FIG. 13B shows the heatmap of FIG. 13A with worker pipings overlaid on the heatmap in accordance with an illustrative embodiment.

FIG. 13A shows a heatmap of the low-rank matrix L computed by applying RPCA to the entire 21-hour period of recorded beehive sounds in accordance with an illustrative embodiment. FIG. 13B shows the heatmap of FIG. 13A with worker pipings overlaid on the heatmap in accordance with an illustrative embodiment. FIG. 13B shows increased noise starting around 5:30 p.m. and settling down as sunset (8:20 p.m.) approaches and the worker bees come home for the night. Workers fly at a frequency of 250 Hz, so it is likely that some of the increased activity (in the range of 200-270 Hz) is due to the workers returning. There is increased noise at much higher frequencies as well. Activity resumes as the sun rises (6:20 a.m.). Most of the piping sounds—more than 70%—happen within the first 2.5 hours and the worker piping stops altogether 6 hours after the split occurred.

Figure 14A:
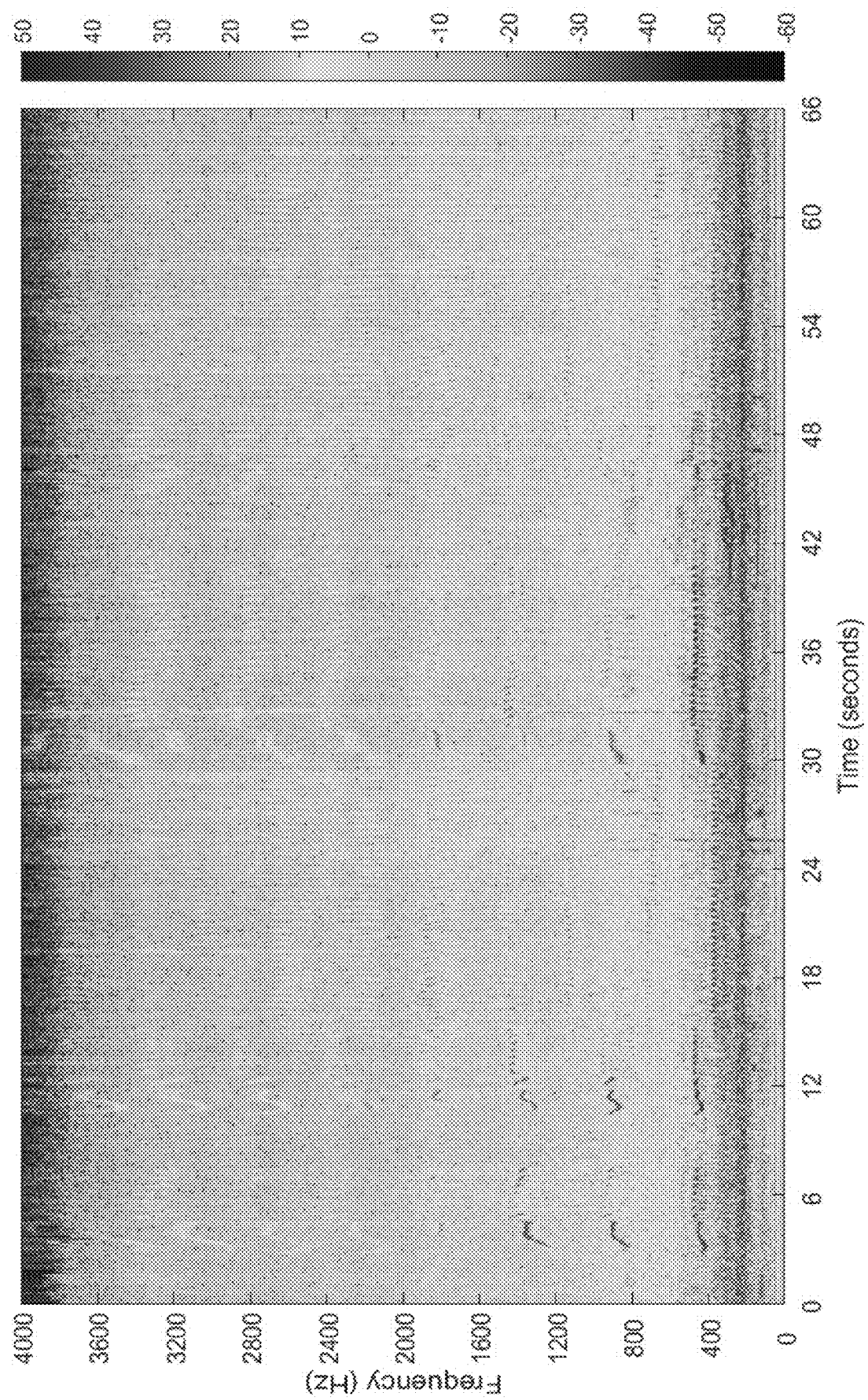
FIG. 14A shows a heatmap of a 66 second time period of frequency data of the beehive generated using STFT in accordance with an illustrative embodiment.

Reviewing the sparse matrix heatmaps and listening to the respective foreground sounds, thirty minutes after the split occurred, a faint worker piping that sounds like a virgin queen toot was detected. The frequency range and length of the worker piping was 408-451 Hz for 1.5-1.6 seconds and was very close to the frequency range and length of a first syllable of a recording obtained of a virgin queen tooting that was 408-470 Hz for 1.4-1.7 seconds. FIG. 14A shows a heatmap of a 66 second time period of the 21-hour period of recorded beehive sounds during which a queen bee was piping in accordance with an illustrative embodiment.

In an operation 224, the IFFT is applied to the low-rank matrix L with the IFFT parameters indicated in operation 210 to define, for example, sounds associated with the low-rank matrix that may be referred to as background sound. A phase matrix is computed, assuming that the phase does not change from the original STFT output during the decomposition, as $$\theta = \tan^{-1}\frac{im}{re},$$

where im is an imaginary part, and re is a real part of the STFT output. IFFT is performed on each column constructed as $m_l \cos\theta + im_l \sin\theta$, where $m_l$ is the low-rank magnitude value. The background sound signal can be constructed as a concatenation of the real part of the IFFT output from each column.

In an operation 226, the IFFT is applied to the sparse matrix S with the IFFT parameters indicated in operation 210 to define, for example, sounds associated with the sparse matrix that may be referred to as foreground sound. IFFT is performed on each column constructed as $m_s \cos\theta + im_s \sin\theta$, where $m_s$ is the sparse magnitude value. The foreground sound signal can be constructed as a concatenation of the real part of the IFFT output from each column.

In an operation 228, the heatmaps may be output, for example, by storing to computer-readable medium 108, by presentation on display 116, by printing on printer 120, etc. The transformed low-rank matrix L and the transformed sparse matrix S may be output, for example, by storing to computer-readable medium 108, by playing on speaker 118, etc.

Figure 2B:
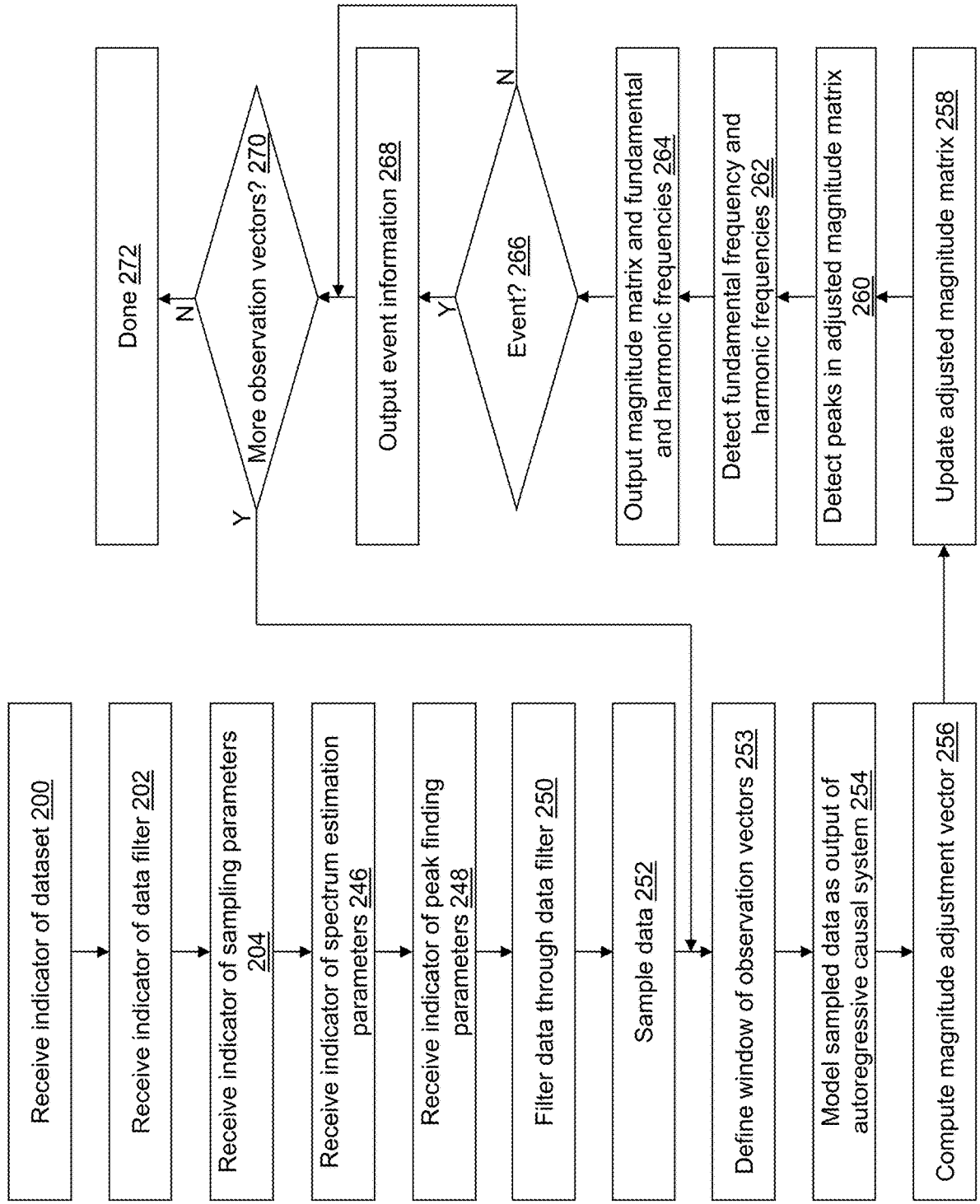
FIG. 2B depicts a flow diagram illustrating examples of detection operations performed by the monitoring device of FIG. 1 in accordance with an illustrative embodiment.

Referring to FIG. 2B, example operations associated with frequency detection application 124 are described. Additional, fewer, or different operations may be performed depending on the embodiment of frequency detection application 124. The order of presentation of the operations of FIG. 2B is not intended to be limiting. Although some of the operational flows are presented in sequence, the various operations may be performed in various repetitions, concurrently (in parallel, for example, using threads and/or distributed computing system 128), and/or in other orders than those that are illustrated. For example, a user may execute frequency detection application 124, which causes presentation of a first user interface window, which may include a plurality of menus and selectors such as drop-down menus, buttons, text boxes, hyperlinks, etc. associated with frequency detection application 124 as understood by a person of skill in the art. The plurality of menus and selectors may be accessed in various orders. An indicator may indicate one or more user selections from a user interface, one or more data entries into a data field of the user interface, one or more data items read from computer-readable medium 108 or otherwise defined with one or more default values, etc. that are received as an input by frequency detection application 124.

Similar to monitoring application 122, frequency detection application 124 may perform operations 200 to 204.

In an operation 246, a seventh indicator is received that indicates a value for one or more parameters to estimate a spectrum. In an alternative embodiment, the seventh indicator may not be received. For example, a default value for the one or more parameters to estimate the spectrum may be stored, for example, in computer-readable medium 108 and used automatically. In another alternative embodiment, the value for the one or more parameters to estimate the spectrum application may not be selectable. Instead, fixed, predefined values may be used. For example, the seventh indicator may indicate a window length, an overlap ratio, a number of points, and/or a model order of an autoregressive system. Illustrative values include a window length of 150 milliseconds, an overlap ratio of 50%, a number of points of 8,196, and/or an AR model order N=50. The AR model order may be in the range of 20 to 60 depending on the data. Usually the higher the order, the better the spectral quality, but the slower the model estimation is.

In an operation 248, an eighth indicator is received that indicates a value for one or more parameters to find peaks in a frequency spectrum. In an alternative embodiment, the eighth indicator may not be received. For example, a default value for the one or more parameters to find peaks may be stored, for example, in computer-readable medium 108 and used automatically. In another alternative embodiment, the value for the one or more parameters to find peaks may not be selectable. Instead, fixed, predefined values may be used. For example, the eighth indicator may indicate a frequency range within which a fundamental frequency is expected. For example, for human speech, the frequency range may be 100 to 300 hertz (Hz); for a queen bee piping sound in beehive monitoring, the frequency range may be 300 to 500 Hz; for a human wheezing cough sound, the frequency range may be 400 to 1600 Hz; for a human snoring sound, the frequency range may be 30 to 250 Hz. The frequency range is selected based on the data stored in dataset 126 and an event to detect. For illustration, an illustrative peak finder algorithm is provided by a SlicePeakFinder algorithm of SAS® Event Stream Processing.

In an operation 250, the data filter is applied to the data read from dataset 126 based on the filter type and/or the filter parameters indicated in operation 202, if any.

In an operation 252, the filtered data is sampled based on the sampling parameter value indicated in operation 204.

In an operation 253, a window of observation vectors is defined from the sampled data based on the values for the window length of 150 milliseconds, the overlap ratio of 50%, and the number of points of 8196 indicated in operation 246 for illustration.

In an operation 254, the defined window of observation vectors is modeled as an output of an autoregressive (AR) causal system to estimate a power spectrum. Each segment of the sound signal x(n) is modeled as the output of the AR causal system driven by a white noise sequence e(n). A relationship between the input e(n) and output signal x(n) can be expressed as $$x(n) + \sum_{i=1}^{N} a_i x(n-i) = e(n),$$

where $a_i$ is an $i^{th}$ coefficient, n is a number of observation vectors included in the defined window of observation vectors, and N is the AR model order indicated in operation 246. A corresponding transfer function of the AR causal system may be defined as $$H(z) = \frac{1}{1 + a_1 z^{-1} + a_2 z^{-2} + \ldots + a_N z^{-N}}.$$

The coefficients of the AR causal system $a_i$, i=1, 2, ..., N may be solved using a Yule-Walker method as described in Chapter 9 titled PARAMETRIC METHODS of the book *STATISTICAL SPECTRAL ANALYSIS A Nonprobabilistic Theory* authored by William A. Gardner and published by Prentice Hall in 1987.

Evaluating the transfer function of the AR causal system on a unit circle ($e^{-j\omega}$) results in a frequency response $H(e^{-j\omega})$. Since the spectrum of the input white noise is $\sigma^2$, the power spectrum of the input x(n) can be approximated by $$|X(e^{-j\omega})|^2 = \sigma^2 |H(e^{-j\omega})|^2$$

$$= \sigma^2 \left| \frac{1}{1 + a_1 e^{-j\omega} + a_2 e^{-2j\omega} + \ldots + a_N e^{-Nj\omega}} \right|^2.$$

The power spectrum values estimated may be stored as a next column of the matrix of magnitude values M. For example, the matrix of magnitude values M includes a column for each window of a plurality of windows defined in operation 253. Each cell of the matrix of magnitude values includes an estimated power spectrum value for a respective window and a respective frequency. For illustration, a full matrix of magnitude values M may be handled by discarding an oldest column and shifting one column to the left before the new column is appended. This can be implemented efficiently to avoid moving all of the data for each new column.

Since the magnitudes of higher-frequency components are much lower than those of the lower-frequency components, an adaptive magnitude adjustment scheme may be applied to the matrix of magnitude values M to compensate for the differences in magnitude. In an operation 256, a magnitude adjustment vector B is computed. For example, a mean of the matrix of magnitude values M is computed for each row to generate a column vector A that contains the mean of each respective row. The magnitude adjustment vector is computed as B=max(A)-A.

In an operation 258, an adjusted matrix of magnitude values $M_a$ is computed and updated, for example, using $M_a(:, i)=M(:, i)+B$, i=1, 2, ..., numCols, where numCols is a number of columns of the matrix of magnitude values M.

In an operation 260, a peak finding algorithm is used to detect peaks in a most recently added column of the adjusted matrix of magnitude values $M_a$ that is associated with a spectral curve computed for the window of observation vectors defined in operation 252.

In an operation 262, a fundamental frequency is detected by selecting a highest magnitude peak detected in the frequency range indicated in operation 248. A linear fit is used to find the harmonic frequencies of the fundamental frequency that are integer multiples of the fundamental frequency. For example, a strong peak in the frequency range that the fundamental frequency usually resides is identified. A linear curve is created that consists of frequency points that are integer multiples of the frequency of the identified strong peak. For peaks found by the peak finding algorithm, they need to be close enough to the linear curve to be qualified as a harmonic of the fundamental frequency to eliminate most peak due to noise. If multiple harmonic frequencies, such as 3 or 4, are located, the window very likely includes signals of interest.

In an operation 264, the adjusted matrix of magnitude values $M_a$ and the fundamental and harmonic frequencies may be output, for example, by storing to computer-readable medium 108, by presentation on display 116, by printing on printer 120, etc.

Figure 14B:
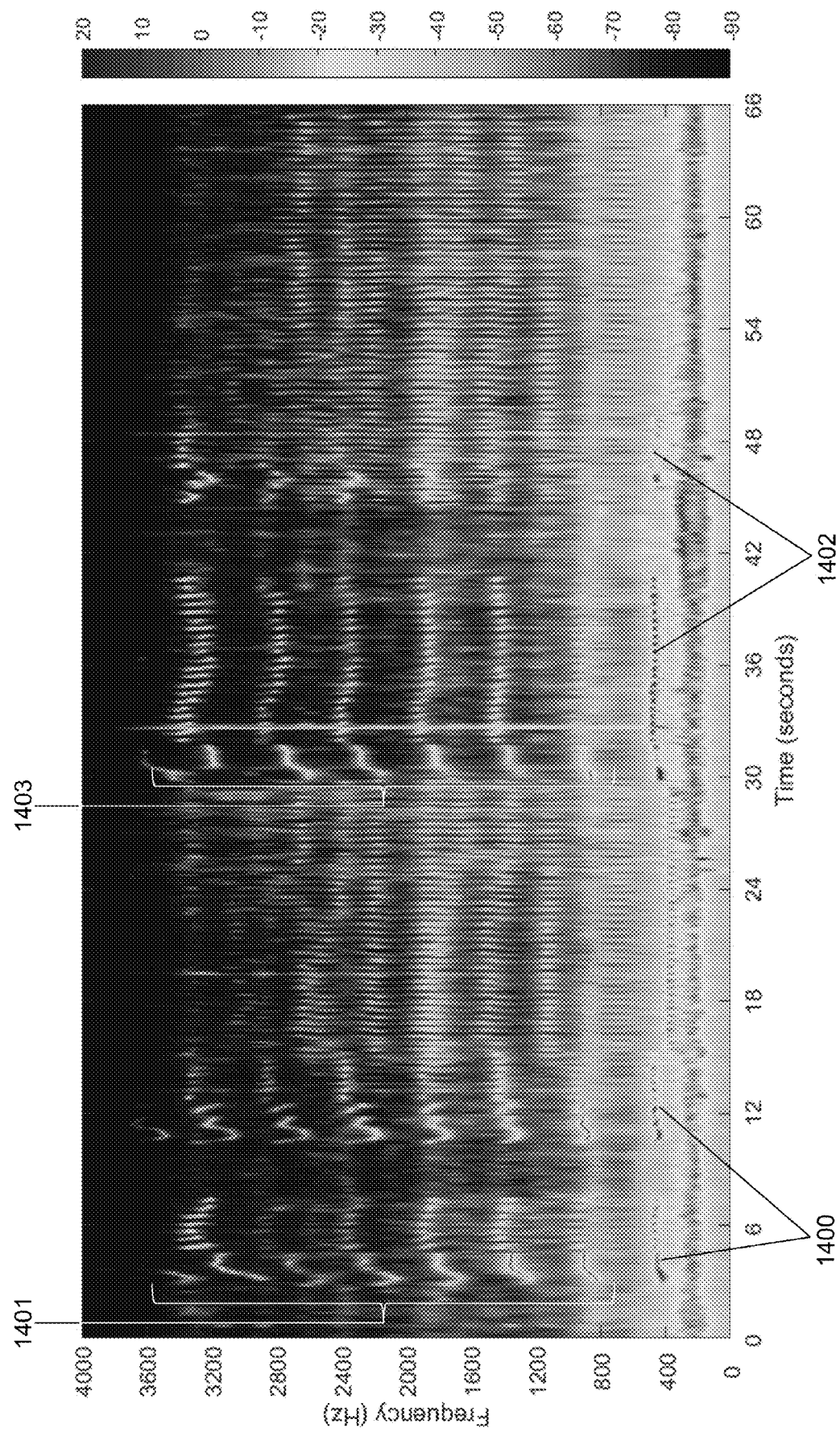
FIG. 14B shows a heatmap of the 66 second time period of FIG. 14A generated using an autoregressive model estimation method in accordance with an illustrative embodiment.

For illustration, referring to FIG. 14B, a heatmap of the matrix of magnitude values M for the 66 second queen piping time period of FIG. 14A is shown in accordance with an illustrative embodiment. First queen piping sounds 1400 and second queen piping sounds 1402 are strong in magnitude at the fundamental frequencies between 352 and 470 Hz. The fundamental frequency of the first queen bee's tooting at 408-470 Hz is higher than the second queen's quacking at 352-382 Hz. First harmonic frequencies 1401 are shown for the first queen piping sounds 1400, and second harmonic frequencies 1403 are shown for the second queen piping sounds 1402. The frequency range and variation in the queen's first toot syllables are similar to those of the observed worker piping. In comparison, the heatmap of FIG. 14B is much less noisy than the heatmap of FIG. 14A, which is helpful in detecting the frequencies.

Figure 15:
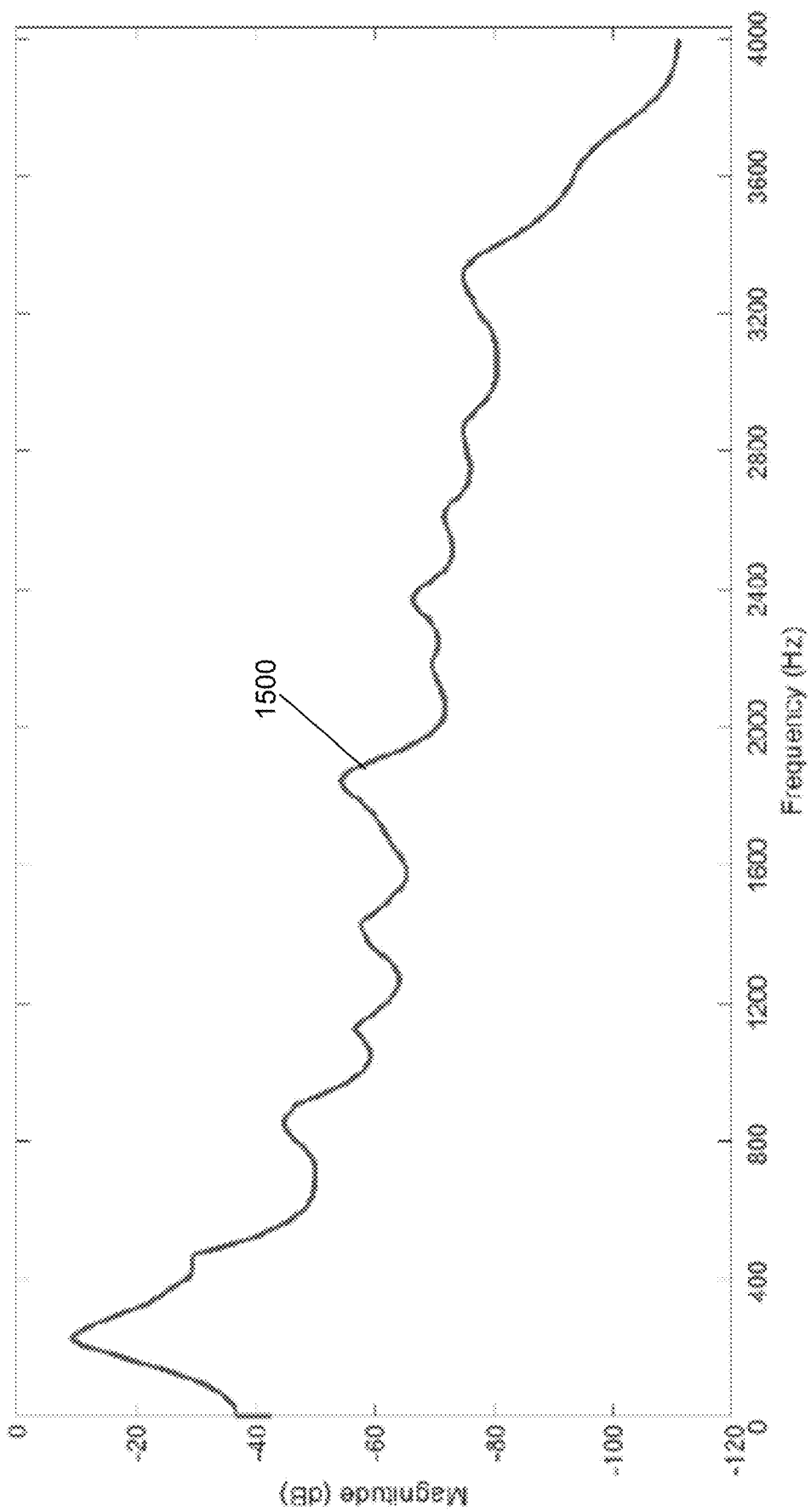
FIG. 15 shows an average spectral magnitude as a function of frequency for a queen piping time period in accordance with an illustrative embodiment.
Figure 16:
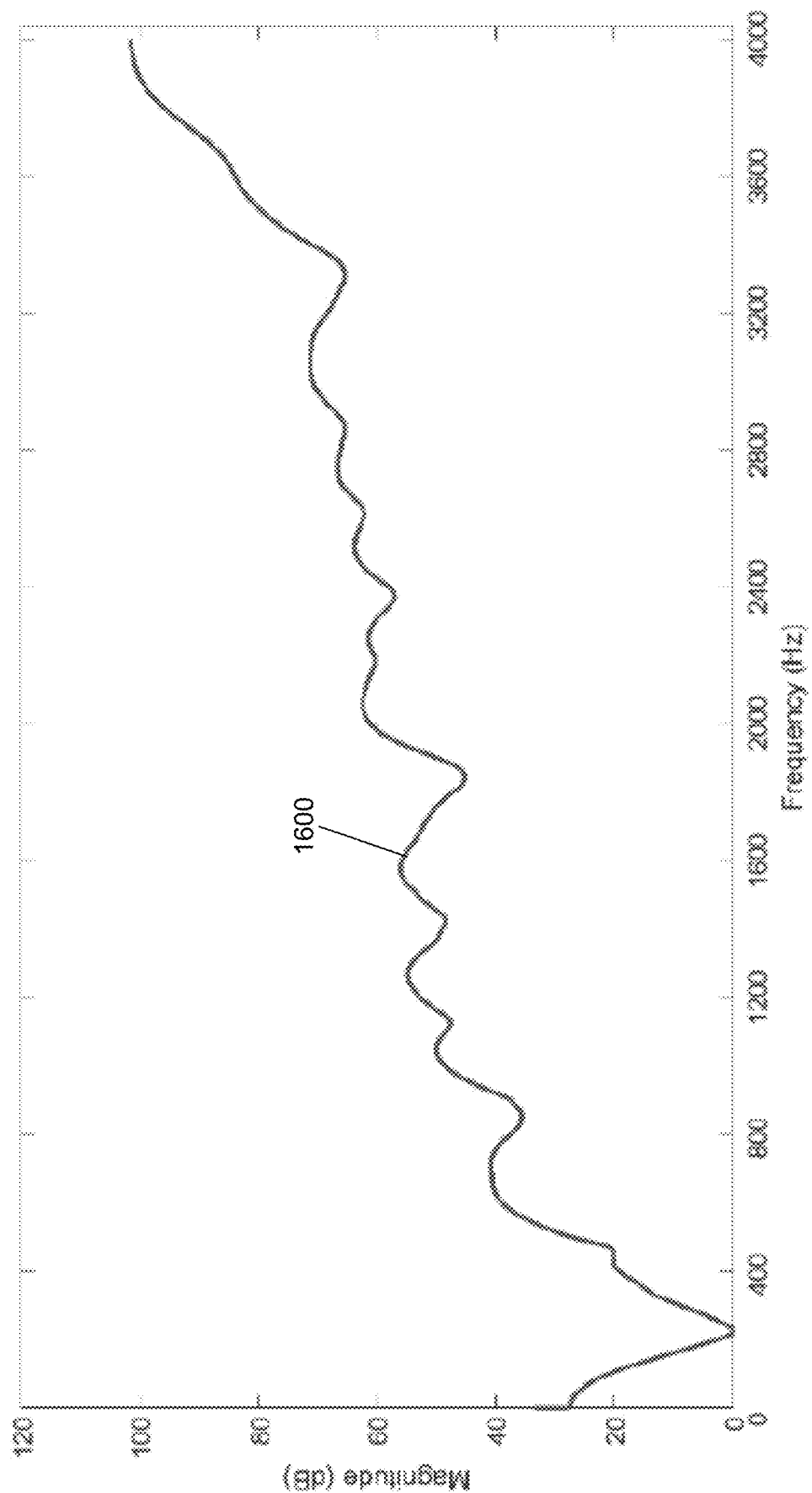
FIG. 16 shows an adjusted spectral magnitude as a function of frequency for the queen piping time period of FIG. 15 in accordance with an illustrative embodiment.

Referring to FIG. 15, an average spectral magnitude curve 1500 is shown for the queen piping time period in accordance with an illustrative embodiment. Referring to FIG. 16, an adjusted spectral magnitude curve 1600 is shown of magnitude adjustment vector B for the queen piping time period of FIG. 15 in accordance with an illustrative embodiment.

Figure 17:
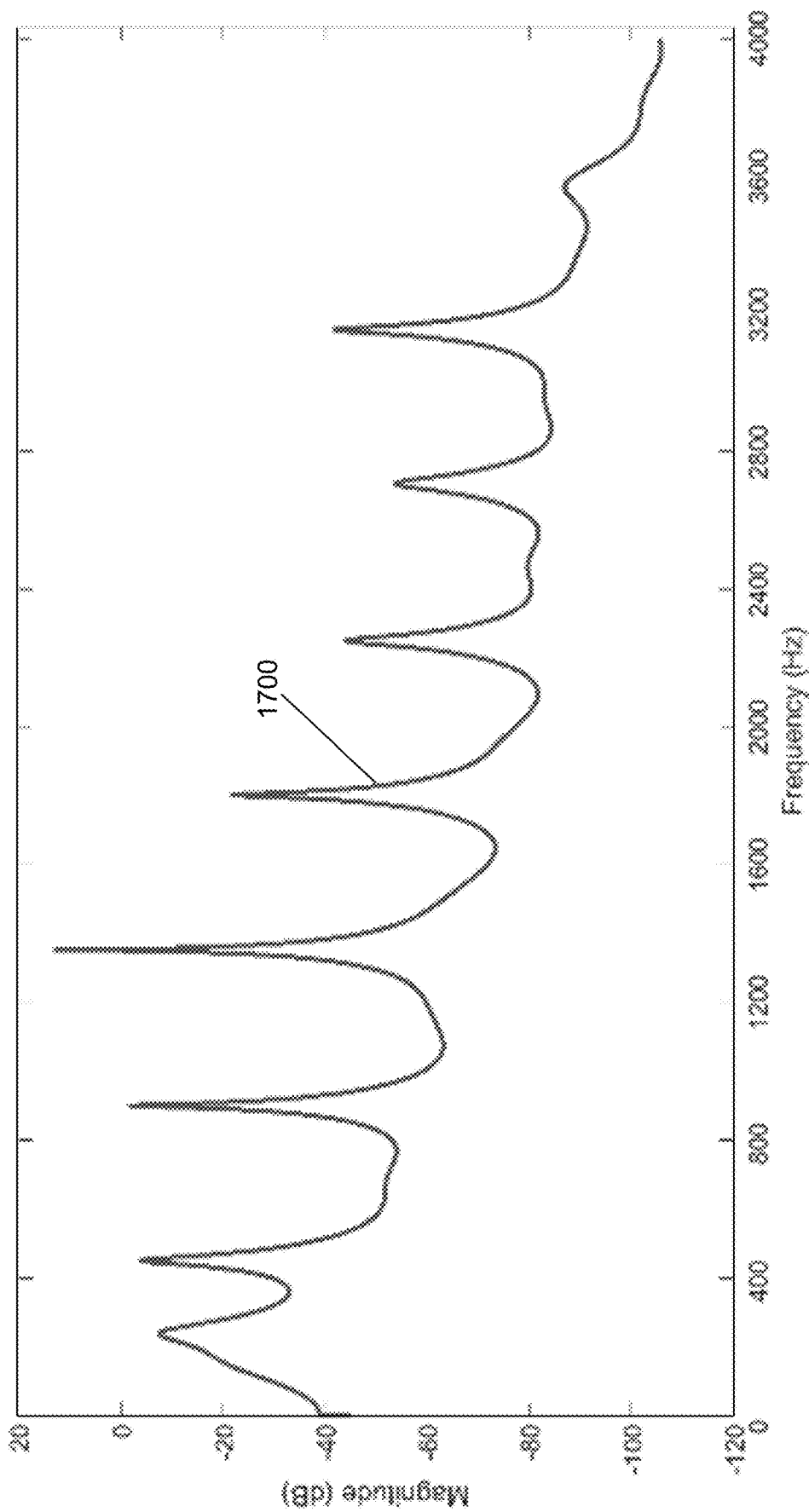
FIG. 17 shows a spectral magnitude as a function of frequency for the queen piping time period of FIG. 15 before a magnitude adjustment in accordance with an illustrative embodiment.
Figure 18:
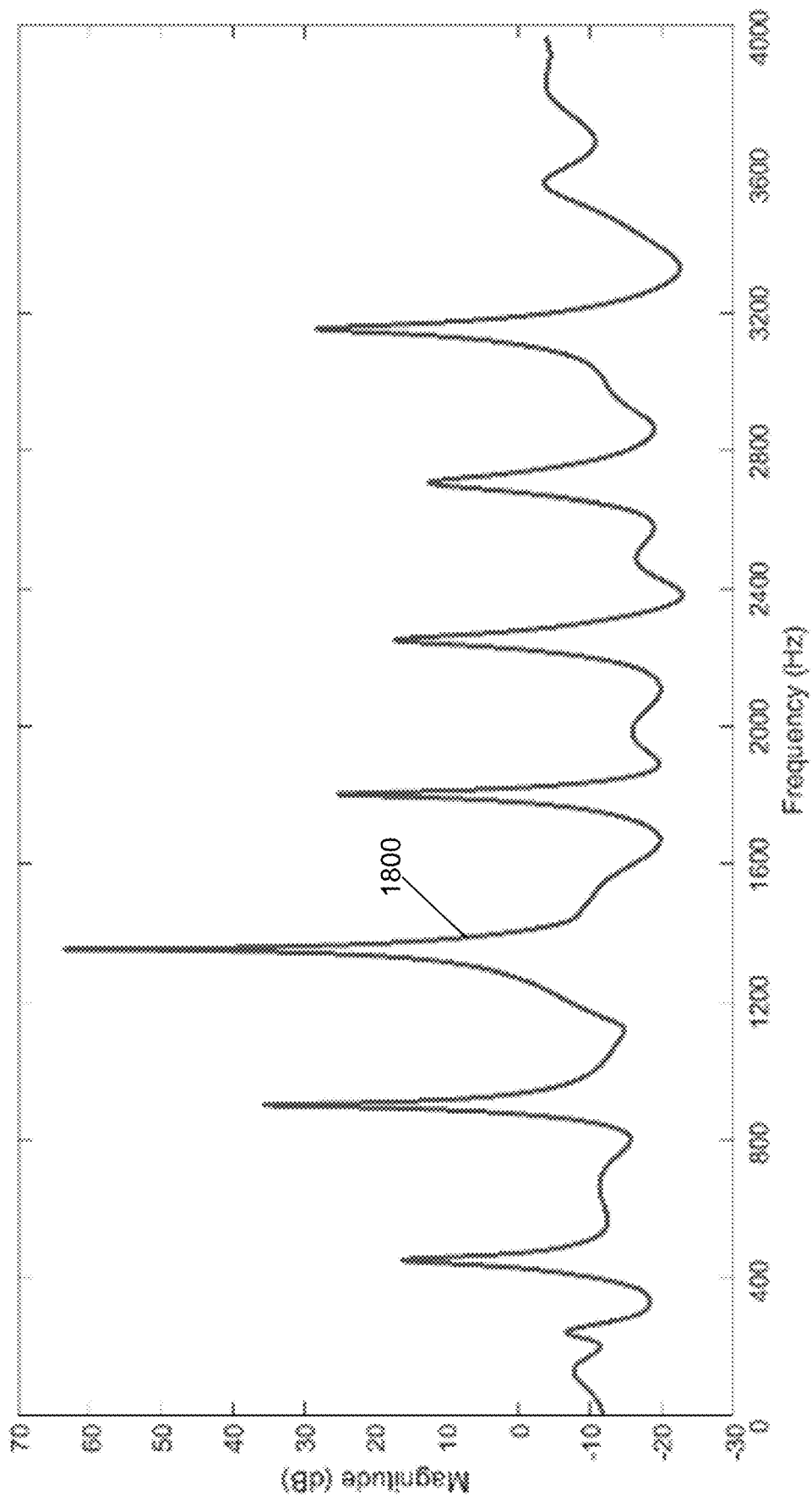
FIG. 18 shows a spectral magnitude as a function of frequency for the queen piping time period of FIG. 15 after a magnitude adjustment using the adjusted spectral magnitude of FIG. 16 in accordance with an illustrative embodiment.

Referring to FIG. 17, a spectral magnitude curve 1700 is shown for a 4.2 to 4.35 second time window of the queen piping time period of FIG. 15 before application of the adjusted spectral magnitude in accordance with an illustrative embodiment. Referring to FIG. 18, a spectral magnitude curve 1800 is shown for the 4.2 to 4.35 second time window of FIG. 17 after application of the adjusted spectral magnitude in accordance with an illustrative embodiment.

Figure 19A:
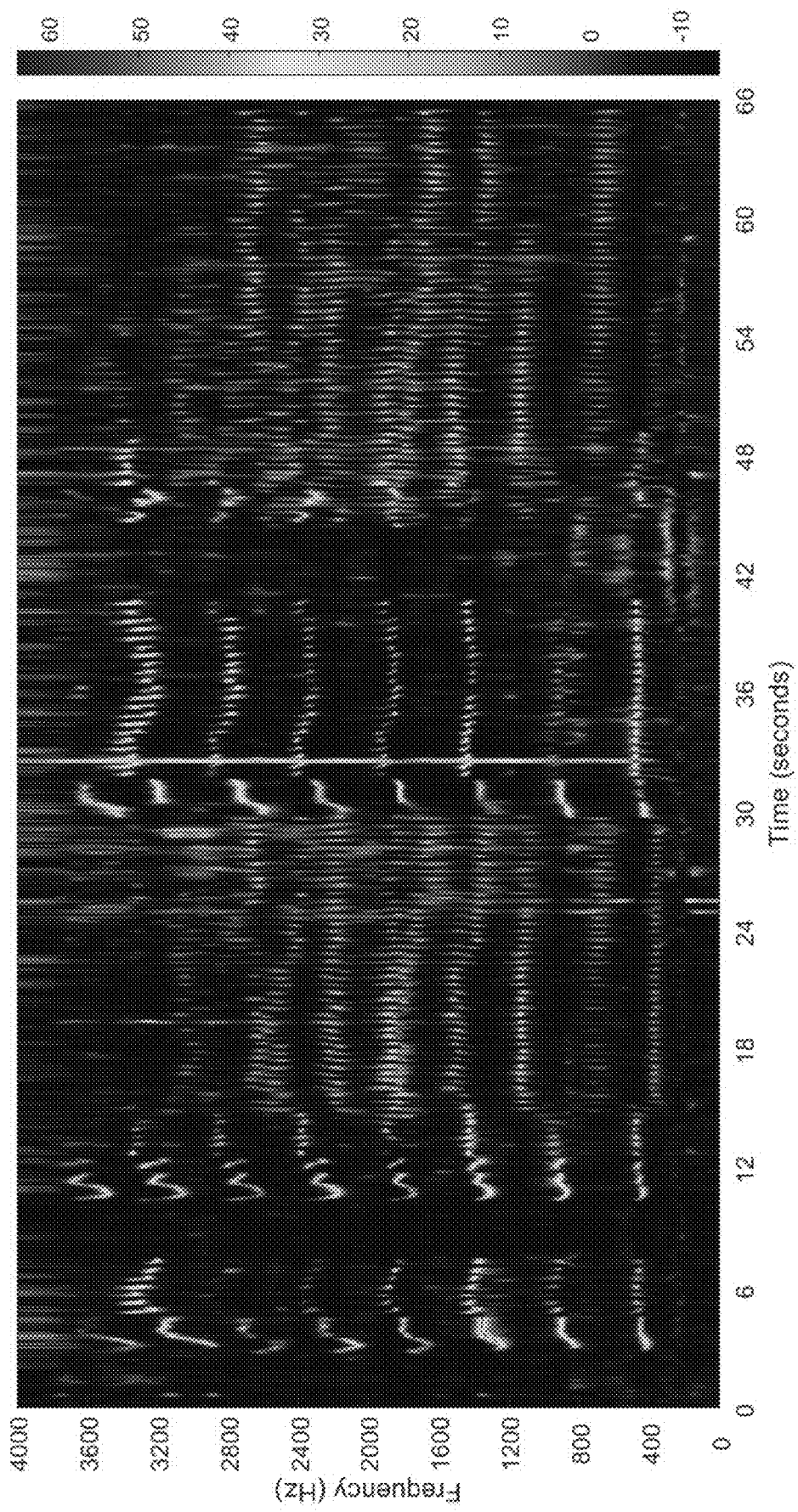
FIG. 19A shows a heatmap of the 66 second time period of FIG. 14A generated after the magnitude adjustment in accordance with an illustrative embodiment.
Figure 19B:
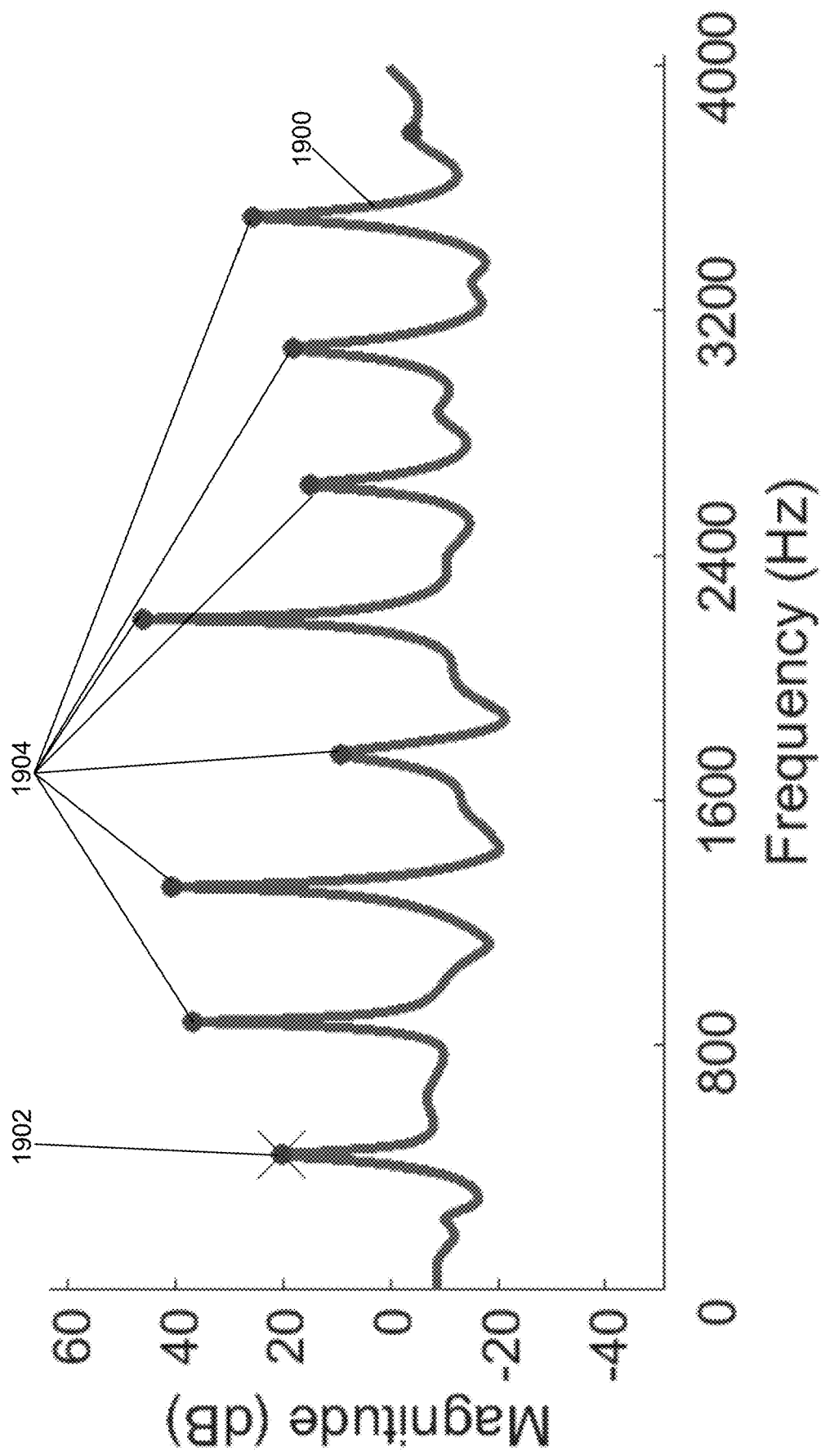
FIG. 19B shows a spectral magnitude as a function of frequency computed for the 66 second time period of FIG. 14A after the magnitude adjustment in accordance with an illustrative embodiment.

FIG. 19A shows a heatmap of the 66 second time period of FIG. 14A generated from adjusted matrix of magnitude values $M_a$ computed in operation 258 for each time window in accordance with an illustrative embodiment. Referring to FIG. 19B, a spectral magnitude curve 1900 is shown of the adjusted matrix of magnitude values $M_a$ computed in operation 258 for an 11.25 to 11.40 second time window of the queen piping time period of FIG. 15 in accordance with an illustrative embodiment. A fundamental frequency 1902 of 441 Hz detected in operation 262 and harmonic frequencies 1904 are shown based on detecting a peak frequency between 300 and 500 Hz.

Figure 20:
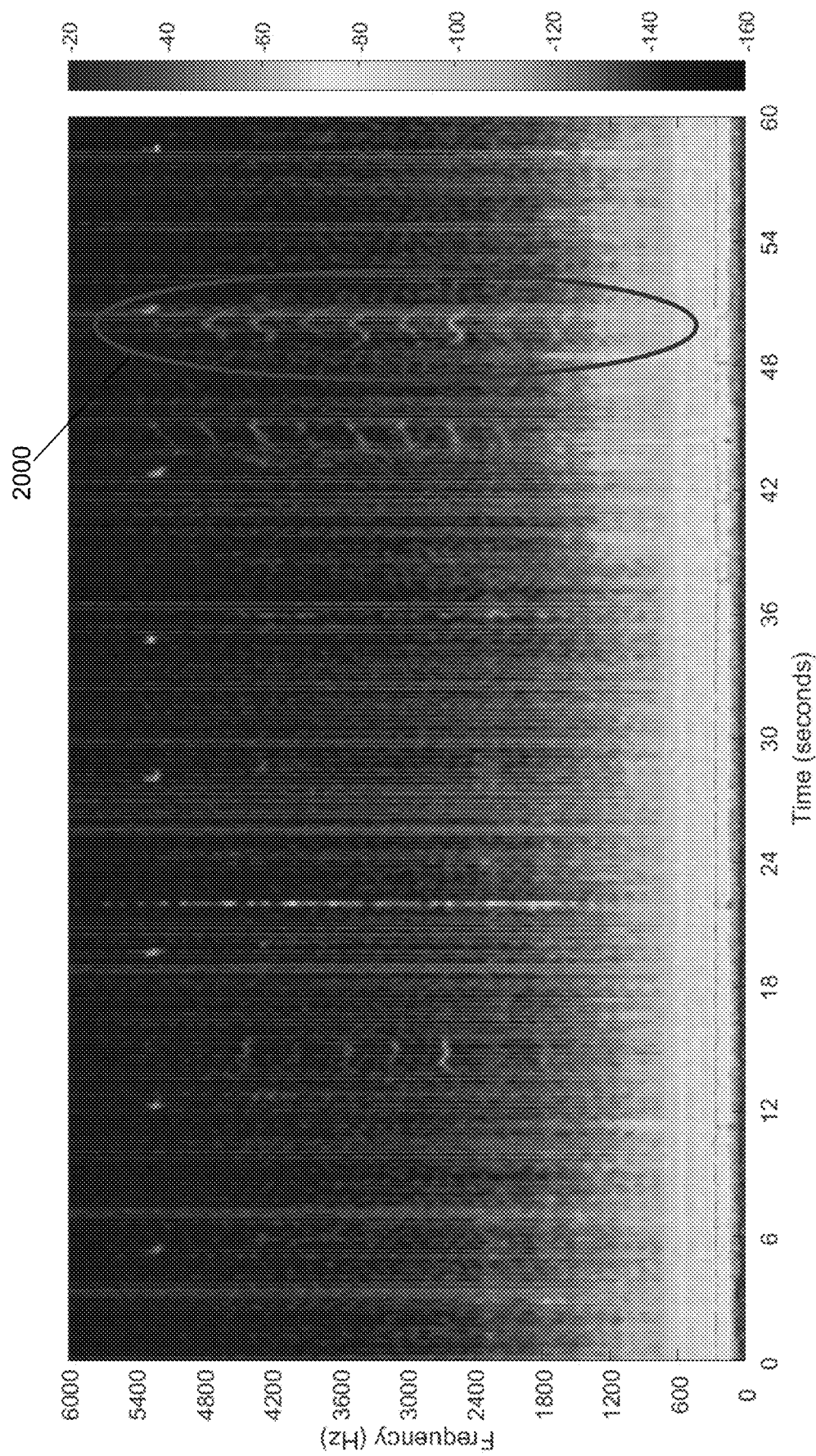
FIG. 20 shows a heatmap of a 60 second time period for a worker piping time period generated using an autoregressive model estimation method in accordance with an illustrative embodiment.
Figure 21:
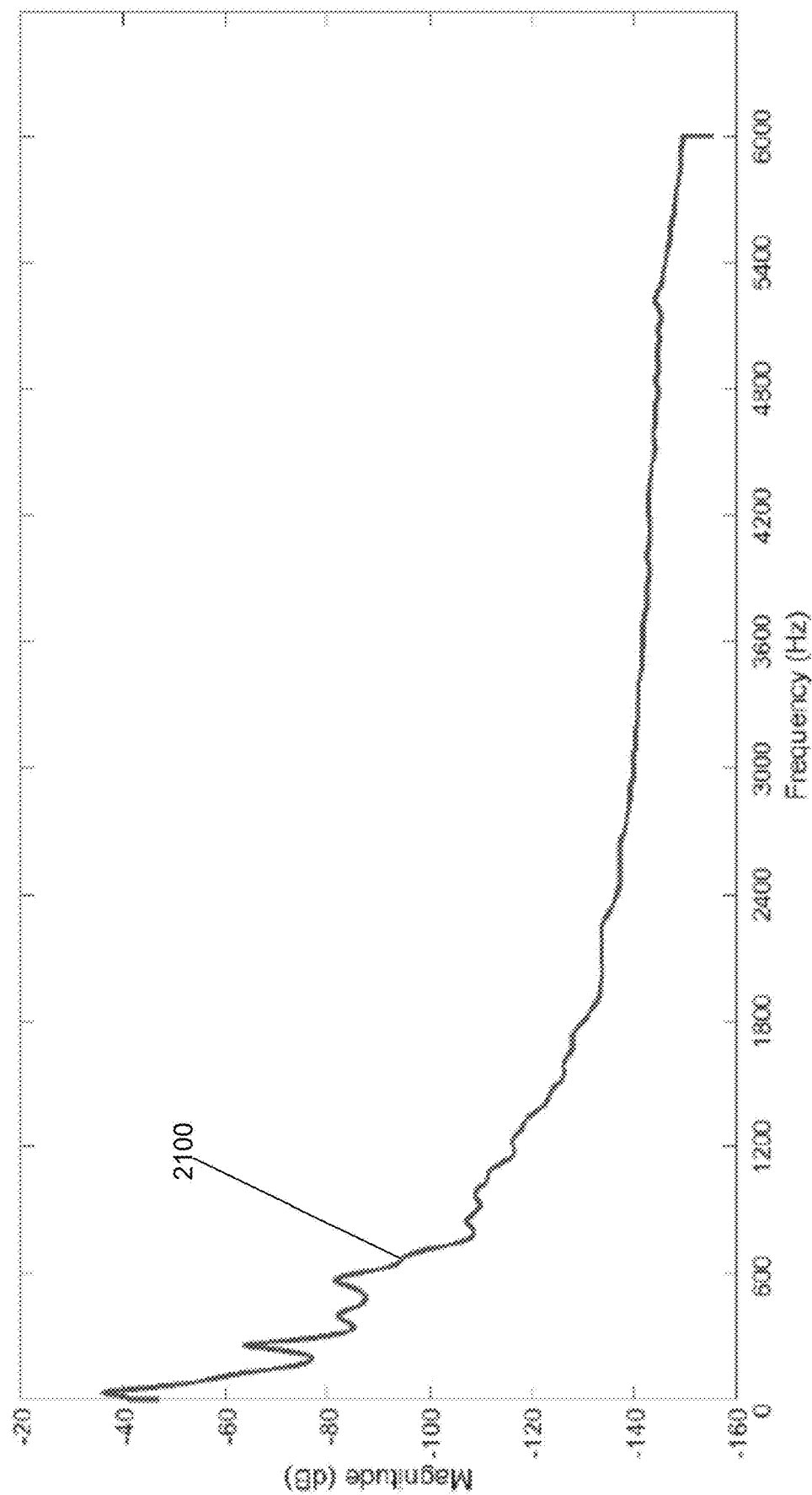
FIG. 21 shows an average spectral magnitude as a function of frequency for the worker piping time period in accordance with an illustrative embodiment.
Figure 22:
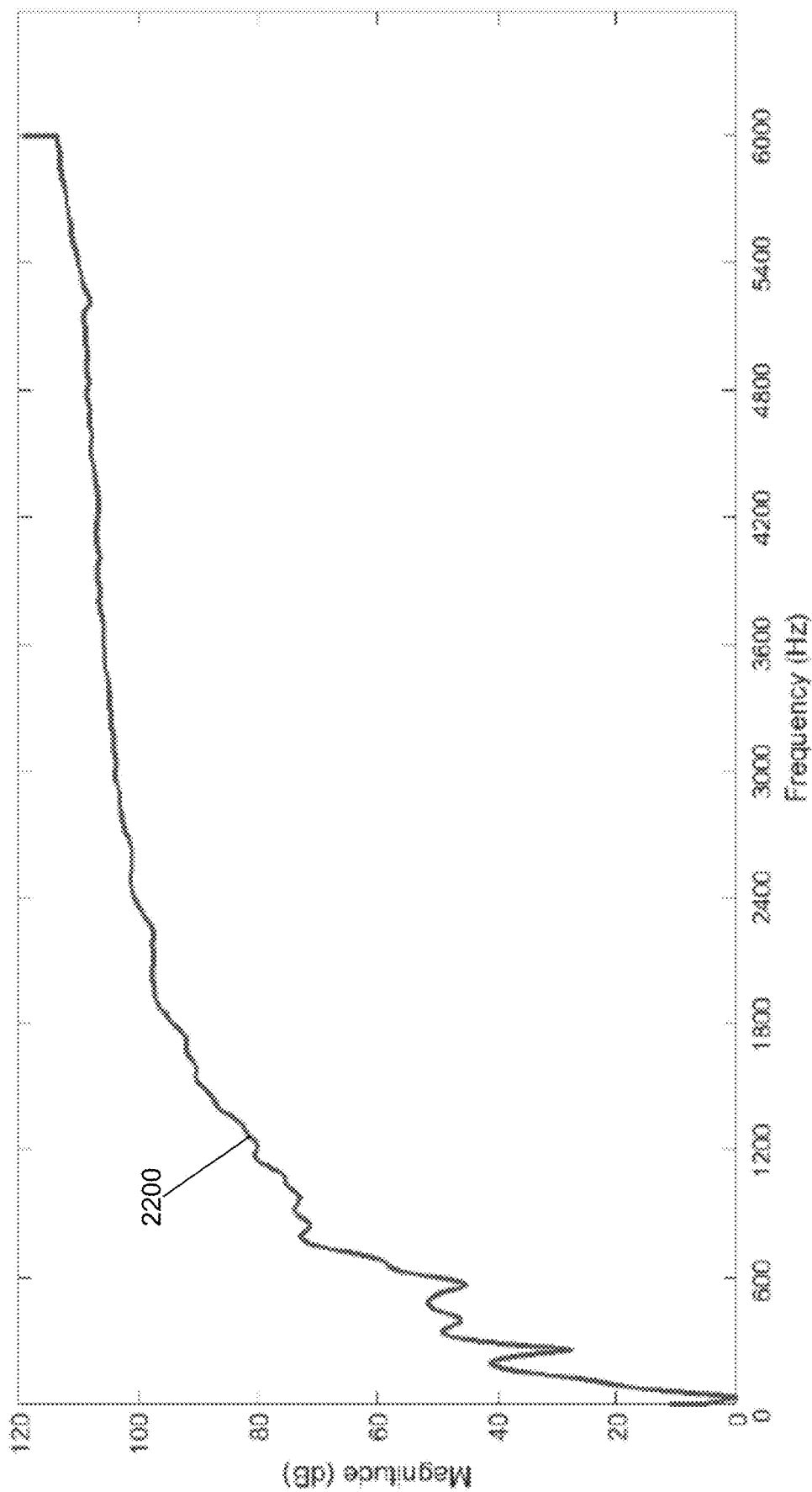
FIG. 22 shows an adjusted spectral magnitude as a function of frequency for the worker piping time period of FIG. 21 in accordance with an illustrative embodiment.

For further illustration, referring to FIG. 20, a heatmap is shown of the matrix of magnitude values M for a 60 second worker piping time period taken from a 66th minute of the 21-hour recording in accordance with an illustrative embodiment. A worker piping 2000 that occurs at around 50 seconds is the most visible of the worker pipings. Referring to FIG. 21, an average spectral magnitude curve 2100 is shown for the worker piping time period in accordance with an illustrative embodiment. Referring to FIG. 22, an adjusted spectral magnitude curve 2200 of magnitude adjustment vector B is shown for the worker piping time period in accordance with an illustrative embodiment.

Figure 23:
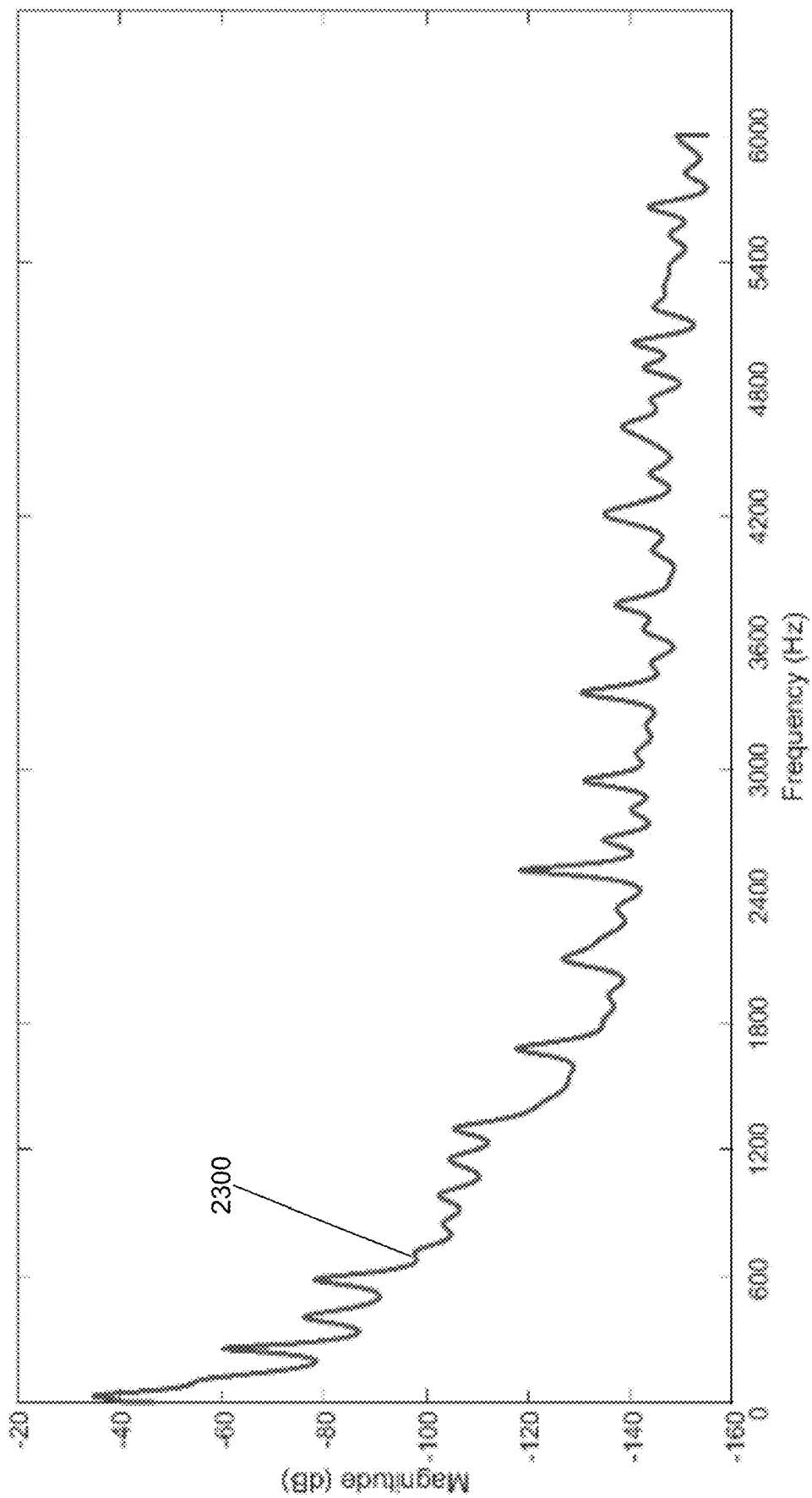
FIG. 23 shows a spectral magnitude as a function of frequency for the worker piping time period of FIG. 21 before a magnitude adjustment in accordance with an illustrative embodiment.
Figure 24:
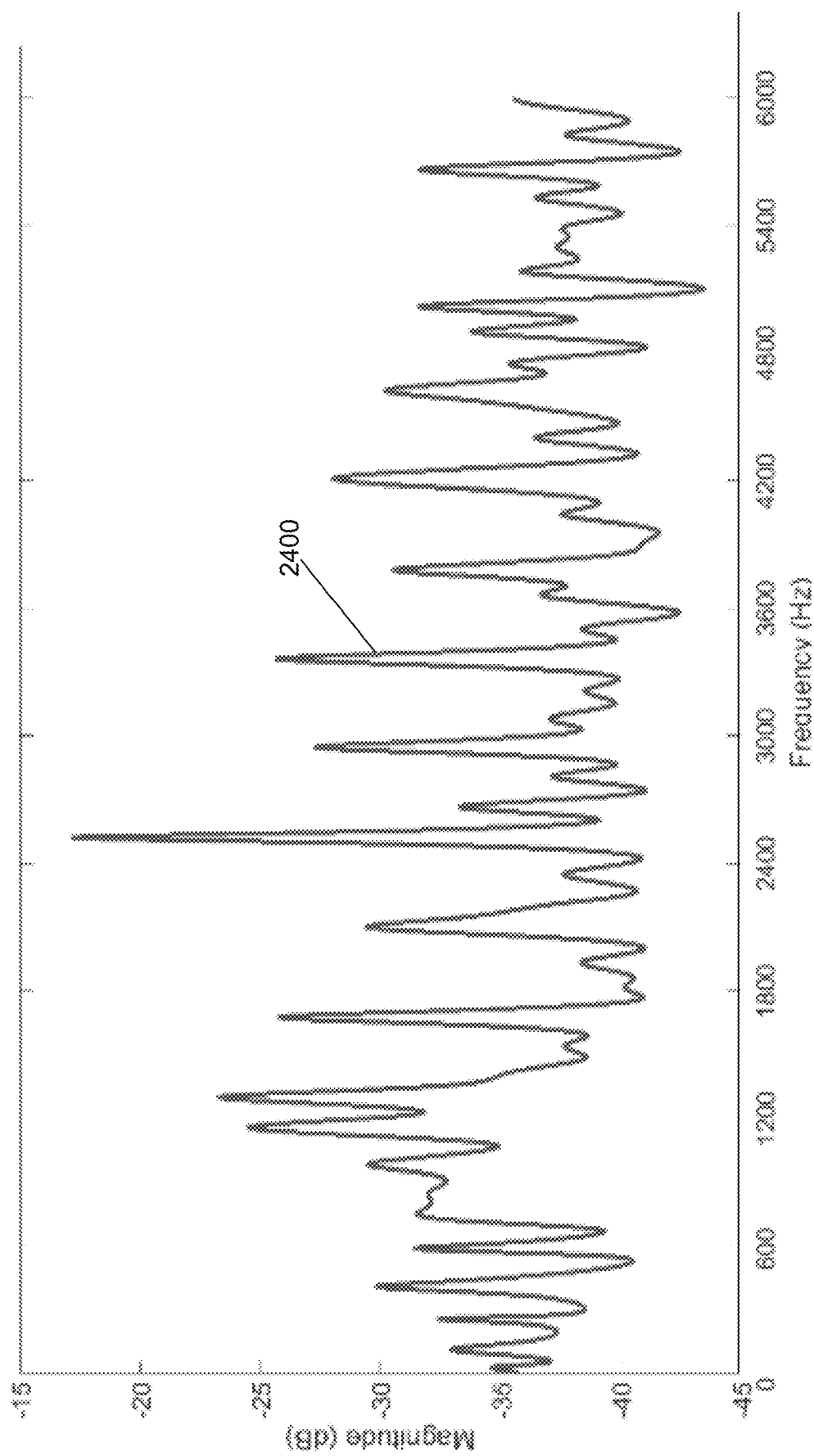
FIG. 24 shows a spectral magnitude as a function of frequency for the worker piping time period of FIG. 21 after a magnitude adjustment using the adjusted spectral magnitude of FIG. 22 in accordance with an illustrative embodiment.

Referring to FIG. 23, a spectral magnitude curve 2300 is shown for a 49.5 to 49.8 second time window of the worker piping time period before application of the adjusted spectral magnitude in accordance with an illustrative embodiment. Referring to FIG. 24, a spectral magnitude curve 2400 is shown for a 49.5 to 49.8 second time window of the worker piping time period after application of the adjusted spectral magnitude in accordance with an illustrative embodiment.

Figure 25:
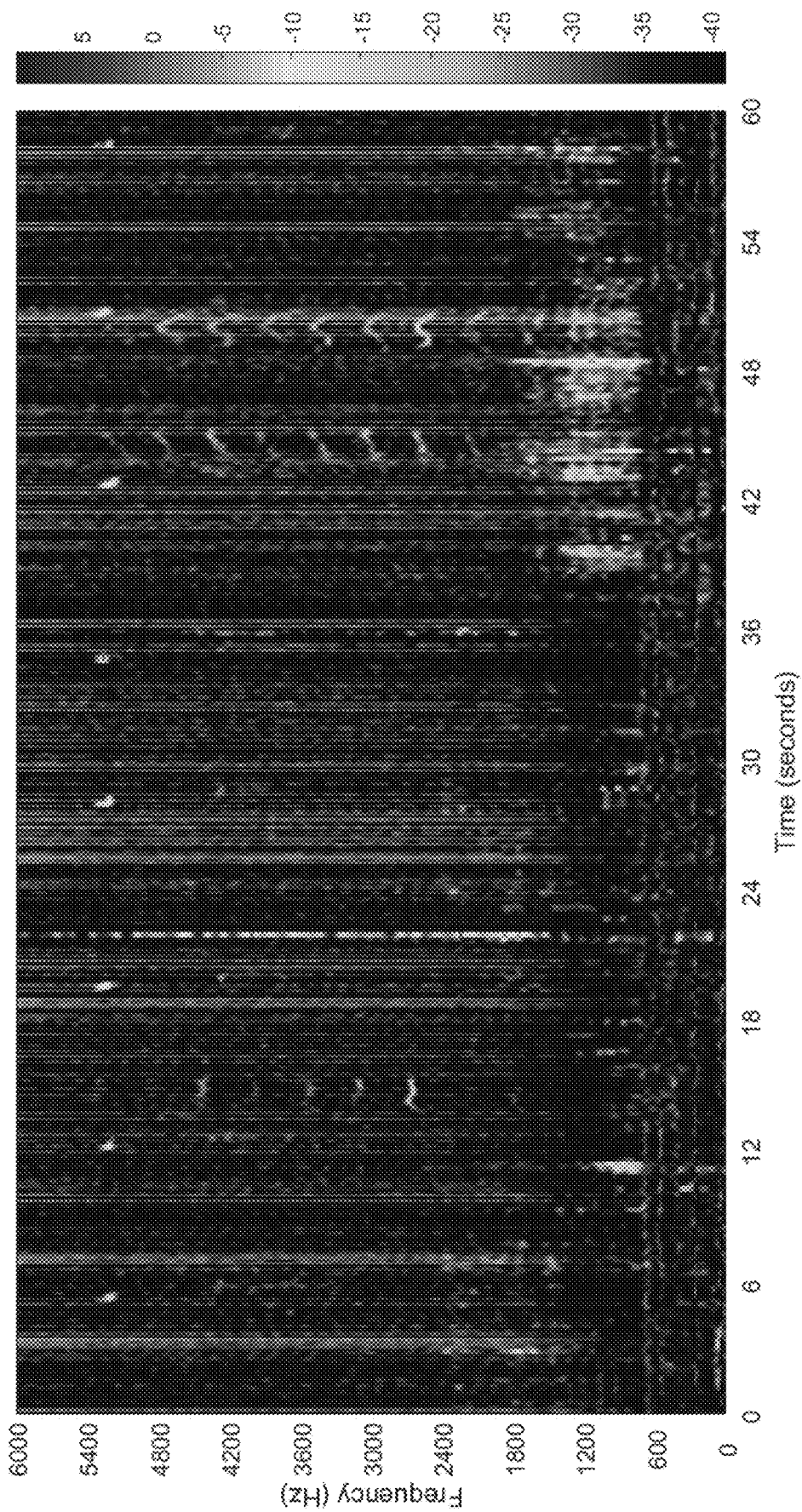
FIG. 25 shows a heatmap of the 60 second time period of FIG. 20 generated after the magnitude adjustment in accordance with an illustrative embodiment.
Figure 26:
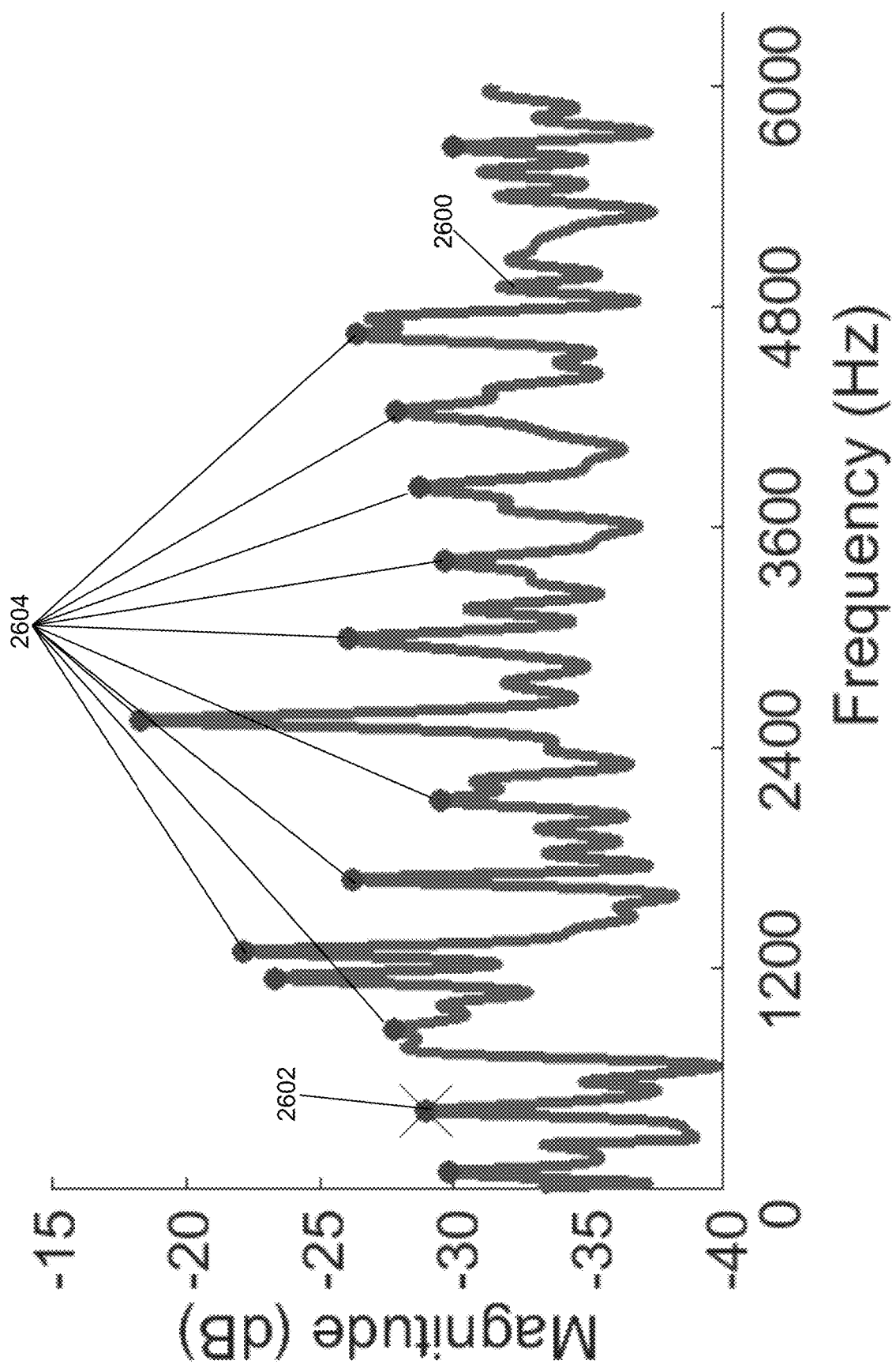
FIG. 26 shows a spectral magnitude as a function of frequency computed for the 60 second time period of FIG. 20 after the magnitude adjustment in accordance with an illustrative embodiment.

FIG. 25 shows a heatmap of the worker time period generated from adjusted matrix of magnitude values $M_a$ computed in operation 258 in accordance with an illustrative embodiment. Referring to FIG. 26, a spectral magnitude curve 2600 is shown of the adjusted matrix of magnitude values $M_a$ computed in operation 258 for a 49.65 to 49.95 second time window of the worker piping time period in accordance with an illustrative embodiment. A fundamental frequency 2602 of 428 Hz detected in operation 262 and harmonic frequencies 2604 are shown based on detecting a peak frequency between 300 and 500 Hz. Nine harmonic frequencies were detected meaning there is a high probability of detection of a worker piping sound.

Figure 27:
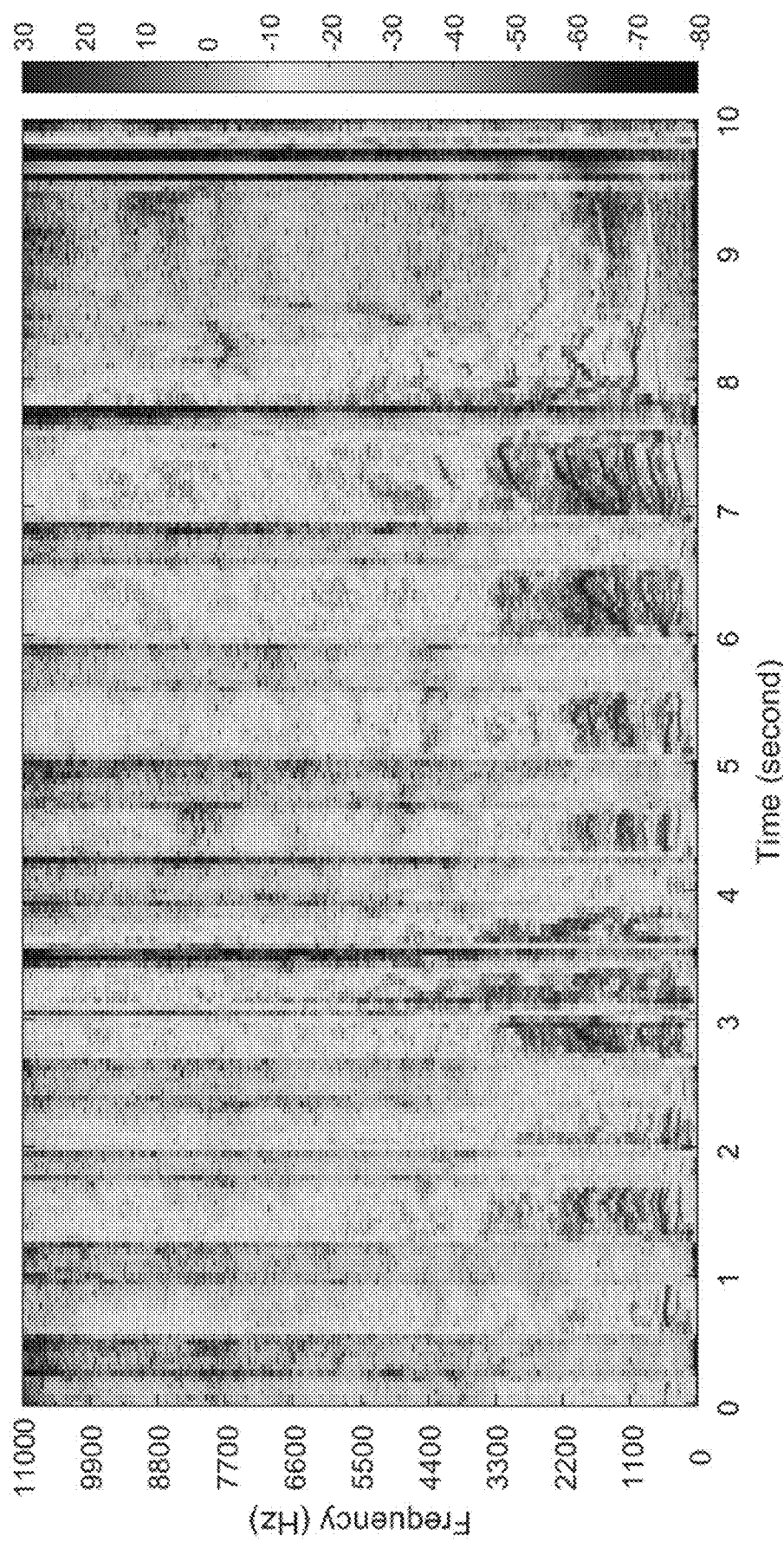
FIG. 27 shows a heatmap of a 10 second time period of cough acoustic data generated using STFT in accordance with an illustrative embodiment.
Figure 28:
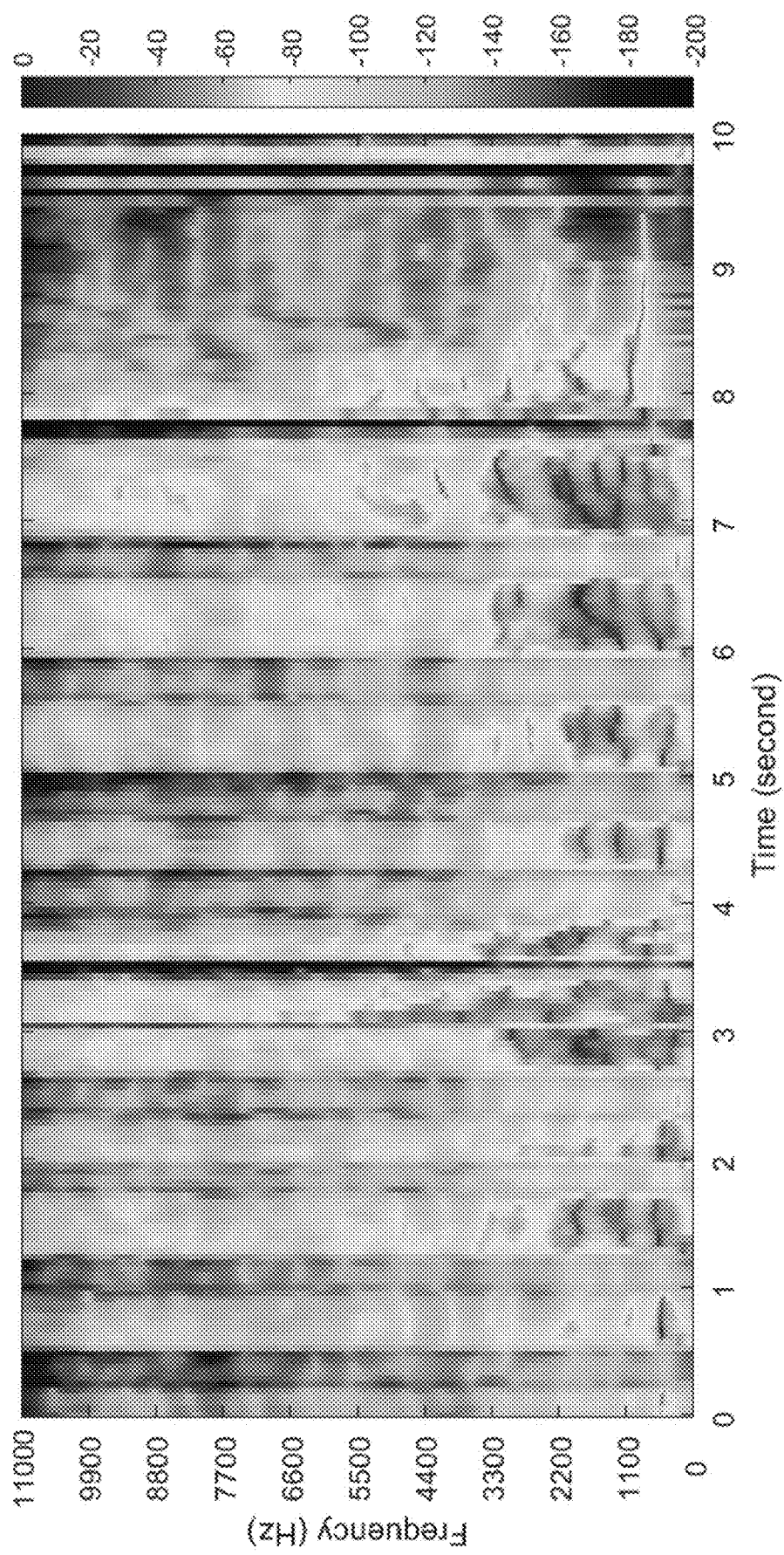
FIG. 28 shows a heatmap of the 10 second time period of FIG. 27 generated using the autoregressive model estimation method in accordance with an illustrative embodiment.

FIG. 27 shows a heatmap of a 10 second time period of cough acoustic data generated using STFT in accordance with an illustrative embodiment. FIG. 28 shows a heatmap of the matrix of magnitude values M for the 10 second time period of FIG. 27 in accordance with an illustrative embodiment.

Figure 29:
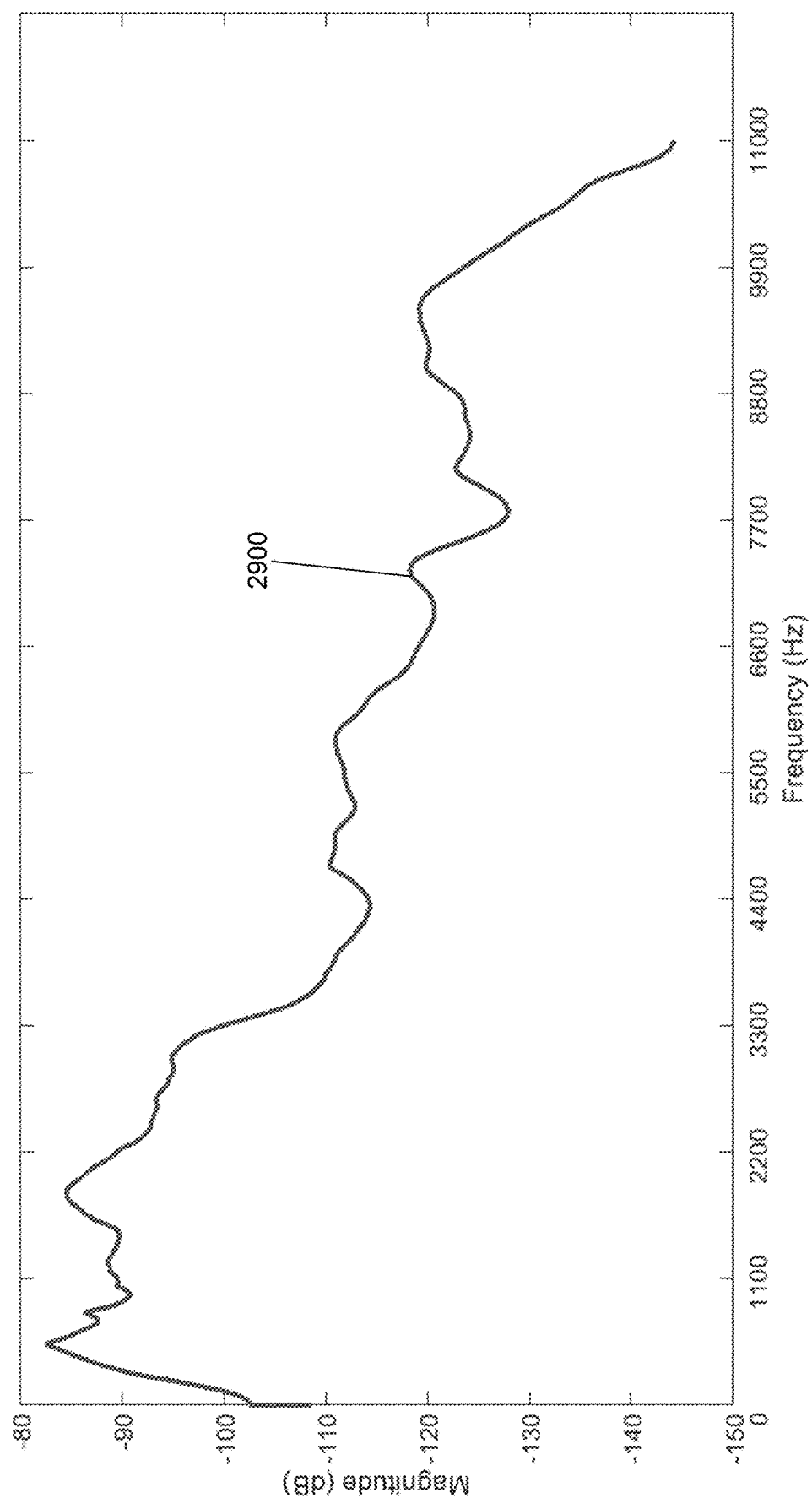
FIG. 29 shows an average spectral magnitude as a function of frequency for the cough acoustic data of FIG. 27 in accordance with an illustrative embodiment.
Figure 30:
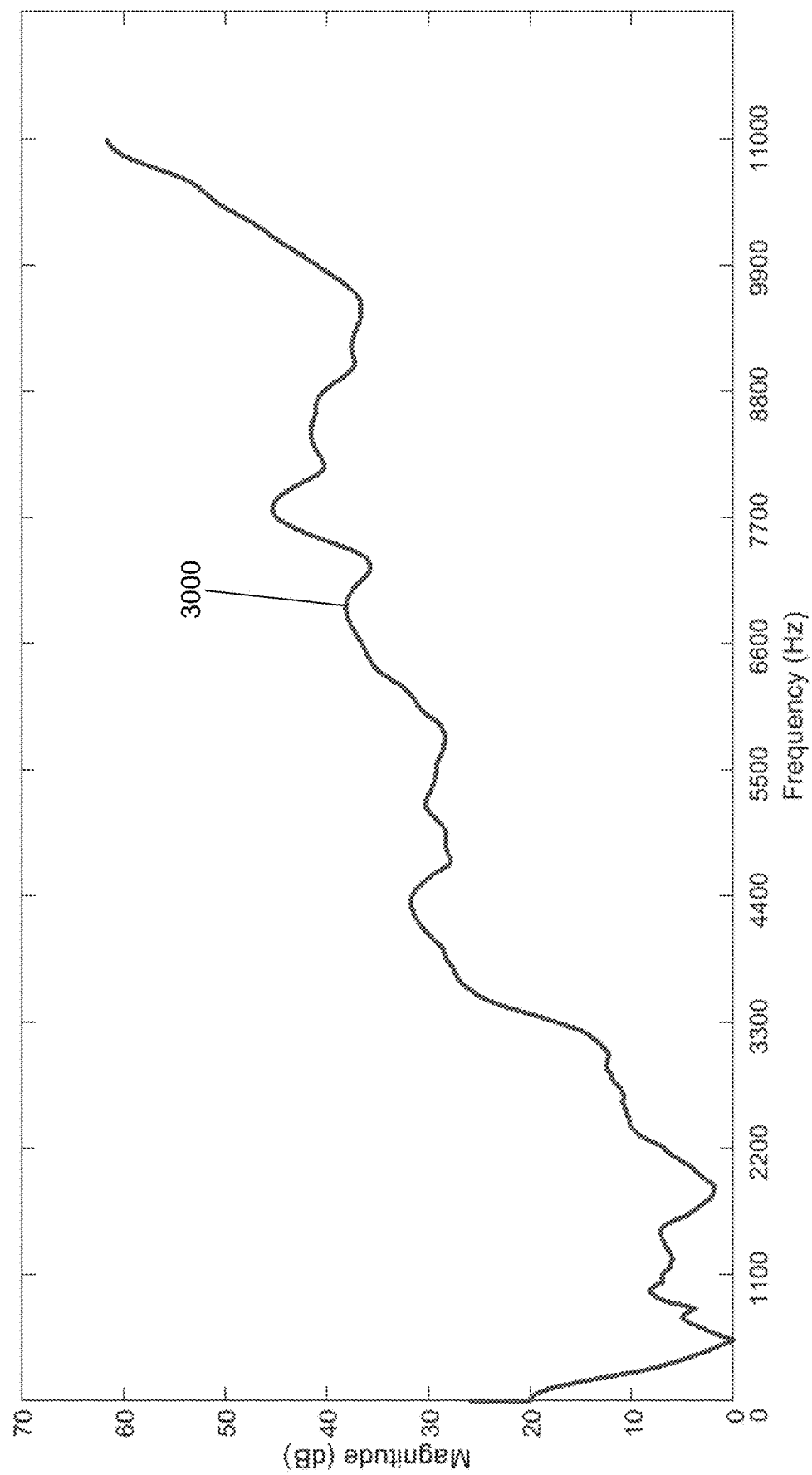
FIG. 30 shows an adjusted spectral magnitude as a function of frequency for the cough acoustic data of FIG. 27 in accordance with an illustrative embodiment.
Figure 31:
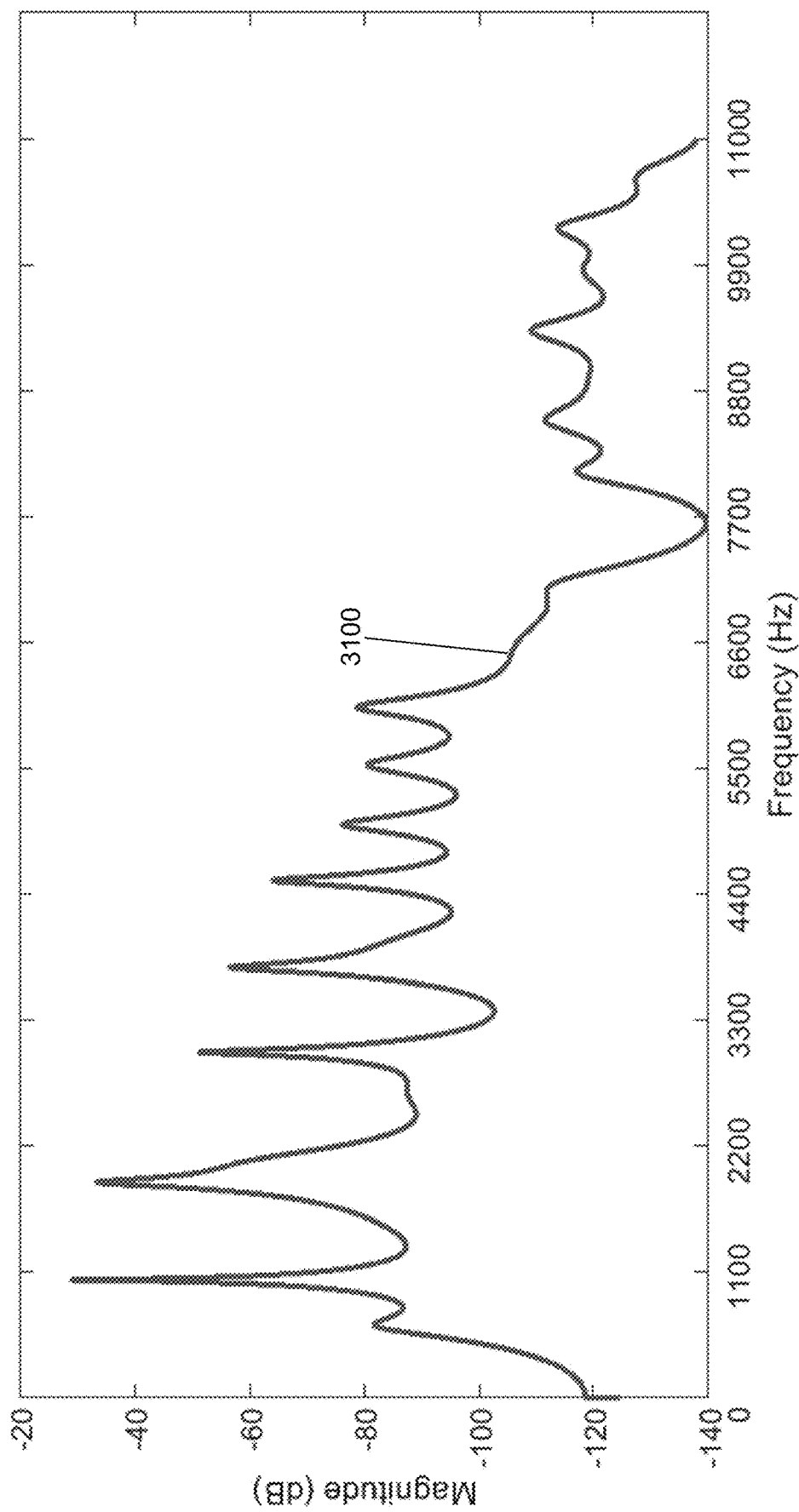
FIG. 31 shows a spectral magnitude as a function of frequency for the cough acoustic data before a magnitude adjustment in accordance with an illustrative embodiment.
Figure 32:
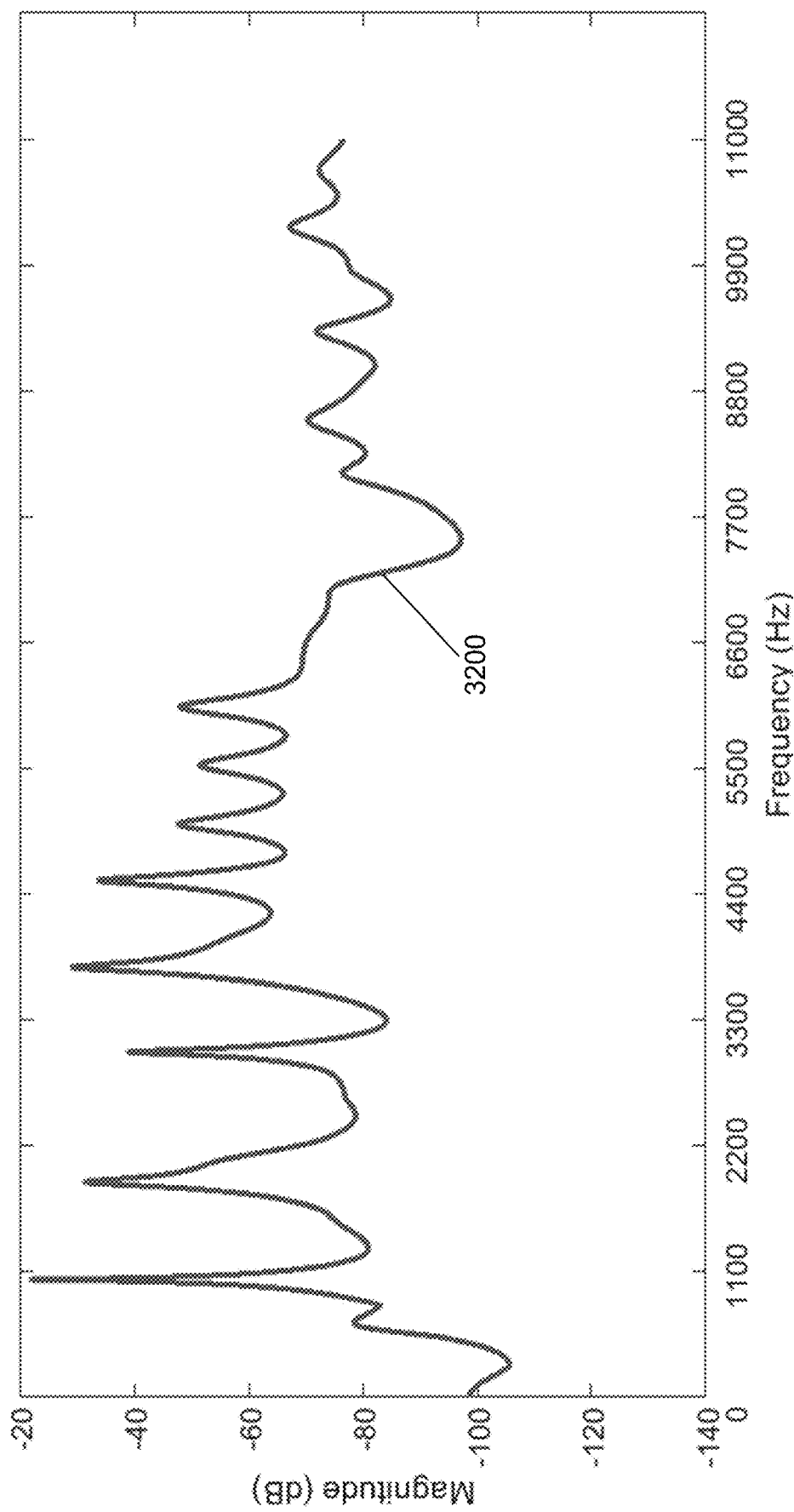
FIG. 32 shows a spectral magnitude as a function of frequency for the cough acoustic data after a magnitude adjustment in accordance with an illustrative embodiment.

Referring to FIG. 29, an average spectral magnitude curve 2900 is shown for the cough acoustic data in accordance with an illustrative embodiment. Referring to FIG. 30, an adjusted spectral magnitude curve 3000 is shown of magnitude adjustment vector B for the cough acoustic data in accordance with an illustrative embodiment. Referring to FIG. 31, a spectral magnitude curve 3100 is shown of the cough acoustic data before application of the adjusted spectral magnitude in accordance with an illustrative embodiment. Referring to FIG. 32, a spectral magnitude curve 3200 is shown of the cough acoustic data after application of the adjusted spectral magnitude in accordance with an illustrative embodiment.

Figure 33:
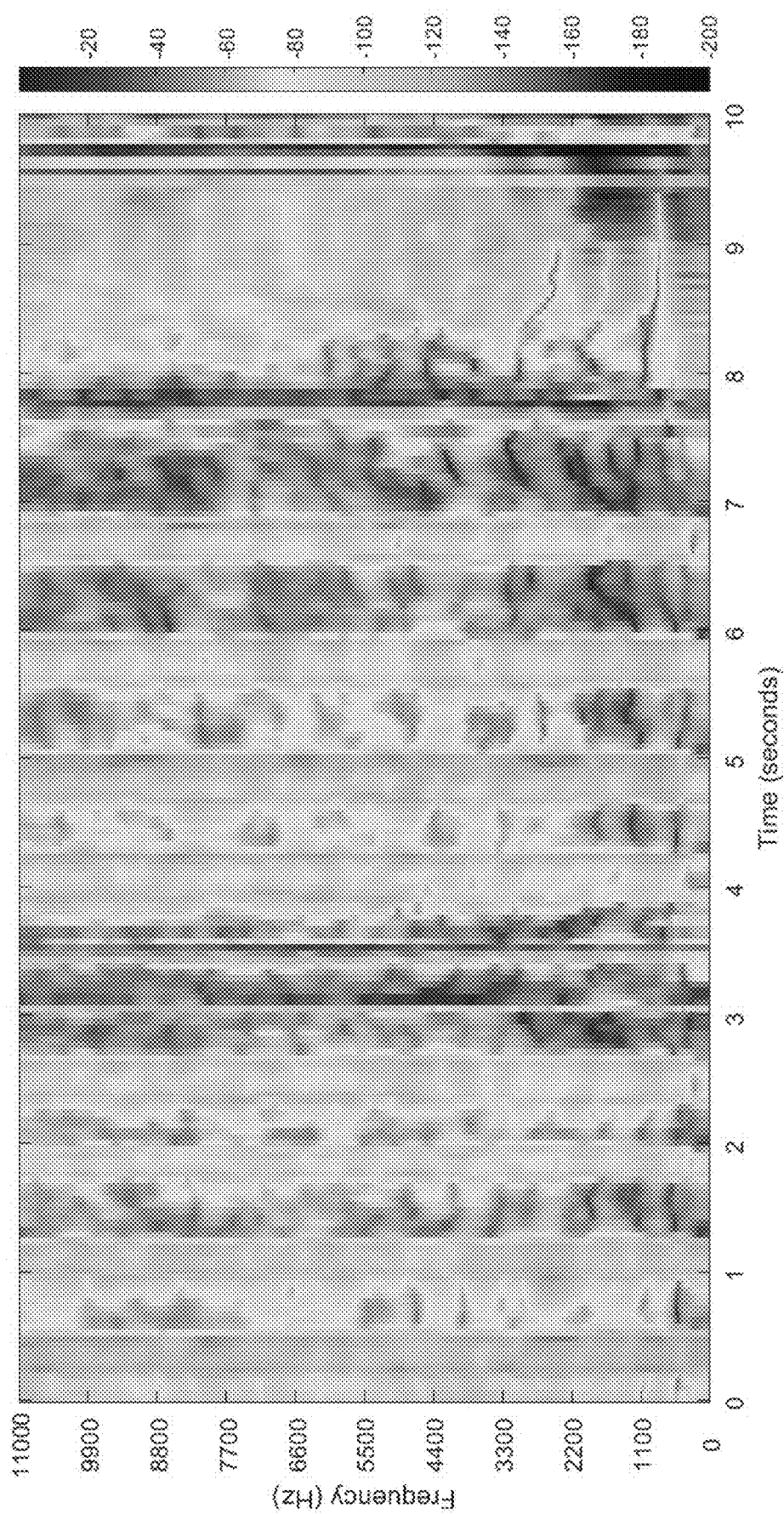
FIG. 33 shows a heatmap of the 10 second time period of FIG. 27 generated after the magnitude adjustment in accordance with an illustrative embodiment.
Figure 34:
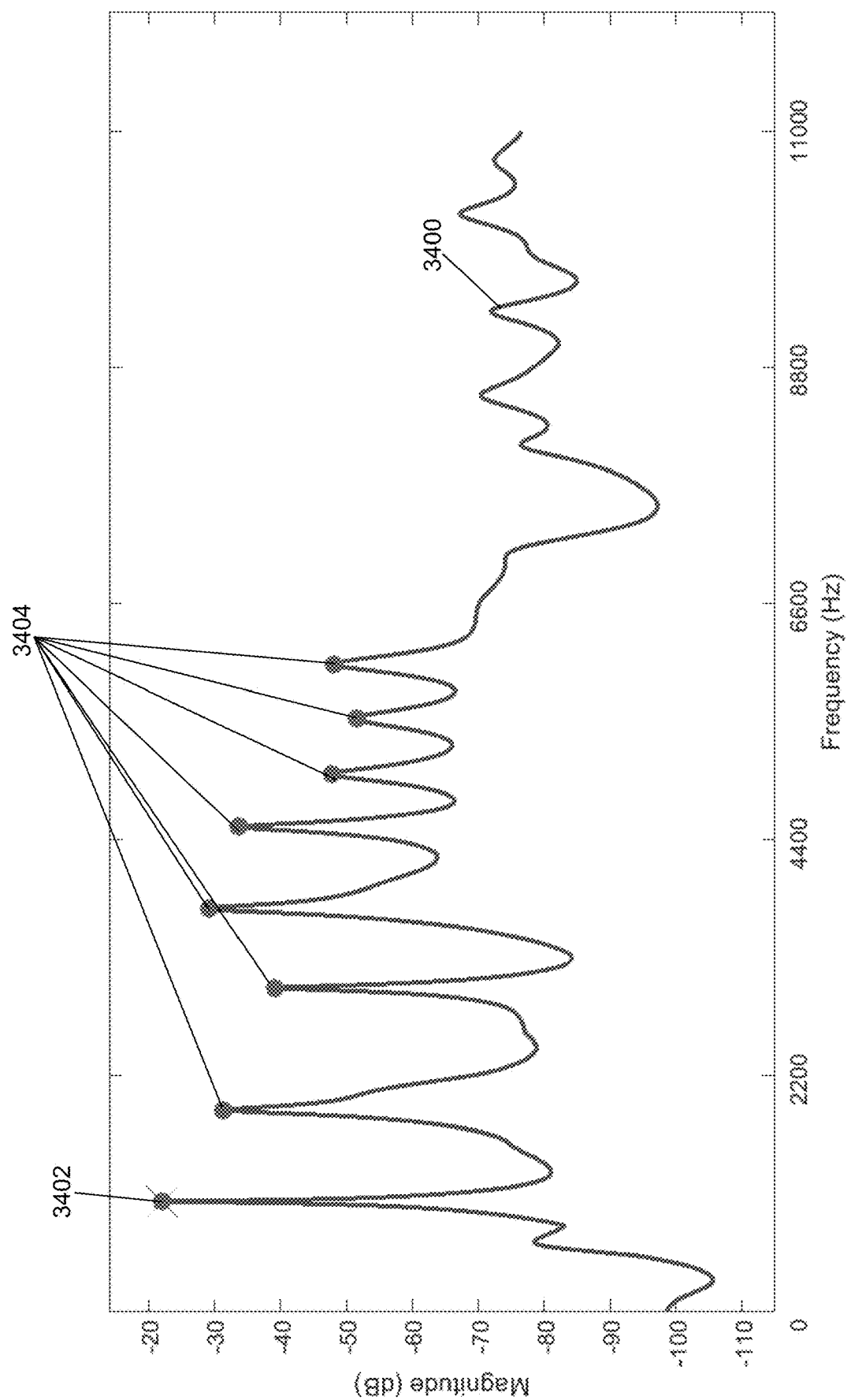
FIG. 34 shows a spectral magnitude as a function of frequency computed for the 10 second time period of FIG. 27 after the magnitude adjustment in accordance with an illustrative embodiment.

FIG. 33 shows a heatmap of the cough acoustic data generated from adjusted matrix of magnitude values $M_a$ computed in operation 258 in accordance with an illustrative embodiment. Referring to FIG. 34, a spectral magnitude curve 3400 is shown of the adjusted matrix of magnitude values $M_a$ computed in operation 258 for the cough acoustic data in accordance with an illustrative embodiment. A fundamental frequency 3402 of 1032 Hz detected in operation 262 and harmonic frequencies 3404 are shown based on detecting a peak frequency between 400 and 1600 Hz. Seven harmonic frequencies were detected meaning there is a high probability of detection of a wet cough or wheezing cough rather than a dry cough.

Figure 35:
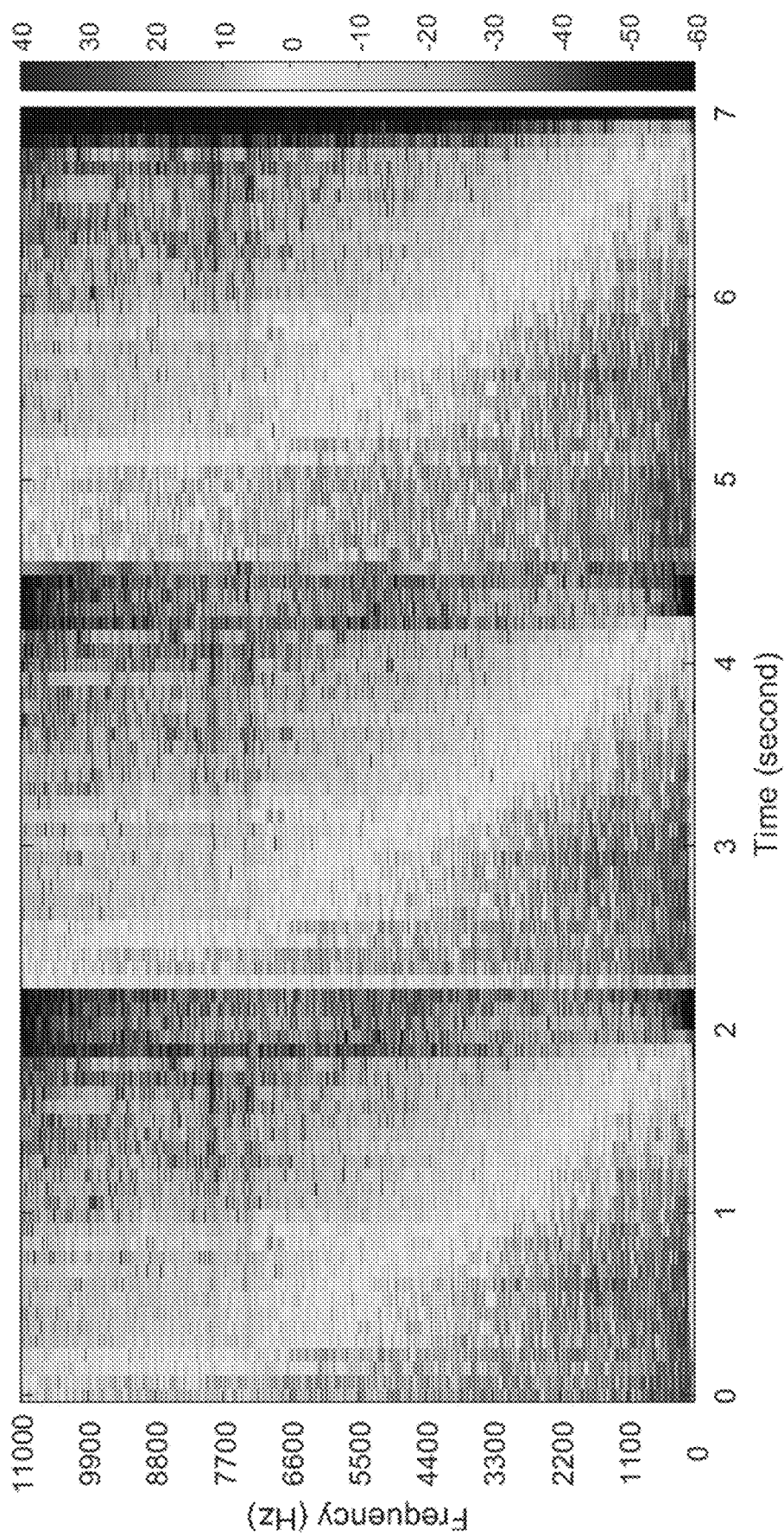
FIG. 35 shows a heatmap of a 7 second time period of AK47 gunshot acoustic data generated using STFT in accordance with an illustrative embodiment.
Figure 36:
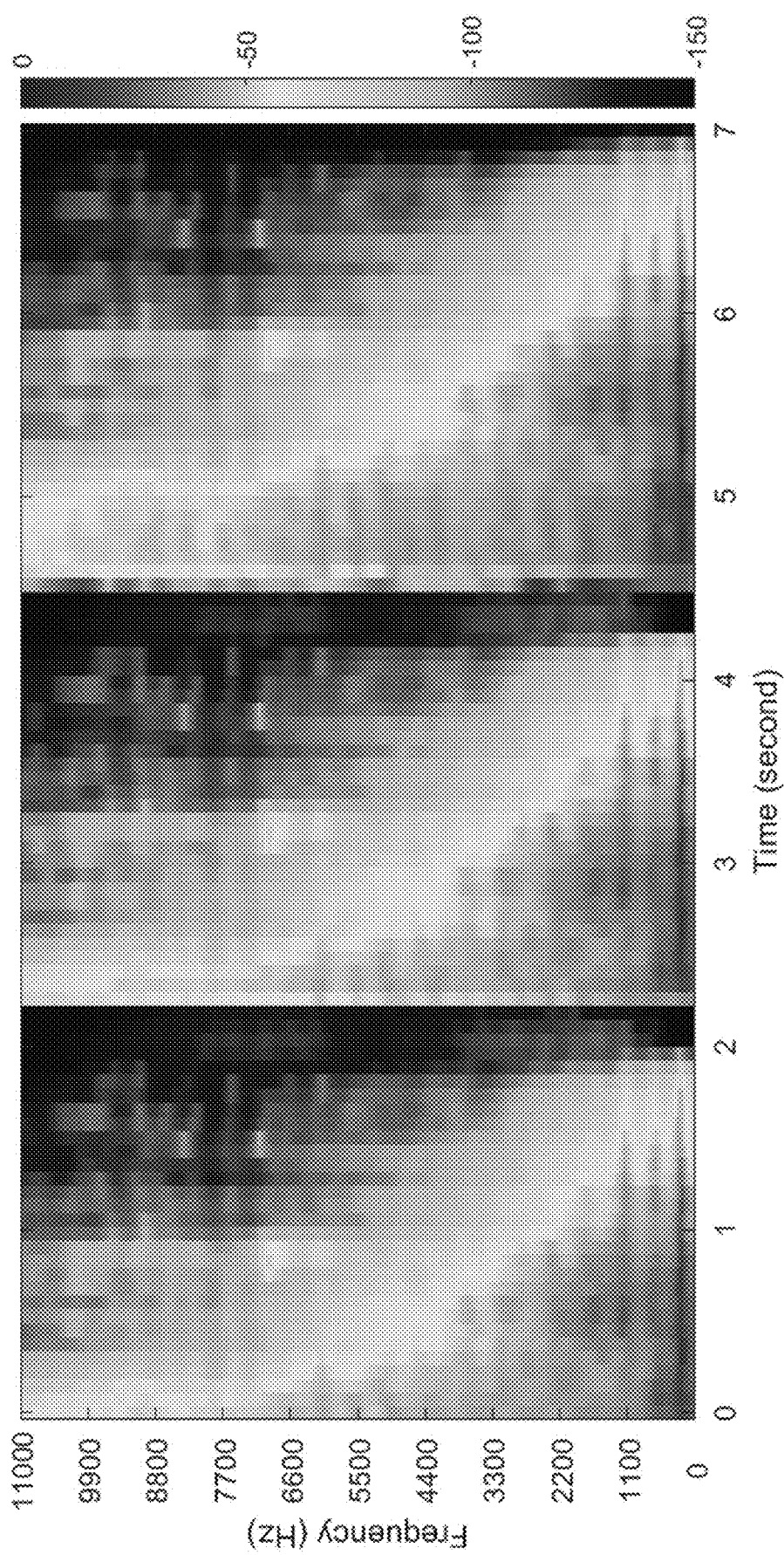
FIG. 36 shows a heatmap of the 7 second time period of FIG. 35 generated using the autoregressive model estimation method in accordance with an illustrative embodiment.

FIG. 35 shows a heatmap of a 7 second window of acoustic data for three AK47 gunshots generated using STFT in accordance with an illustrative embodiment. FIG. 36 shows a heatmap of the matrix of magnitude values M for the 7 second time period of FIG. 35 in accordance with an illustrative embodiment.

Figure 37:
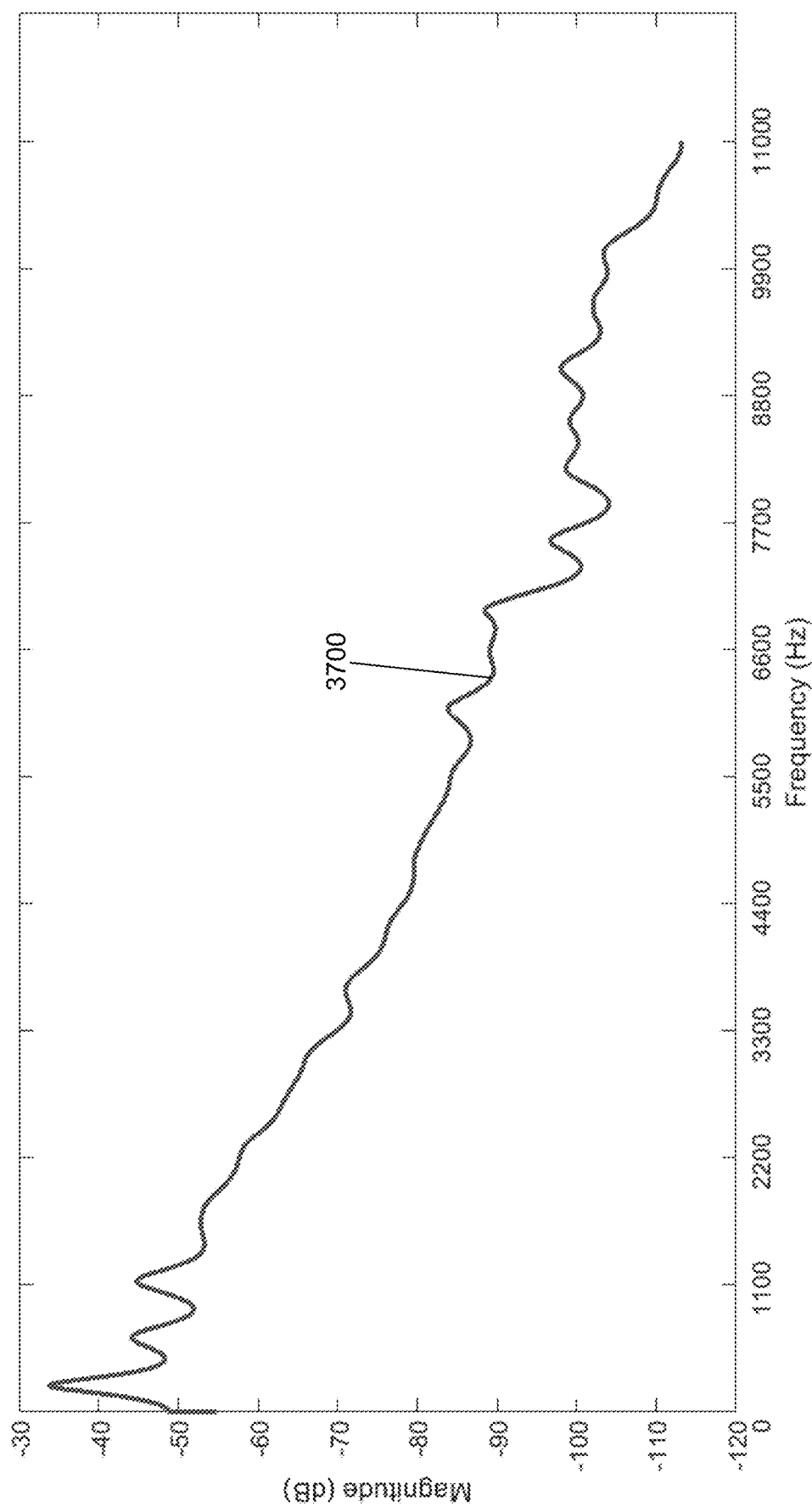
FIG. 37 shows an average spectral magnitude as a function of frequency for the AK47 gunshot acoustic data in accordance with an illustrative embodiment.
Figure 38:
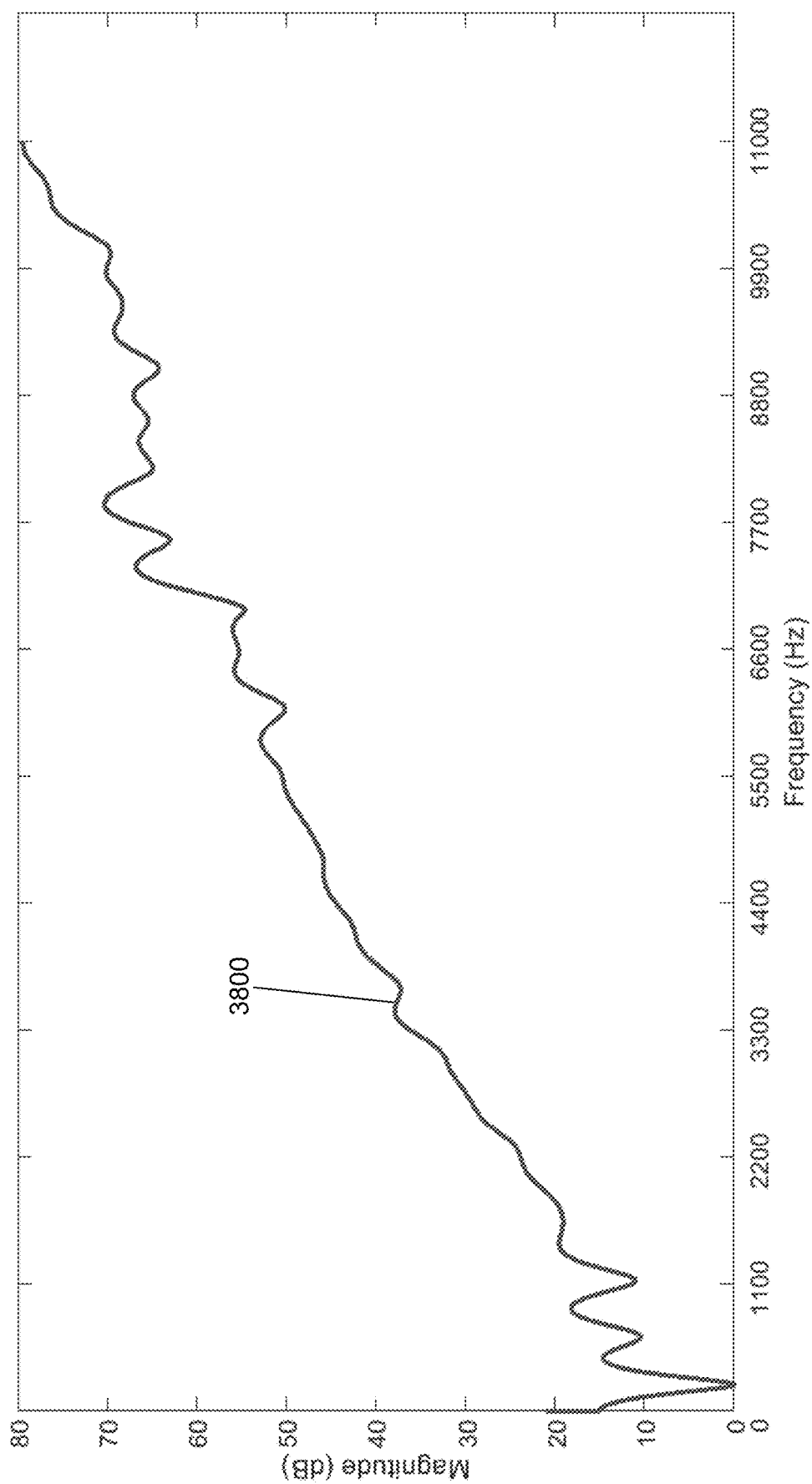
FIG. 38 shows an adjusted spectral magnitude as a function of frequency for the AK47 gunshot acoustic data of FIG. 35 in accordance with an illustrative embodiment.
Figure 39:
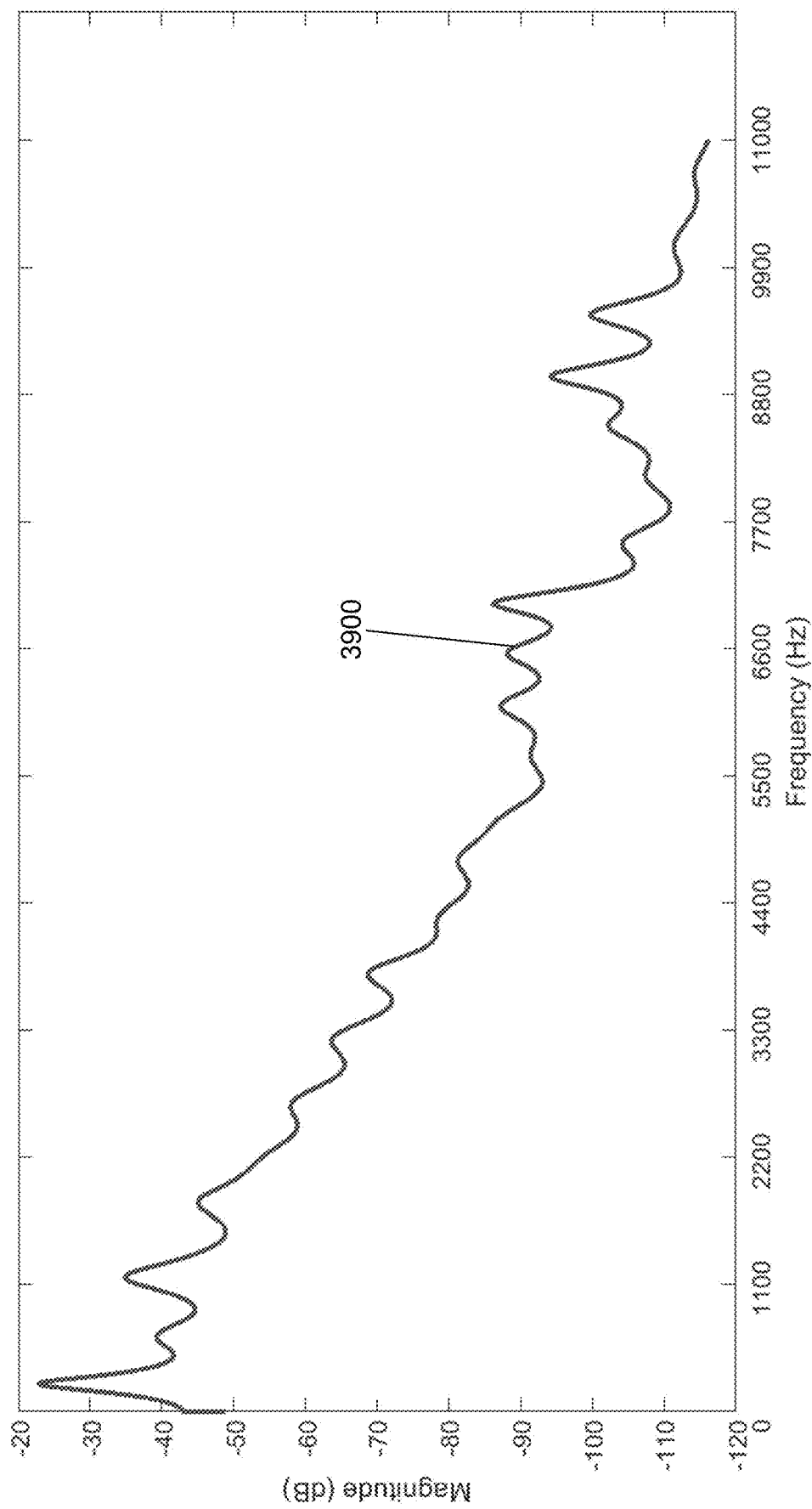
FIG. 39 shows a spectral magnitude as a function of frequency for the AK47 gunshot acoustic data before a magnitude adjustment in accordance with an illustrative embodiment.
Figure 40:
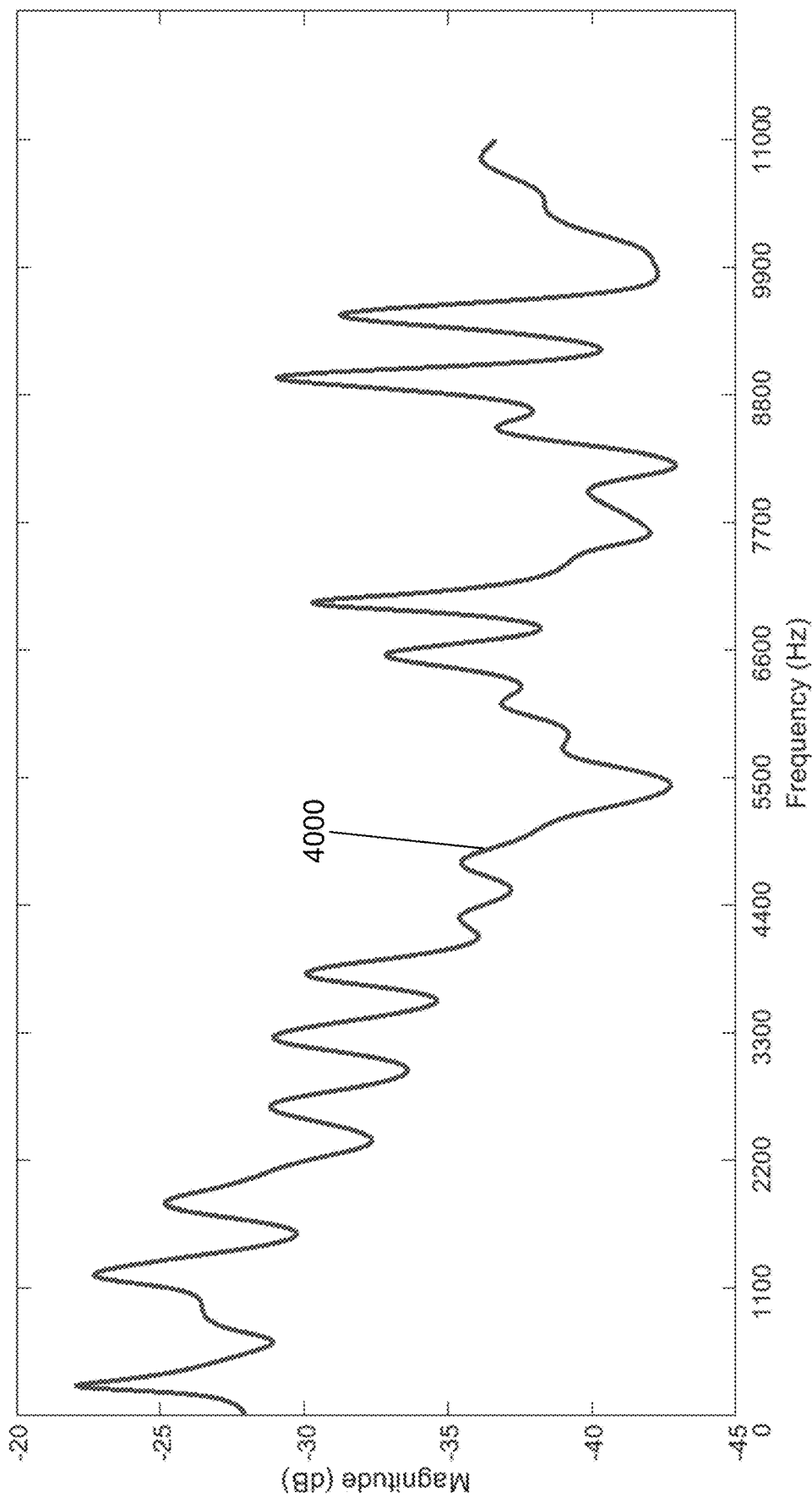
FIG. 40 shows a spectral magnitude as a function of frequency for the AK47 gunshot acoustic data after a magnitude adjustment in accordance with an illustrative embodiment.

Referring to FIG. 37, an average spectral magnitude curve 3700 is shown for the 7 second window of acoustic data for three AK47 gunshots in accordance with an illustrative embodiment. Referring to FIG. 38, an adjusted spectral magnitude curve 3800 is shown of magnitude adjustment vector B for the three AK47 gunshots in accordance with an illustrative embodiment. Referring to FIG. 39, a spectral magnitude curve 3900 is shown of the three AK47 gunshots before application of the adjusted spectral magnitude in accordance with an illustrative embodiment. Referring to FIG. 40, a spectral magnitude curve 4000 is shown of the three AK47 gunshots after application of the adjusted spectral magnitude in accordance with an illustrative embodiment.

Figure 41:
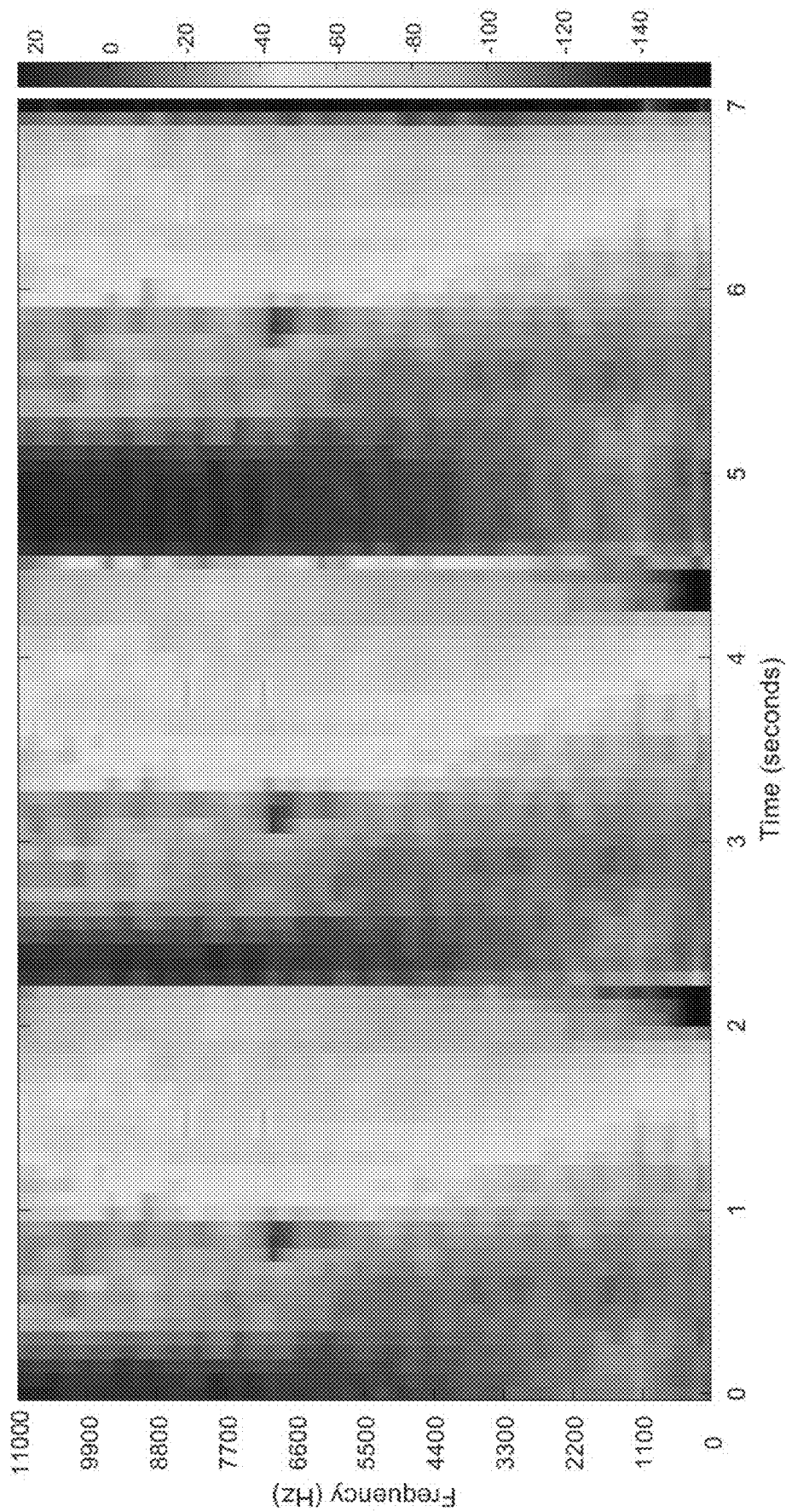
FIG. 41 shows a heatmap of the 7 second time period of FIG. 35 generated after the magnitude adjustment in accordance with an illustrative embodiment.
Figure 42:
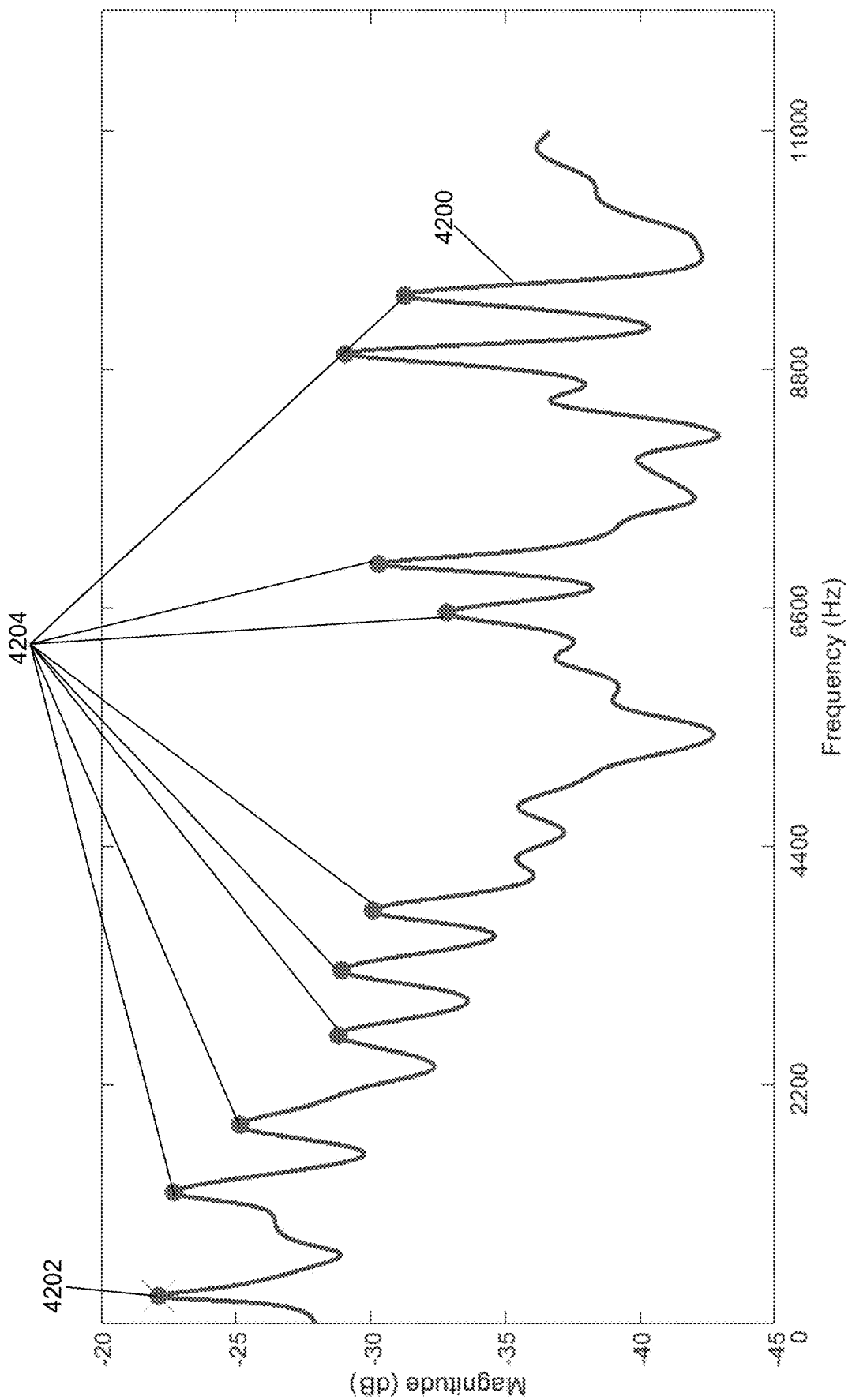
FIG. 42 shows a spectral magnitude as a function of frequency computed for the 7 second time period of FIG. 35 after the magnitude adjustment in accordance with an illustrative embodiment.

FIG. 41 shows a heatmap of the three AK47 gunshots generated from adjusted matrix of magnitude values $M_a$ computed in operation 258 in accordance with an illustrative embodiment. Referring to FIG. 42, a spectral magnitude curve 4200 is shown of the adjusted matrix of magnitude values $M_a$ computed in operation 258 for the three AK47 gunshots in accordance with an illustrative embodiment. A fundamental frequency 4202 of 258 Hz detected in operation 262 and harmonic frequencies 4204 are shown based on detecting a peak frequency between 100 and 500 Hz. Nine harmonic frequencies were detected meaning there is a high probability of detection of an AK47 gunshot.

Figure 43:
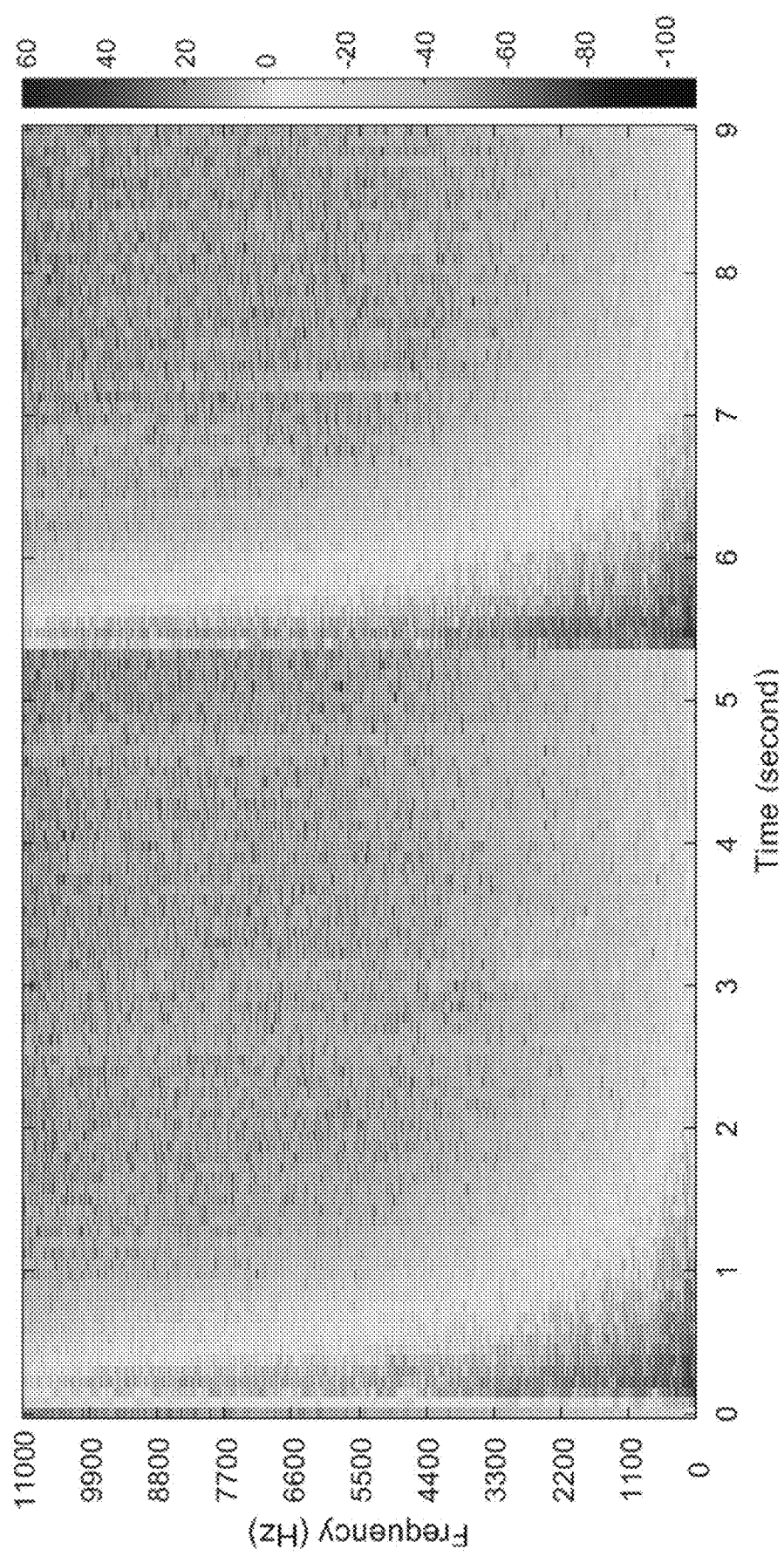
FIG. 43 shows a heatmap of a 9 second time period of pistol gunshot acoustic data generated using STFT in accordance with an illustrative embodiment.
Figure 44:
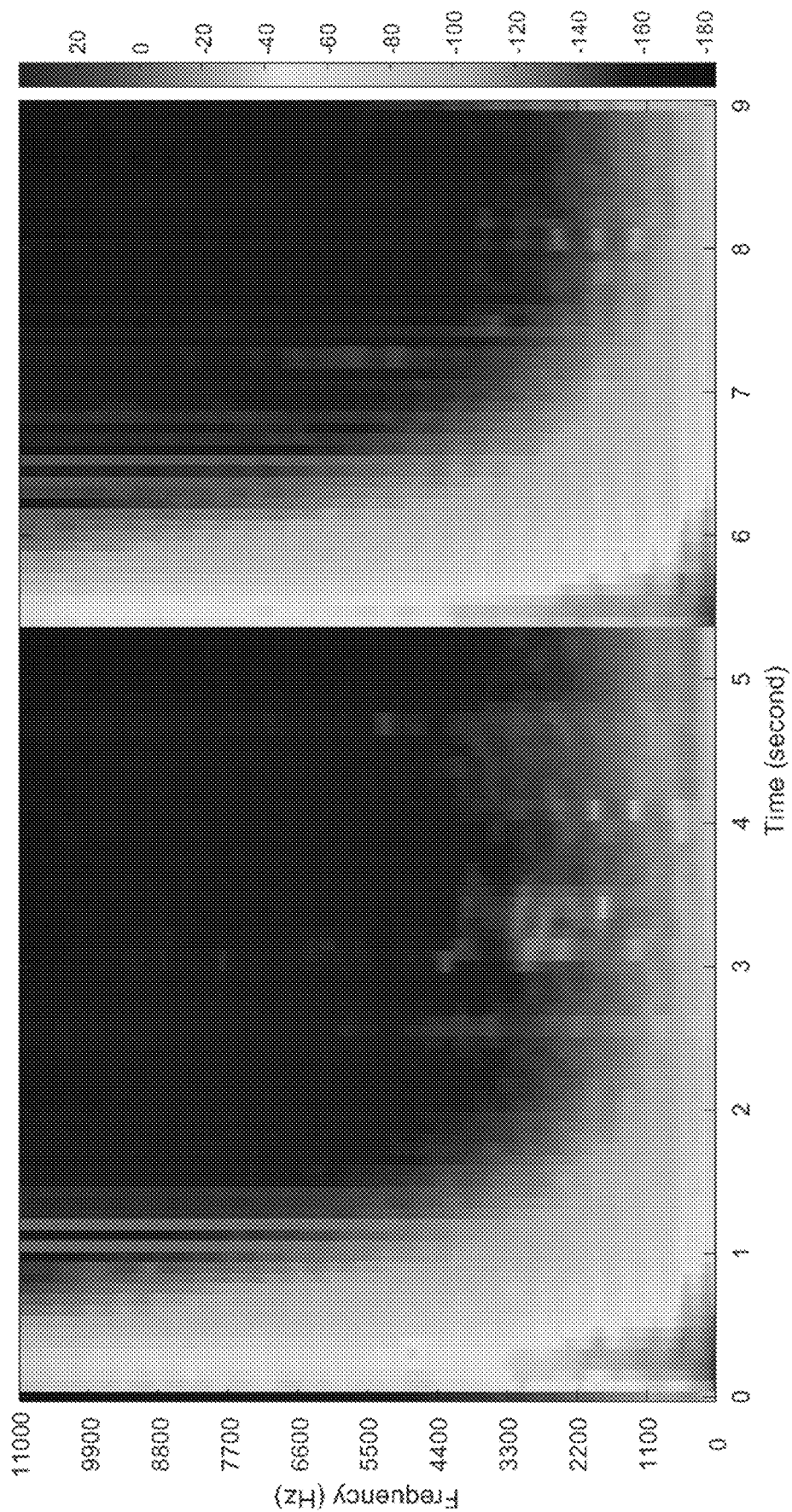
FIG. 44 shows a heatmap of the 9 second time period of FIG. 43 generated using the autoregressive model estimation method in accordance with an illustrative embodiment.

FIG. 43 shows a heatmap of a 9 second window of acoustic data for two pistol gunshots generated using STFT in accordance with an illustrative embodiment. FIG. 44 shows a heatmap of the matrix of magnitude values M for the 9 second time period of FIG. 43 in accordance with an illustrative embodiment.

Figure 45:
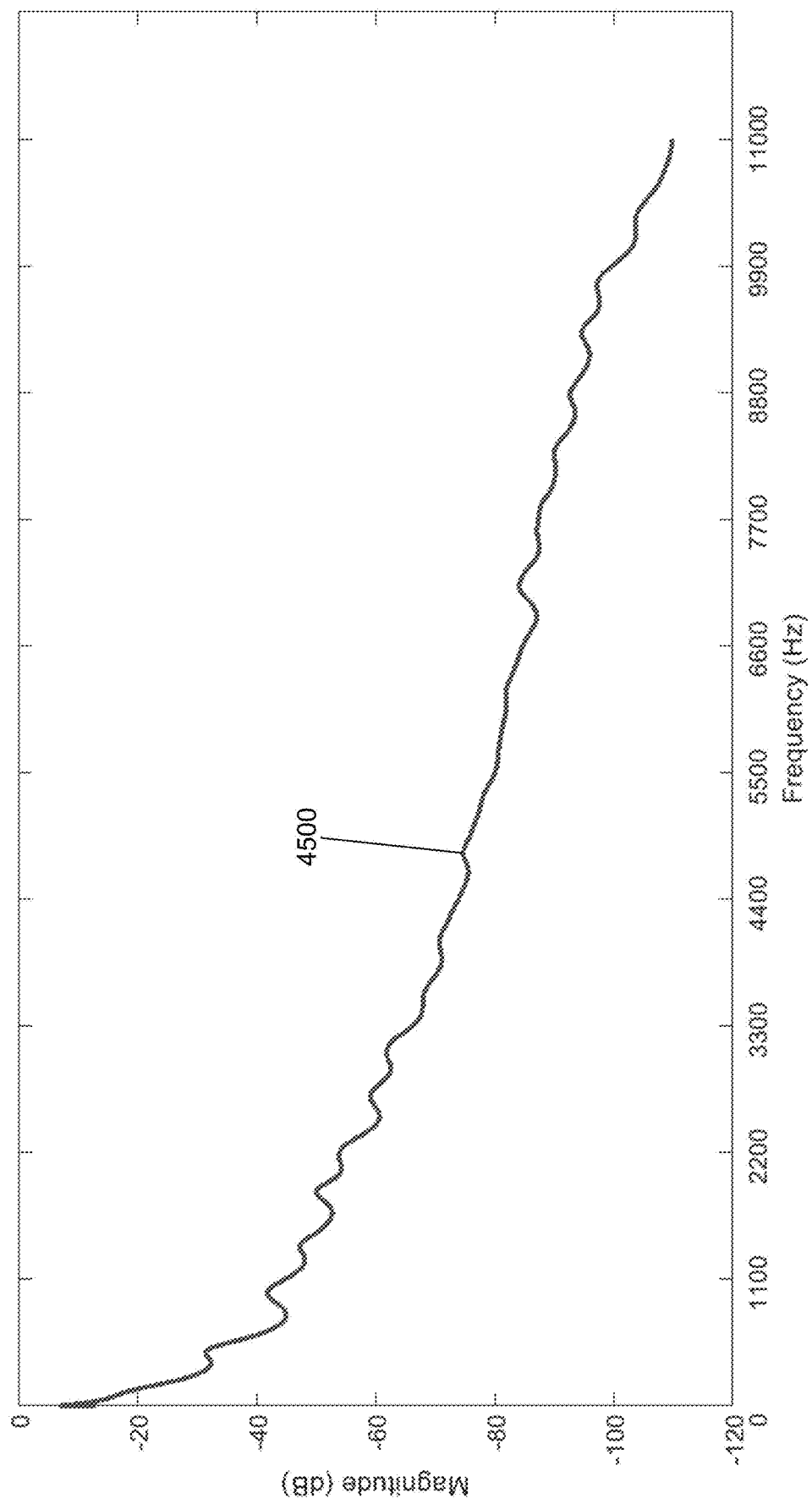
FIG. 45 shows an average spectral magnitude as a function of frequency for the pistol gunshot acoustic data in accordance with an illustrative embodiment.
Figure 46:
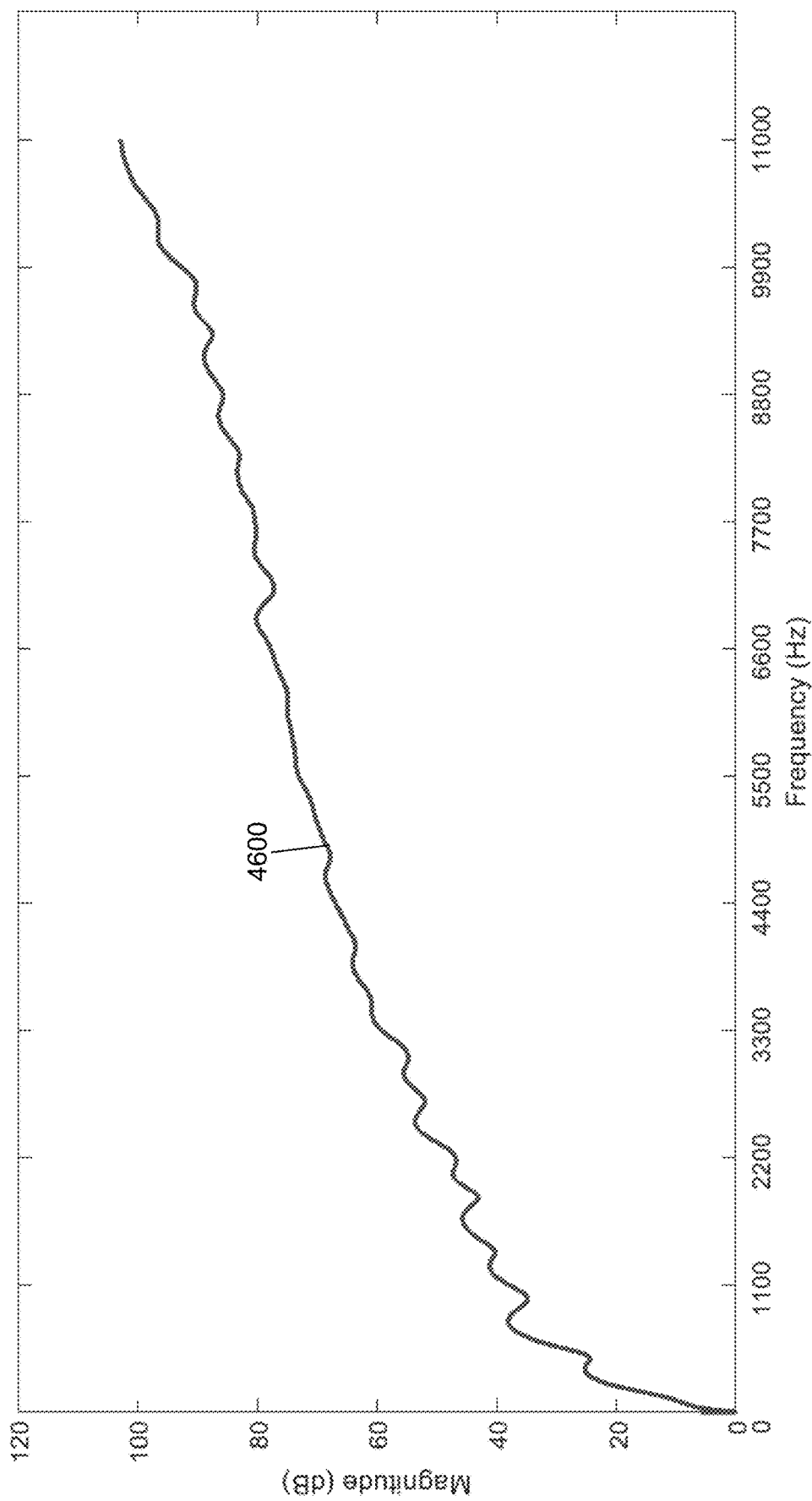
FIG. 46 shows an adjusted spectral magnitude as a function of frequency for the pistol gunshot acoustic data of FIG. 43 in accordance with an illustrative embodiment.
Figure 47:
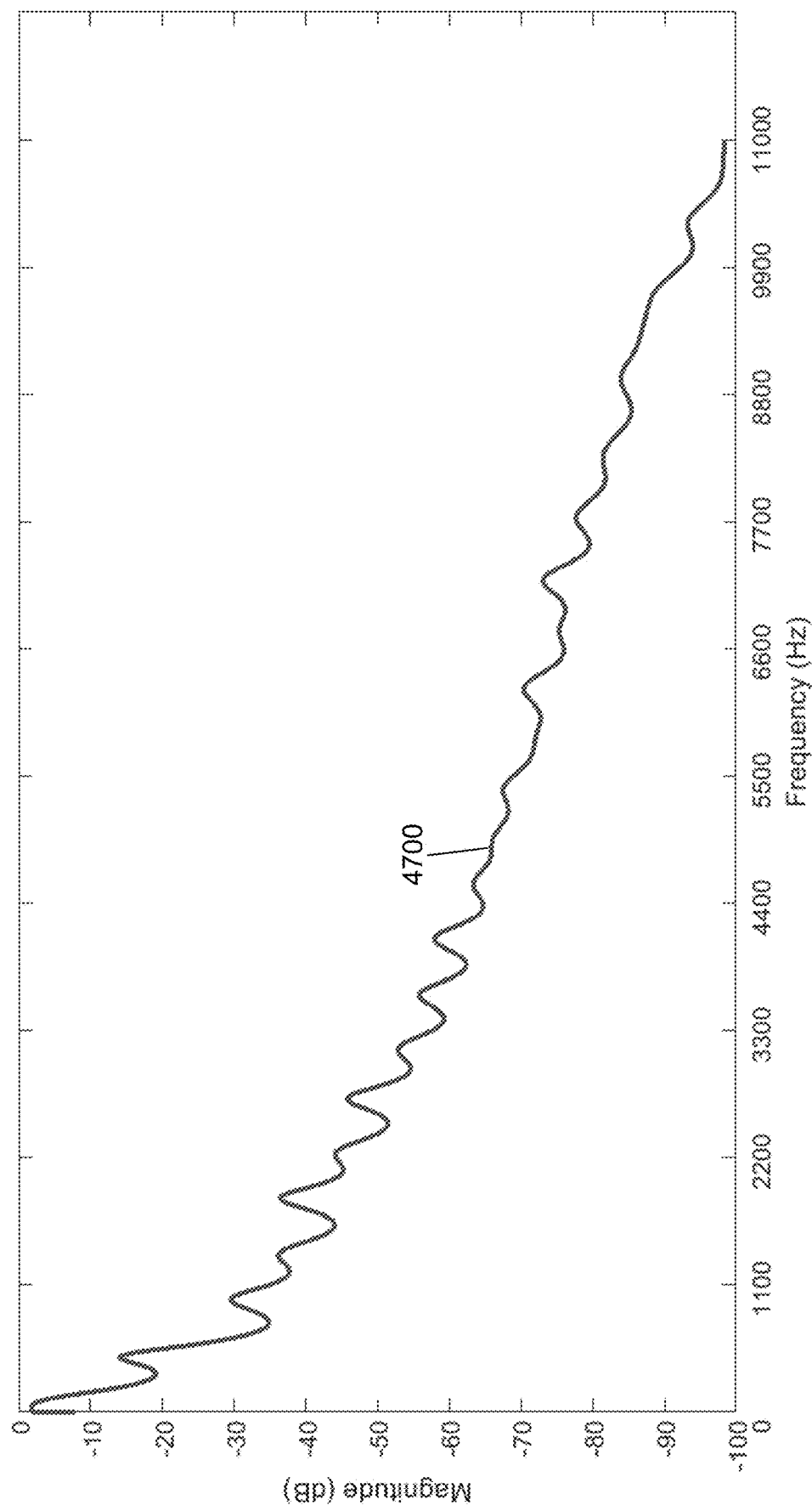
FIG. 47 shows a spectral magnitude as a function of frequency for the pistol gunshot acoustic data before a magnitude adjustment in accordance with an illustrative embodiment.
Figure 48:
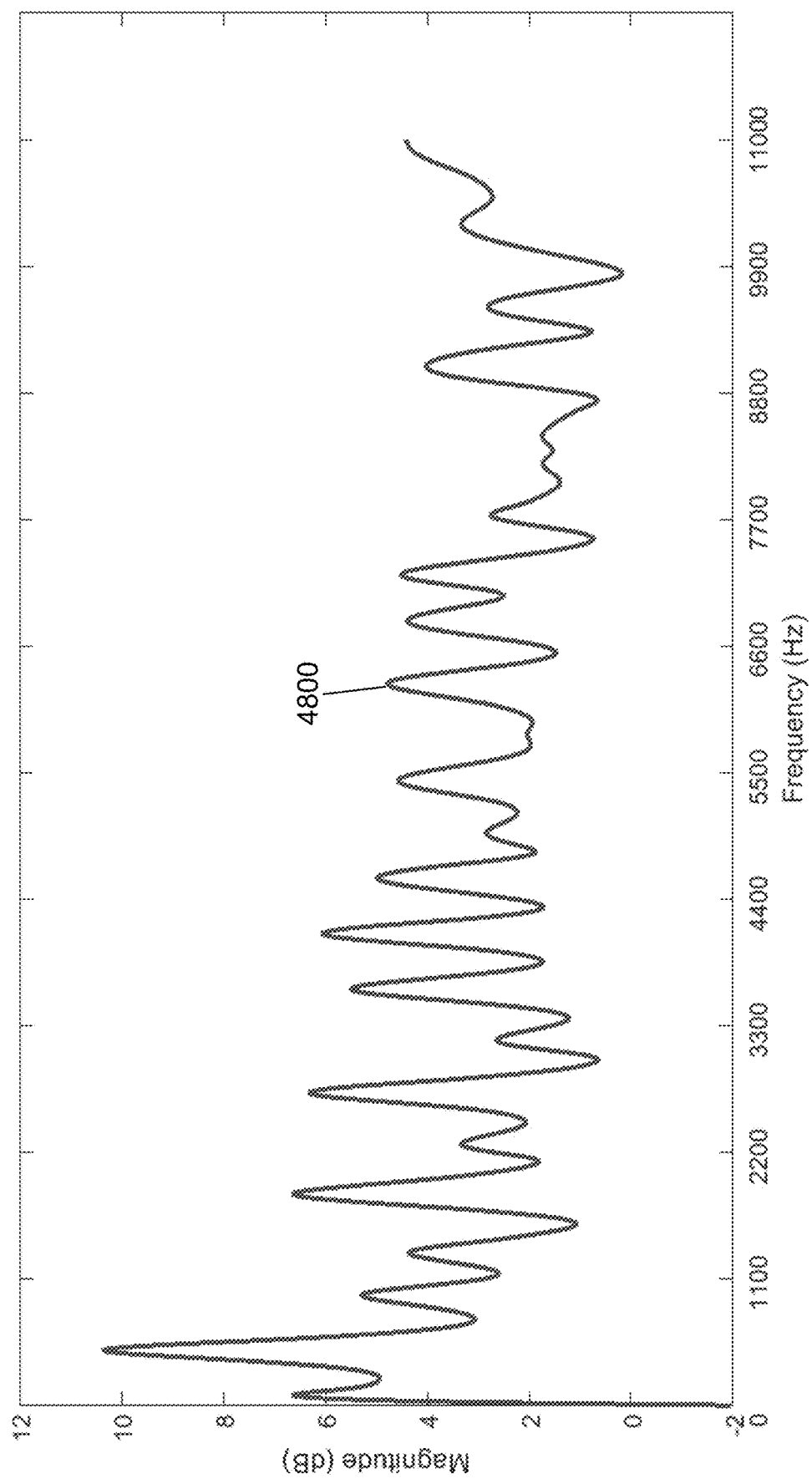
FIG. 48 shows a spectral magnitude as a function of frequency for the pistol gunshot acoustic data after a magnitude adjustment in accordance with an illustrative embodiment.

Referring to FIG. 45, an average spectral magnitude curve 4500 is shown for the 9 second window of acoustic data for two pistol gunshots in accordance with an illustrative embodiment. Referring to FIG. 46, an adjusted spectral magnitude curve 4600 is shown of magnitude adjustment vector B for the two pistol gunshots in accordance with an illustrative embodiment. Referring to FIG. 47, a spectral magnitude curve 4700 is shown of the two pistol gunshots before application of the adjusted spectral magnitude in accordance with an illustrative embodiment. Referring to FIG. 48, a spectral magnitude curve 4800 is shown of the two pistol gunshots after application of the adjusted spectral magnitude in accordance with an illustrative embodiment.

Figure 49:
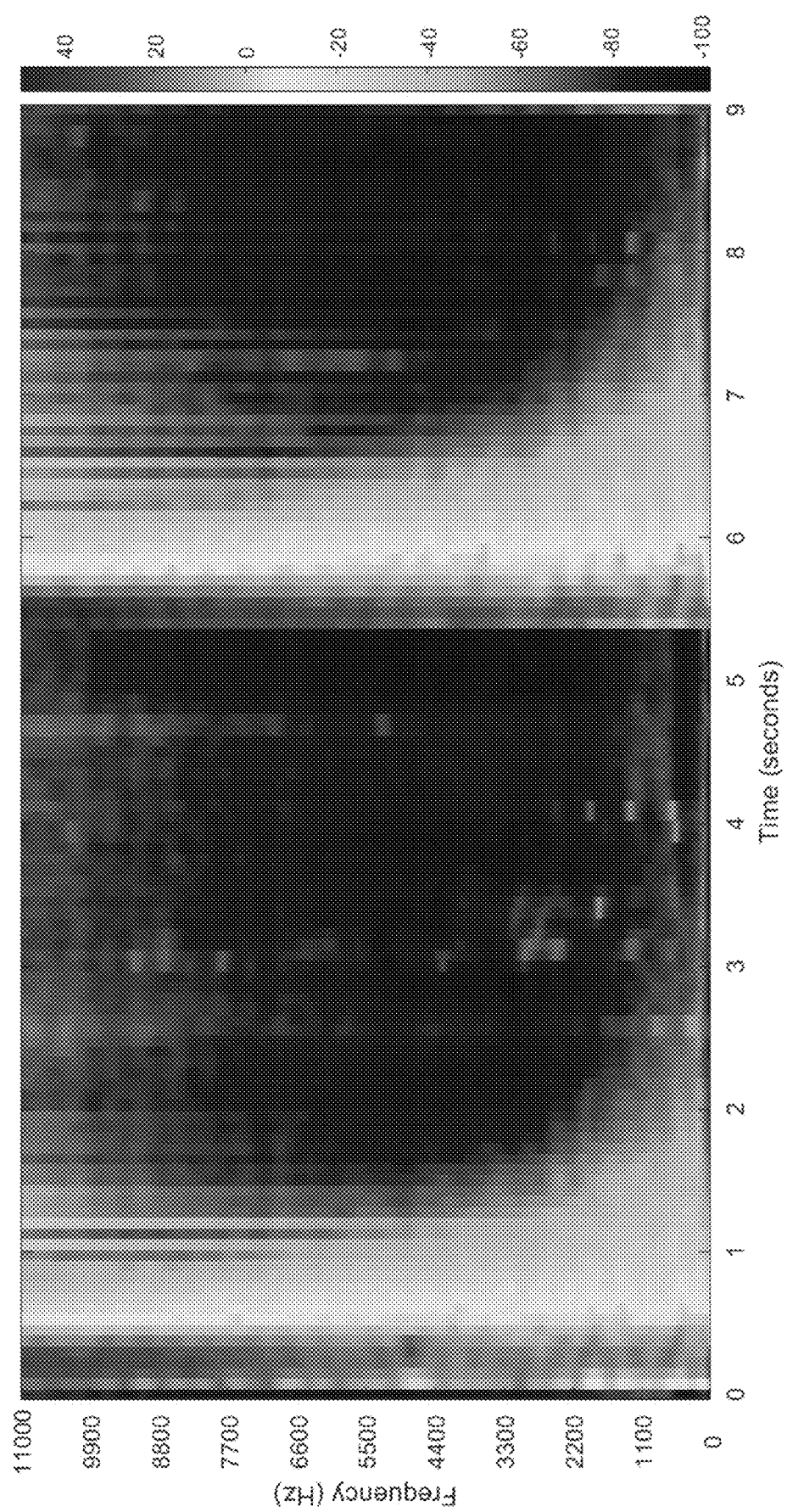
FIG. 49 shows a heatmap of the 7 second time period of FIG. 43 generated after the magnitude adjustment in accordance with an illustrative embodiment.
Figure 50:
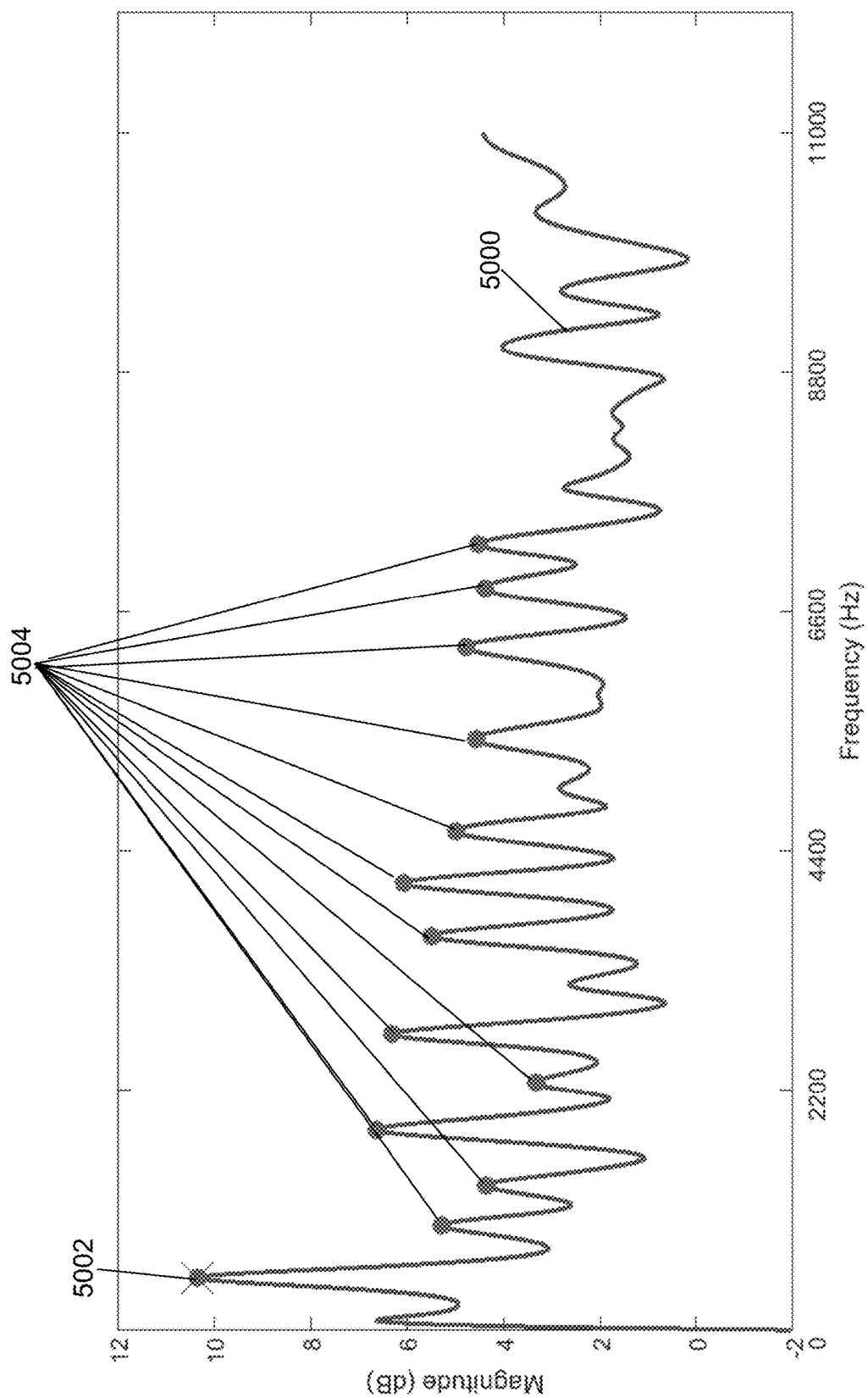
FIG. 50 shows a spectral magnitude as a function of frequency computed for the 9 second time period of FIG. 43 after the magnitude adjustment in accordance with an illustrative embodiment.

FIG. 49 shows a heatmap of the two pistol gunshots generated from adjusted matrix of magnitude values $M_a$ computed in operation 258 in accordance with an illustrative embodiment. Referring to FIG. 50, a spectral magnitude curve 5000 is shown of the adjusted matrix of magnitude values $M_a$ computed in operation 258 for the two pistol gunshots in accordance with an illustrative embodiment. A fundamental frequency 5002 of 483 Hz detected in operation 262 and harmonic frequencies 5004 are shown based on detecting a peak frequency between 100 and 500 Hz. Twelve harmonic frequencies were detected meaning there is a high probability of detection of a pistol gunshot.

Figure 51:
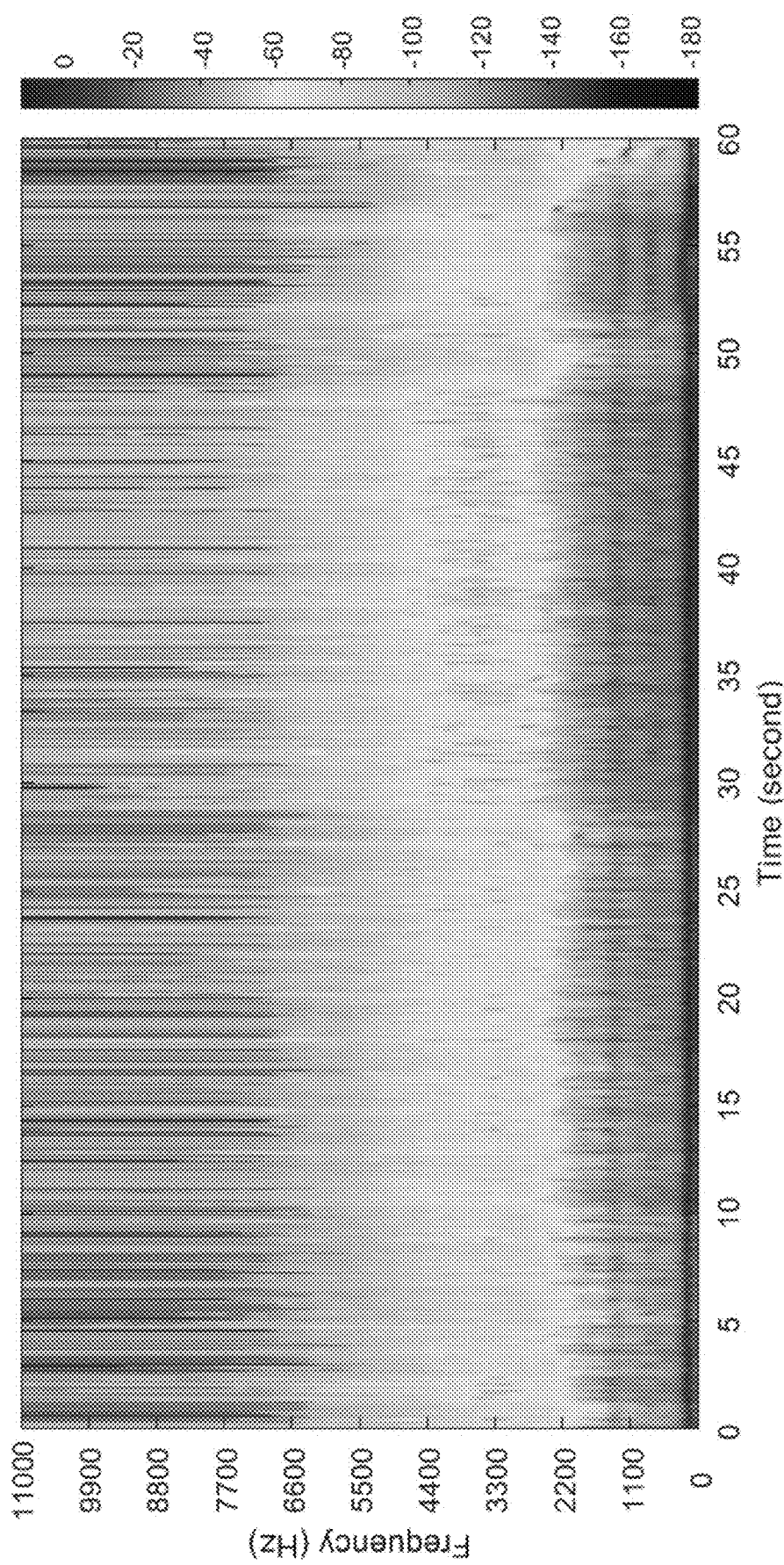
FIG. 51 shows a heatmap of a 60 second time period of firework acoustic data generated using the autoregressive model estimation method in accordance with an illustrative embodiment.

FIG. 51 shows a heatmap of the matrix of magnitude values M for a 60 second time period of firework acoustic data in accordance with an illustrative embodiment. Firework data has a different frequency signature than either gunshot sound and would not be detected as gunshots.

In all cases, the heatmaps from adjusted matrix of magnitude values $M_a$ computed in operation 258 show improved clarity over those generated using STFT or without adjustment of the matrix of magnitude values M. As a result, detecting the fundamental frequency and harmonic frequencies is improved thereby improving the capability of monitoring application 122 in detecting events relative to existing methods.

In an operation 266, a determination is made concerning whether an event has occurred. When an event has occurred, processing continues in operation 268. When an event has not occurred, processing continues in an operation 270. For example, an event may be detected when the fundamental frequency of a certain sound of interest is detected once or a predetermined number of times within a predetermined number of windows of observation vectors.

In an operation 268, the detected event is output. For example, the detected event may be stored on one or more devices of distributed computing system 128 and/or on computer-readable medium 108 in a variety of formats. The detected event further may be output to display 116, to speaker 118, to printer 120, etc. A warning or alert associated with the detected event further may be output using output interface 104 and/or communication interface 106 so that appropriate action can be initiated in response to the detected event that may indicate a device or machine is not operating properly, has failed, or is predicted to fail, a beehive is indicating a loss of a queen bee, a gunshot has been detected, a cough is a wheezing cough, etc.

In operation 270, a determination is made concerning whether there are additional observation vectors in dataset 126 to sample and process. When there are additional observation vectors, processing continues in operation 253 to define another window of observation vectors and add another column to the adjusted matrix of magnitude values $M_a$. When there are not additional observation vectors, processing continues in an operation 272.

In operation 272, processing is done.

Figure 3:
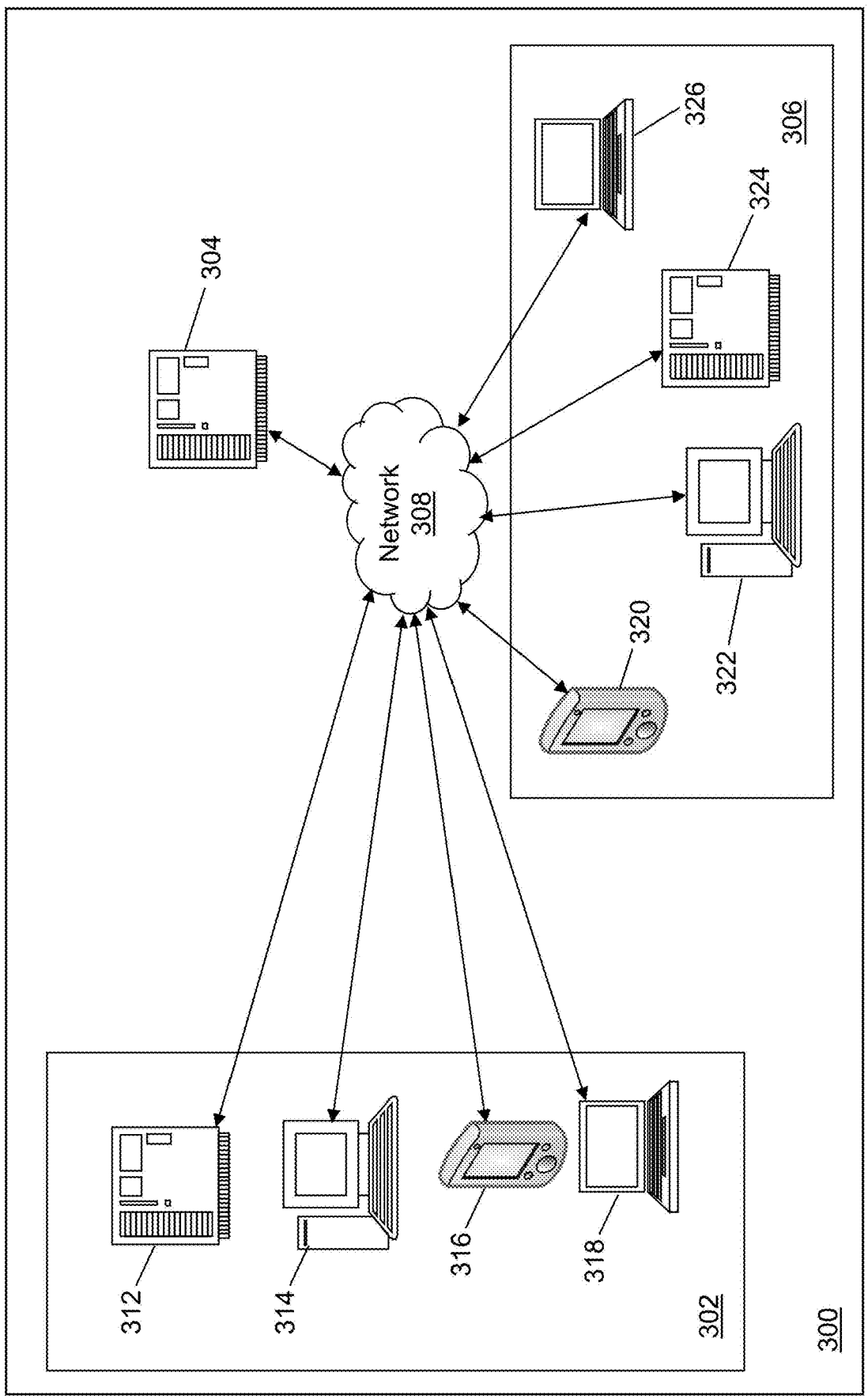
FIG. 3 depicts a block diagram of an event stream processing (ESP) system in accordance with an illustrative embodiment.

Referring to FIG. 3, a block diagram of a stream processing system 300 is shown in accordance with an illustrative embodiment. In an illustrative embodiment, stream processing system 300 may include an event publishing system 302, an ESP device 304, an event subscribing system 306, and a network 308. Each of event publishing system 302, ESP device 304 and event subscribing system 306 may be composed of one or more discrete devices in communication through network 308.

Event publishing system 302 publishes a measurement data value to ESP device 304 as an "event". An event is a data record that reflects a state of a system or a device. An event object is stored using a predefined format that includes fields and keys. For illustration, a first field and a second field may represent an operation code (opcode) and a flag. The opcode enables update, upsert, insert, and delete of an event object. The flag indicates whether the measurement data value and/or other field data has all of the fields filled or only updated fields in the case of an "Update" opcode. An "Upsert" opcode updates the event object if a key field already exists; otherwise, the event object is inserted. ESP device 304 receives the measurement data value in an event stream, processes the measurement data value, and identifies a computing device of event subscribing system 306 to which the processed measurement data value is sent.

Network 308 may include one or more networks of the same or different types. Network 308 can be any type of wired and/or wireless public or private network including a cellular network, a local area network, a wide area network such as the Internet or the World Wide Web, etc. Network 308 further may comprise sub-networks and consist of any number of communication devices.

The one or more computing devices of event publishing system 302 may include computing devices of any form factor such as a server computer 312, a desktop 314, a smart phone 316, a laptop 318, a personal digital assistant, an integrated messaging device, a tablet computer, a point of sale system, a transaction system, an IoT device, etc. Event publishing system 302 can include any number and any combination of form factors of computing devices that may be organized into subnets. The computing devices of event publishing system 302 send and receive signals through network 308 to/from another of the one or more computing devices of event publishing system 302 and/or to/from ESP device 304. The one or more computing devices of event publishing system 302 may communicate using various transmission media that may be wired and/or wireless as understood by those skilled in the art. The one or more computing devices of event publishing system 302 may be geographically dispersed from each other and/or co-located. Each computing device of the one or more computing devices of event publishing system 302 may be executing one or more event publishing applications such as an event publishing application 722 (shown referring to FIG. 7) of the same or different type.

ESP device 304 can include any form factor of computing device. For illustration, FIG. 3 represents ESP device 304 as a server computer. In general, a server computer may include faster processors, additional processors, more disk memory, and/or more RAM than a client computer and support multi-threading as understood by a person of skill in the art. ESP device 304 sends and receives signals through network 308 to/from event publishing system 302 and/or to/from event subscribing system 306. ESP device 304 may communicate using various transmission media that may be wired and/or wireless as understood by those skilled in the art. ESP device 304 may be implemented on a plurality of computing devices of the same or different type that may support failover processing.

The one or more computing devices of event subscribing system 306 may include computers of any form factor such as a smart phone 320, a desktop 322, a server computer 324, a laptop 326, a personal digital assistant, an integrated messaging device, a tablet computer, etc. Event subscribing system 306 can include any number and any combination of form factors of computing devices. The computing devices of event subscribing system 306 send and receive signals through network 308 to/from ESP device 304. The one or more computing devices of event subscribing system 306 may be geographically dispersed from each other and/or co-located. The one or more computing devices of event subscribing system 306 may communicate using various transmission media that may be wired and/or wireless as understood by those skilled in the art. Each computing device of the one or more computing devices of event subscribing system 306 may be executing one or more event subscribing applications such as an event subscribing application 922 (shown referring to FIG. 9) of the same or different type.

Figure 4:
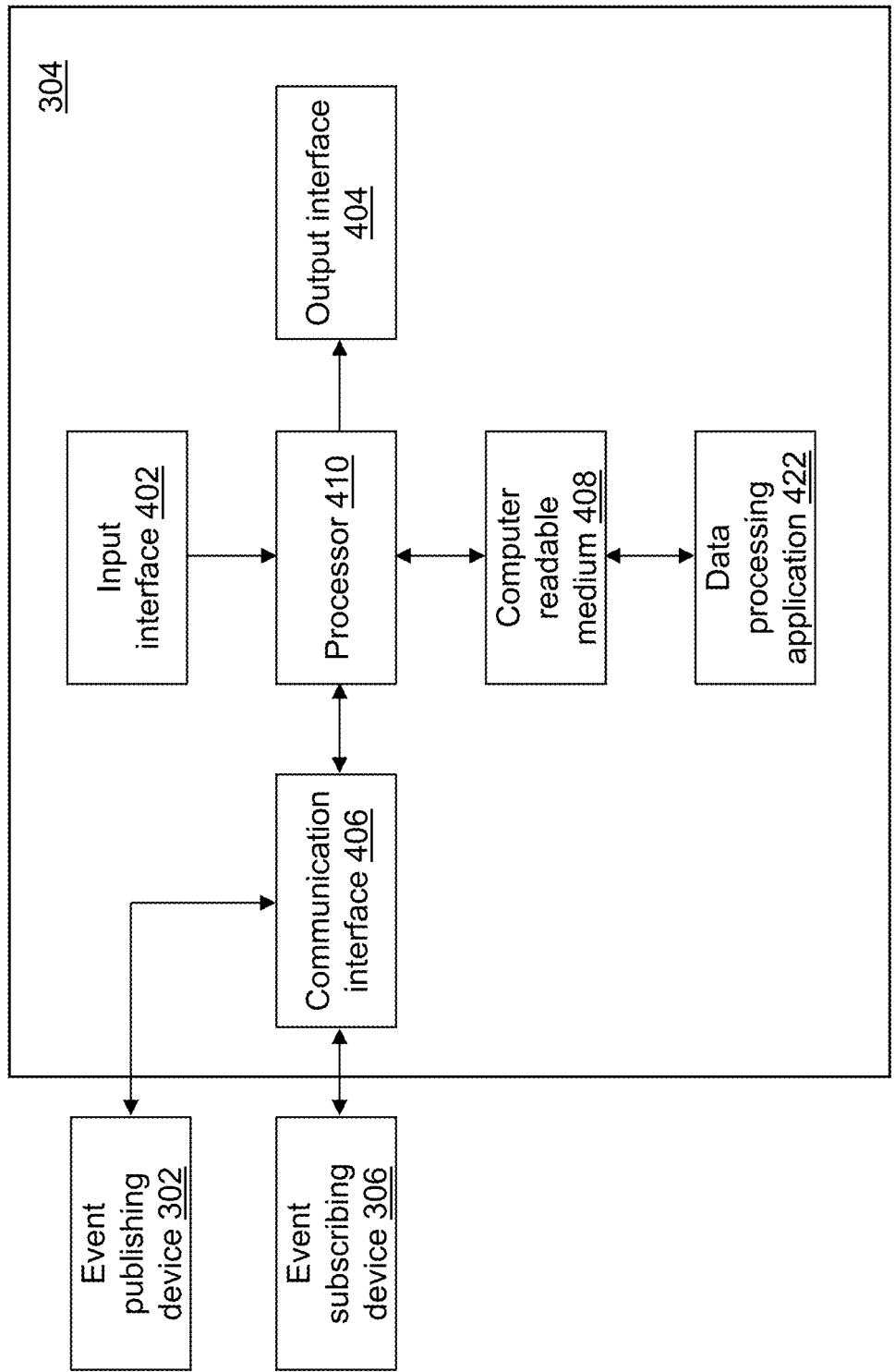
FIG. 4 depicts a block diagram of an ESP device of FIG. 3 in accordance with an illustrative embodiment.

Referring to FIG. 4, a block diagram of ESP device 304 is shown in accordance with an illustrative embodiment. ESP device 304 may include a second input interface 402, a second output interface 404, a second communication interface 406, a second non-transitory computer-readable medium 408, a second processor 410, and data processing application 422. Fewer, different, and/or additional components may be incorporated into ESP device 304. ESP device 304 and monitoring device 100 may be the same or different devices.

Second input interface 402 provides the same or similar functionality as that described with reference to input interface 102 of monitoring device 100 though referring to ESP device 304. Second output interface 404 provides the same or similar functionality as that described with reference to output interface 104 of monitoring device 100 though referring to ESP device 304. Second communication interface 406 provides the same or similar functionality as that described with reference to communication interface 106 of monitoring device 100 though referring to ESP device 304. Data and messages may be transferred between ESP device 304 and event publishing system 302 or event subscribing system 306 using second communication interface 406. Second computer-readable medium 408 provides the same or similar functionality as that described with reference to computer-readable medium 108 of monitoring device 100 though referring to ESP device 304. Second processor 410 provides the same or similar functionality as that described with reference to processor 110 of monitoring device 100 though referring to ESP device 304.

Data processing application 422 performs operations similar to monitoring application 122 and/or frequency detection application 124 on new observation vectors received from an event publishing device 700 (shown referring to FIG. 9) to identify outliers and to monitor for changes in the operation of a device(s), system, physical object, etc. generating the new observation vectors. Data processing application 422 may execute all or a subset of the operations of monitoring application 122 and/or frequency detection application 124. Some or all of the operations described herein may be embodied in data processing application 422. The operations may be implemented using hardware, firmware, software, or any combination of these methods.

Referring to the example embodiment of FIG. 4, data processing application 422 is implemented in software (comprised of computer-readable and/or computer-executable instructions) stored in second computer-readable medium 408 and accessible by second processor 410 for execution of the instructions that embody the operations of data processing application 422. Data processing application 422 may be written using one or more programming languages, assembly languages, scripting languages, etc. Data processing application 422 may be integrated with other analytic tools. As an example, data processing application 422 may be part of an integrated data analytics software application and/or software architecture such as that offered by SAS Institute Inc. of Cary, N.C., USA. For example, data processing application 422 may be part of SAS® Enterprise Miner™ developed and provided by SAS Institute Inc. of Cary, N.C., USA that may be used to create highly accurate predictive and descriptive models based on analysis of vast amounts of data from across an enterprise. Merely for further illustration, data processing application 422 may be implemented using or integrated with one or more SAS software tools such as Base SAS, SAS/STAT®, SAS® High Performance Analytics Server, SAS® LASR™, SAS® In-Database Products, SAS® Scalable Performance Data Engine, SAS/OR®, SAS/ETS®, SAS® Inventory Optimization, SAS® Inventory Optimization Workbench, SAS® Visual Analytics, SAS® Viya™, SAS In-Memory Statistics for Hadoop®, SAS® Forecast Server, all of which are developed and provided by SAS Institute Inc. of Cary, N.C., USA. One or more operations of data processing application 422 further may be performed by an ESPE.

Data processing application 422 may be implemented as a Web application. Data processing application 422 may be integrated with other system processing tools to automatically process data generated as part of operation of an enterprise, to identify any outliers in the processed data, to monitor the data, and to provide a warning or alert associated with the outlier identification using second output interface 404 and/or second communication interface 406 so that appropriate action can be initiated in response to the outlier identification. For example, sensor data may be received from event publishing system 302, processed by data processing application 422, and a warning or an alert may be sent to event subscribing system 306. As another example, sensor data may be received from event publishing system 302, processed by data processing application 422, and the processed data may be sent to event subscribing system 306.

Figure 5:
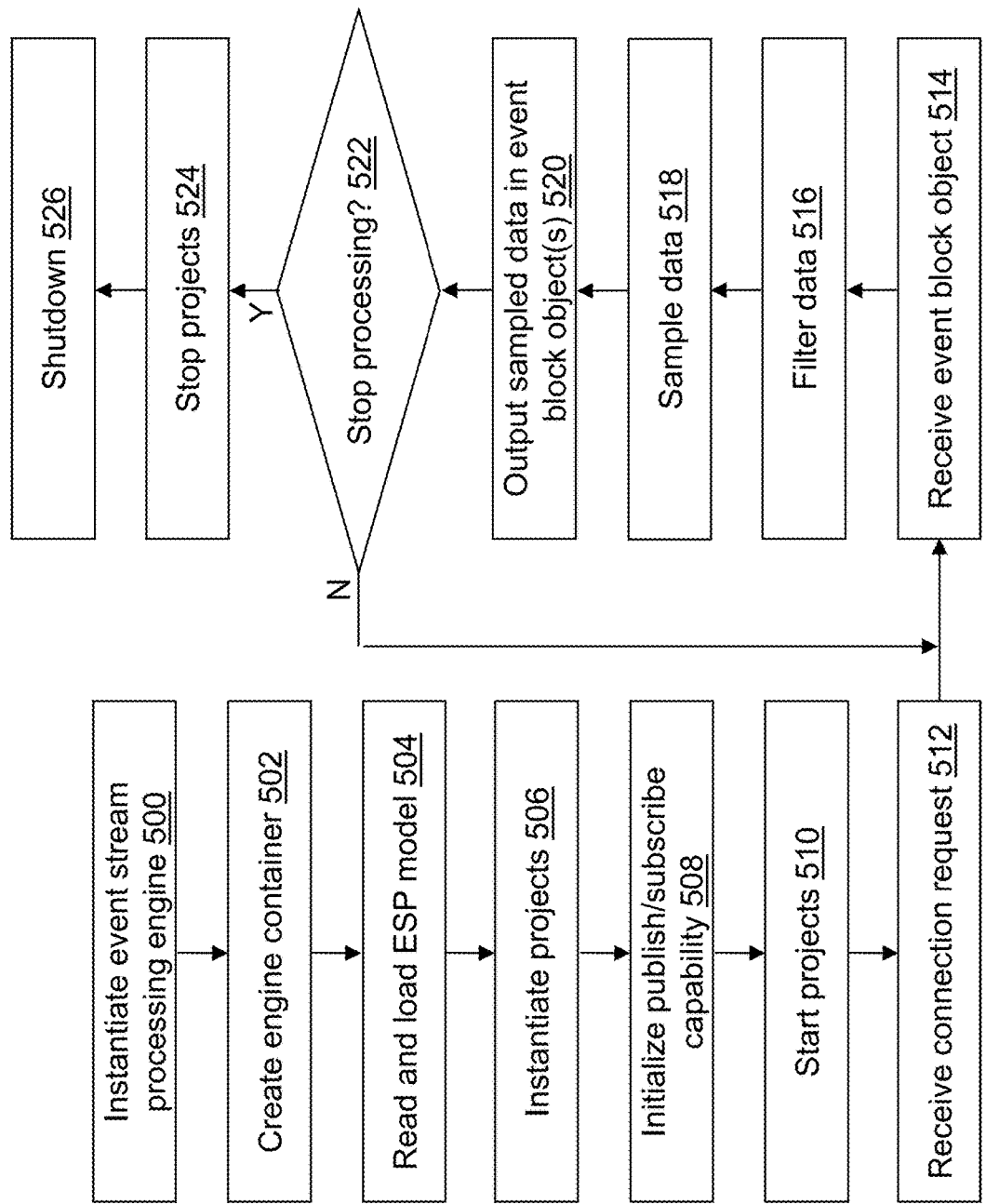
FIG. 5 depicts a flow diagram illustrating examples of operations performed by the ESP device of FIG. 4 in accordance with an illustrative embodiment.

Referring to FIG. 5, a flow diagram illustrating examples of operations performed by ESP device 304 is shown in accordance with an illustrative embodiment. Additional, fewer, or different operations may be performed depending on the embodiment of data processing application 422. The order of presentation of the operations of FIG. 5 is not intended to be limiting. Although some of the operational flows are presented in sequence, the various operations may be performed in various repetitions, concurrently (in parallel, for example, using threads), and/or in other orders than those that are illustrated. In an illustrative embodiment, ESP device 304 is also configured to perform one or more of the operations of FIGS. 2A and/or 2B.

Figure 6:
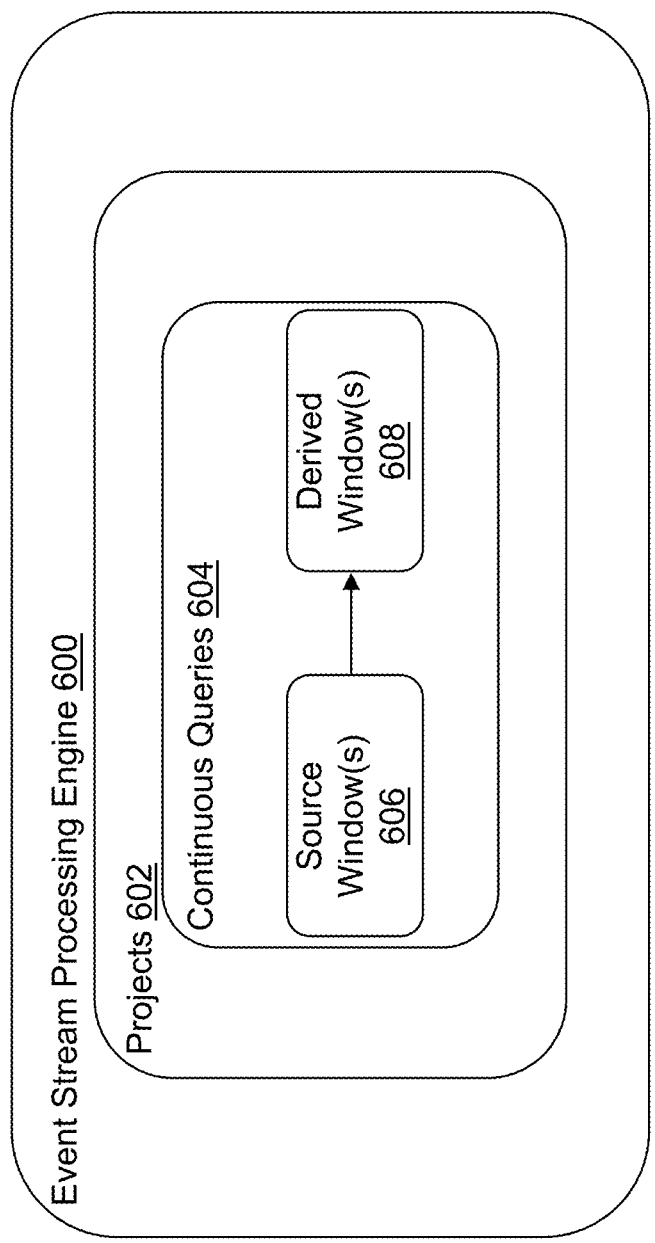
FIG. 6 depicts a block diagram of an ESP engine executing on the ESP device of FIG. 4 in accordance with an illustrative embodiment.

In an operation 500, an ESP engine (ESPE) 600 (shown referring to FIG. 6) is instantiated. For example, referring to FIG. 6, the components of ESPE 600 executing at ESP device 304 are shown in accordance with an illustrative embodiment. ESPE 600 may include one or more projects 602. A project may be described as a second-level container in an engine model managed by ESPE 600 where a thread pool size for the project may be defined by a user. A value of one for the thread pool size indicates that writes are single-threaded. Each project of the one or more projects 602 may include one or more continuous queries 604 that contain data flows, which are data transformations of incoming event streams. The one or more continuous queries 604 may include one or more source windows 606 and one or more derived windows 608.

The engine container is the top-level container in a model that manages the resources of the one or more projects 602. Each ESPE 600 has a unique engine name. Additionally, the one or more projects 602 may each have unique project names, and each query may have a unique continuous query name and begin with a uniquely named source window of the one or more source windows 606. Each ESPE 600 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 606 and the one or more derived windows 608 represent continuously executing queries that generate updates to a query result set as new event blocks stream through ESPE 600. A directed graph, for example, is a set of nodes connected by edges, where the edges have a direction associated with them.

An event object may be described as a packet of data accessible as a collection of fields, with at least one of the fields defined as a key or unique identifier (ID). The event object may be an individual record of an event stream. The event object may be created using a variety of formats including binary, alphanumeric, XML, etc. Each event object may include one or more fields designated as a primary ID for the event so ESPE 600 can support the opcodes for events including insert, update, upsert, and delete. As a result, events entering a source window of the one or more source windows 606 may be indicated as insert (I), update (U), delete (D), or upsert (P).

For illustration, an event object may be a packed binary representation of one or more sensor measurements and may include both metadata and measurement data associated with a timestamp value. The metadata may include the opcode indicating if the event represents an insert, update, delete, or upsert, a set of flags indicating if the event is a normal, a partial-update, or a retention generated event from retention policy management, and one or more microsecond timestamps. For example, the one or more microsecond timestamps may indicate a sensor data generation time, a data receipt time by event publishing device 700, a data transmit time by event publishing device 700, a data receipt time by ESP device 304, etc.

An event block object may be described as a grouping or package of one or more event objects. An event stream may be described as a flow of event block objects. A continuous query of the one or more continuous queries 604 transforms the incoming event stream made up of streaming event block objects published into ESPE 600 into one or more outgoing event streams using the one or more source windows 606 and the one or more derived windows 608. A continuous query can also be thought of as data flow modeling. One or more of the operations of FIGS. 2A and/or 2B may be implemented by the continuous query of the one or more continuous queries 604.

The one or more source windows 606 are at the top of the directed graph and have no windows feeding into them. Event streams are published into the one or more source windows 606 by event publishing system 306, and from there, the event streams are directed to the next set of connected windows as defined by the directed graph. The one or more derived windows 608 are all instantiated windows that are not source windows and that have other windows streaming events into them. The one or more derived windows 608 perform computations or transformations on the incoming event streams. The one or more derived windows 608 transform event streams based on the window type (that is operators such as join, filter, compute, aggregate, copy, pattern match, procedural, union, etc.) and window settings. As event streams are published into ESPE 600, they are continuously queried, and the resulting sets of derived windows in these queries are continuously updated.

Referring again to FIG. 5, in an operation 502, the engine container is created. For illustration, ESPE 600 may be instantiated using a function call that specifies the engine container as a manager for the model. The function call may include the engine name for ESPE 600 that may be unique to ESPE 600.

In an operation 504, an ESP model that may be stored locally to second computer-readable medium 408 is read and loaded.

In an operation 506, the one or more projects 602 defined by the ESP model are instantiated. Instantiating the one or more projects 602 also instantiates the one or more continuous queries 604, the one or more source windows 606, and the one or more derived windows 608 defined from the ESP model. Based on the ESP model, ESPE 600 may analyze and process events in motion or event streams. Instead of storing events and running queries against the stored events, ESPE 600 may store queries and stream events through them to allow continuous analysis of data as it is received. The one or more source windows 606 and the one or more derived windows 608 defined from the ESP model may be created based on the relational, pattern matching, and procedural algorithms that transform the input event streams into the output event streams to model, simulate, score, test, predict, etc. based on the continuous query model defined by the ESP model and event publishing application 722 that is streaming data to ESPE 600. For example, the one or more projects 602 may be designed to perform one or more of operations 202, 204, 212, and/or 214 or to perform one or more of operations 202, 204, 250, and/or 252 on observation vectors received in event block objects.

In an operation 508, the pub/sub capability is initialized for ESPE 600. In an illustrative embodiment, the pub/sub capability is initialized for each project of the one or more projects 602. To initialize and enable pub/sub capability for ESPE 600, a host name and a port number are provided. The host name and the port number of ESPE 600 may be read from the ESP model. Pub/sub clients can use the host name and the port number of ESP device 304 to establish pub/sub connections to ESPE 600. For example, a server listener socket is opened for the port number to enable event publishing system 302 and/or event subscribing system 306 to connect to ESPE 600 for pub/sub services. The host name and the port number of ESP device 304 to establish pub/sub connections to ESPE 600 may be referred to as the host:port designation of ESPE 600 executing on ESP device 304.

Pub/sub is a message-oriented interaction paradigm based on indirect addressing. Processed data recipients (event subscribing system 306) specify their interest in receiving information from ESPE 600 by subscribing to specific classes of events, while information sources (event publishing system 302) publish events to ESPE 600 without directly addressing the data recipients.

In an operation 510, the one or more projects 602 defined from the ESP model are started. The one or more started projects may run in the background on ESP device 304.

In an operation 512, a connection request is received from event publishing device 700 for a source window to which data will be published. A connection request further is received from a computing device of event subscribing system 306, for example, from event subscribing device 900.

In an operation 514, an event block object is received from event publishing device 700. An event block object containing one or more event objects is injected into a source window of the one or more source windows 606 defined from the ESP model. The event block object may include one or more observation vectors. Each time a new event block object is received into the source window, the appropriate data within the received event block object is extracted for processing.

In an operation 516, the received event block object is processed through the one or more continuous queries 604. For example, the one or more continuous queries 604 may be designed to filter the observation vectors similar to operation 212 of FIG. 2A or operation 250 of FIG. 2B received in event block objects based on parameters defined, for example, in the ESP model as described referring to operation 202 of FIGS. 2A and 2B. The unique ID assigned to the event block object by event publishing device 700 is maintained as the event block object is passed through ESPE 600 and between the one or more source windows 606 and/or the one or more derived windows 608 of ESPE 600. A unique embedded transaction ID further may be embedded in the event block object as the event block object is processed by a continuous query. ESPE 600 maintains the event block containership aspect of the received event blocks from when the event block is published into a source window and works its way through the directed graph defined by the one or more continuous queries 604 with the various event translations before being output to event subscribing device 900.

In an operation 518, the one or more continuous queries 604 further may be designed to sample the observation vectors similar to operation 214 of FIG. 2A or operation 252 of FIG. 2B received in event block objects based on parameters defined, for example, in the ESP model as described referring to operation 204 of FIGS. 2A and 2B.

In an operation 520, the processed event block object is output to one or more subscribing devices of event subscribing system 306 such as event subscribing device 900. An output from the one or more continuous queries 604 may be the filtered and sampled data.

Event subscribing device 900 can correlate a group of subscribed event block objects back to a group of published event block objects by comparing the unique ID of the event block object that a publisher, such as event publishing device 700, attached to the event block object with the event block ID received by event subscribing device 900. The received event block objects further may be stored, for example, in a RAM or cache type memory of second computer-readable medium 408.

In an operation 522, a determination is made concerning whether or not processing is stopped. If processing is not stopped, processing continues in operation 514 to continue receiving the one or more event streams containing event block objects from event publishing device 700. If processing is stopped, processing continues in an operation 524.

In operation 524, the started projects are stopped.

In an operation 526, ESPE 600 is shutdown.

Figure 7:
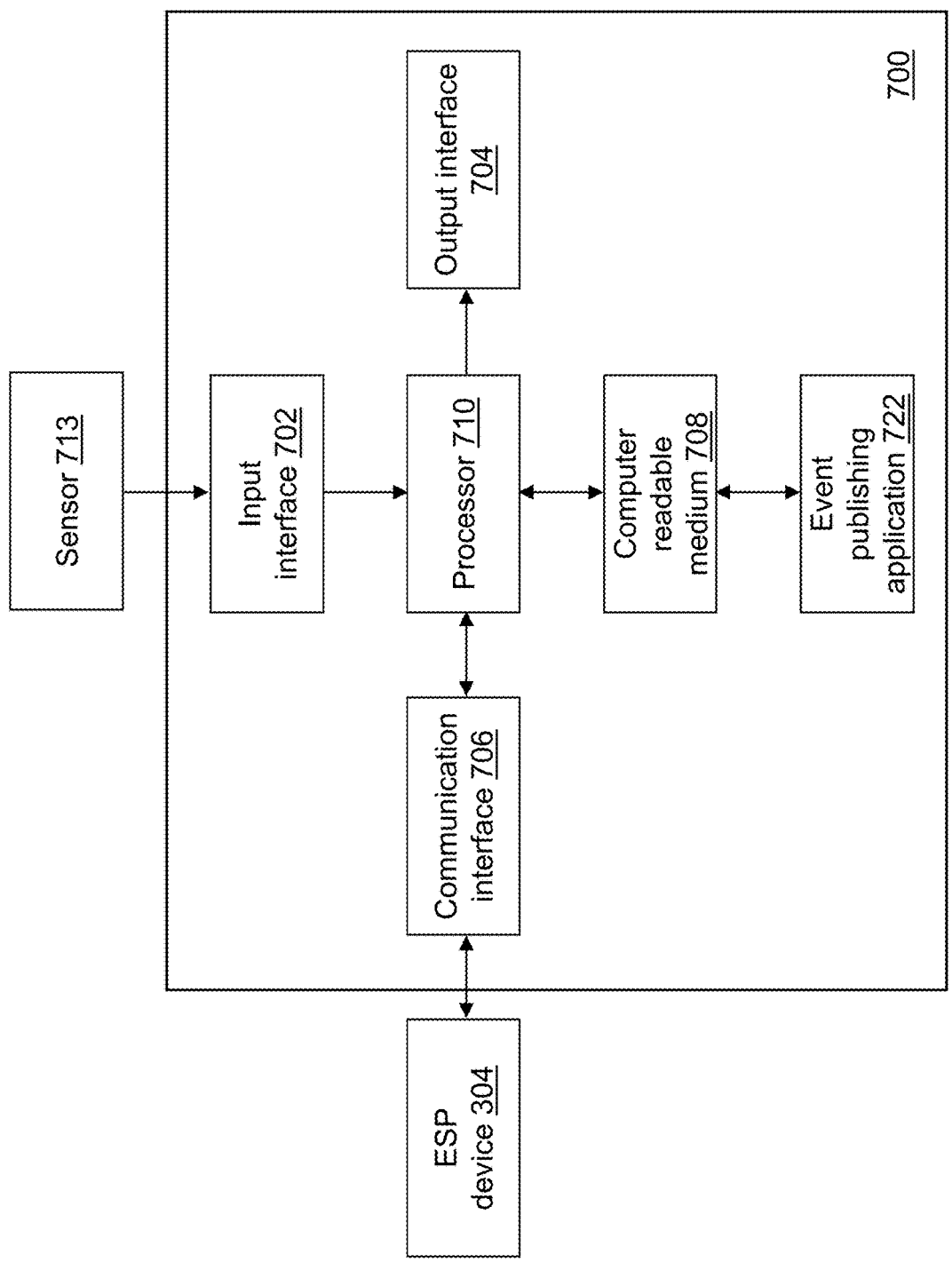
FIG. 7 depicts a block diagram of an event publishing device of an event publishing system of the ESP system of FIG. 3 in accordance with an illustrative embodiment.

Referring to FIG. 7, a block diagram of an event publishing device 700 of event publishing system 302 is shown in accordance with an example embodiment. Event publishing device 700 is an example computing device of event publishing system 302. For example, each of server computer 312, desktop 314, smart phone 316, and laptop 318 may be an instance of event publishing device 700. Event publishing device 700 may include a third input interface 702, a third output interface 704, a third communication interface 706, a third computer-readable medium 708, a third processor 710, and event publishing application 722. Each event publishing device 700 of event publishing system 302 may include the same or different components and combinations of components. Fewer, different, and additional components may be incorporated into event publishing device 700. Event publishing system 302 includes, is integrated with, and/or communicates with a sensor 713, data generation devices, data capture devices, etc. For example, sensor 713 may be the same as or similar to sensor 113.

Third input interface 702 provides the same or similar functionality as that described with reference to input interface 102 of monitoring device 100 though referring to event publishing device 700. Third output interface 704 provides the same or similar functionality as that described with reference to output interface 104 of monitoring device 100 though referring to event publishing device 700. Third communication interface 706 provides the same or similar functionality as that described with reference to communication interface 106 of monitoring device 100 though referring to event publishing device 700. Data and messages may be transferred between event publishing device 700 and ESP device 304 using third communication interface 706. Third computer-readable medium 708 provides the same or similar functionality as that described with reference to computer-readable medium 108 of monitoring device 100 though referring to event publishing device 700. Third processor 710 provides the same or similar functionality as that described with reference to processor 110 of monitoring device 100 though referring to event publishing device 700.

Event publishing application 722 performs operations associated with generating, capturing, and/or receiving a measurement data value and publishing the measurement data value in an event stream to ESP device 304. One or more measurement data values may be included in an observation vector. The operations may be implemented using hardware, firmware, software, or any combination of these methods. Referring to the example embodiment of FIG. 7, event publishing application 722 is implemented in software (comprised of computer-readable and/or computer-executable instructions) stored in third computer-readable medium 708 and accessible by third processor 710 for execution of the instructions that embody the operations of event publishing application 722. Event publishing application 722 may be written using one or more programming languages, assembly languages, scripting languages, etc. Event publishing application 722 may be implemented as a Web application.

Figure 8:
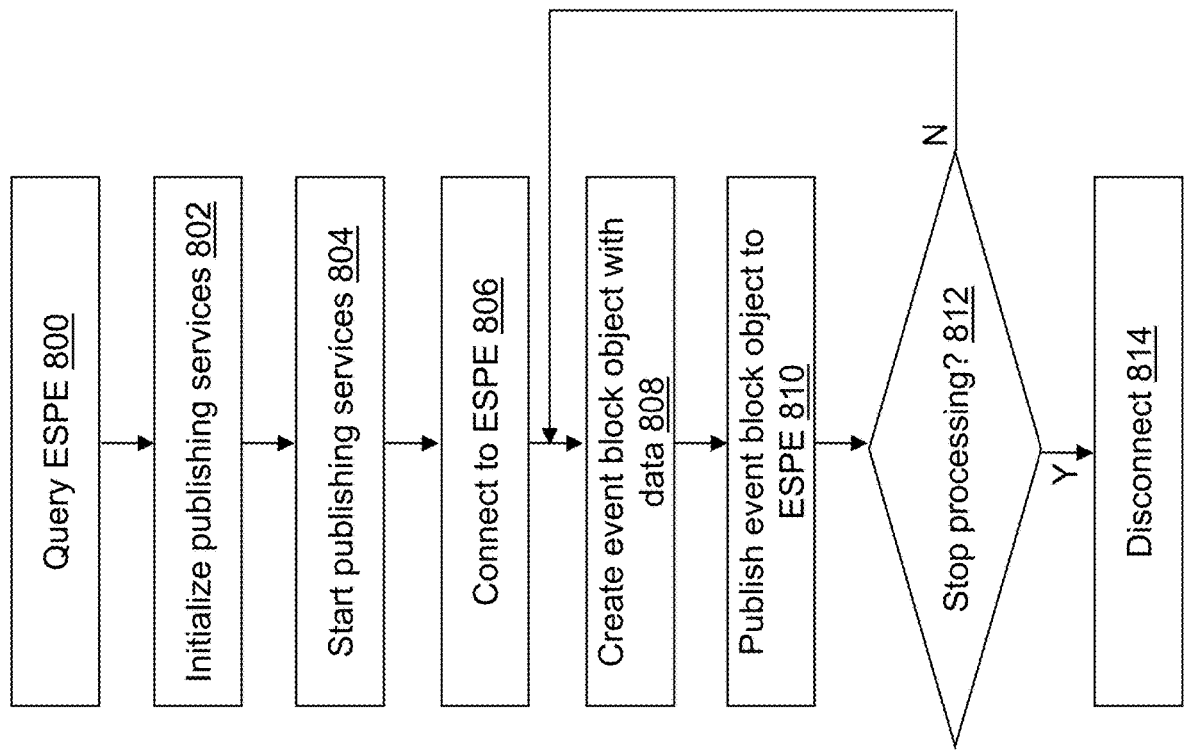
FIG. 8 depicts a flow diagram illustrating examples of operations performed by the event publishing device of FIG. 7 in accordance with an illustrative embodiment.

Referring to FIG. 8, example operations associated with event publishing application 722 are described. Additional, fewer, or different operations may be performed depending on the embodiment. The order of presentation of the operations of FIG. 8 is not intended to be limiting. A user can interact with one or more user interface windows presented to the user in a display under control of event publishing application 722 independently or through a browser application in an order selectable by the user. Although some of the operational flows are presented in sequence, the various operations may be performed in various repetitions, concurrently, and/or in other orders than those that are illustrated. For example, a user may execute event publishing application 722, which causes presentation of a first user interface window, which may include a plurality of menus and selectors such as drop-down menus, buttons, text boxes, hyperlinks, etc. associated with event publishing application 722 as understood by a person of skill in the art. As further understood by a person of skill in the art, various operations may be performed in parallel, for example, using a plurality of threads or a plurality of computing devices such as a grid or a cloud of computing devices.

In an operation 800, ESPE 600 is queried, for example, to discover projects 602, continuous queries 604, windows 606, 808, window schema, and window edges currently running in ESPE 600. The engine name and host/port to ESPE 600 may be provided as an input to the query and a list of strings may be returned with the names of the projects 602, of the continuous queries 604, of the windows 606, 808, of the window schema, and/or of the window edges of currently running projects on ESPE 600. The host is associated with a host name or Internet Protocol (IP) address of ESP device 304. The port is the port number provided when a publish/subscribe (pub/sub) capability is initialized by ESPE 600. The engine name is the name of ESPE 600. The engine name of ESPE 600 and host/port to ESP device 304 may be read from a storage location on third computer-readable medium 708, may be provided on a command line, or otherwise input to or defined by event publishing application 722 as understood by a person of skill in the art.

In an operation 802, publishing services are initialized.

In an operation 804, the initialized publishing services are started, which may create a publishing client for the instantiated event publishing application 722. The publishing client performs the various pub/sub activities for the instantiated event publishing application 722. For example, a string representation of a URL to ESPE 600 is passed to a "Start" function. For example, the URL may include the host:port designation of ESPE 600 executing at ESP device 304, a project of the projects 602, a continuous query of the continuous queries 604, and a window of the source windows 606. The "Start" function may validate and retain the connection parameters for a specific publishing client connection and return a pointer to the publishing client. For illustration, the URL may be formatted as "dfESP://<host>:<port>/<project name>/<continuous query name>/<source window name>". If event publishing application 722 is publishing to more than one source window of ESPE 600, the initialized publishing services may be started to each source window using the associated names (project name, continuous query name, source window name).

In an operation 806, a connection is made between event publishing application 722 and ESPE 600 for each source window of the source windows 606 to which any measurement data value is published. To make the connection, the pointer to the created publishing client may be passed to a "Connect" function. If event publishing application 722 is publishing to more than one source window of ESPE 600, a connection may be made to each started window using the pointer returned for the respective "Start" function call.

In an operation 808, an event block object is created by event publishing application 722 that includes one or more measurement data values. The measurement data values may have been received, captured, generated, etc., for example, through third communication interface 906 or third input interface 902 or by third processor 910. The measurement data values may be processed before inclusion in the event block object, for example, to change a unit of measure, convert to a different reference system, etc. The event block object may include one or more measurement data values measured at different times and/or by different devices and/or by the same or different sensors associated with each device.

In an operation 810, the created event block object is published to ESPE 600, for example, using the pointer returned for the respective "Start" function call to the appropriate source window. Event publishing application 722 passes the created event block object to the created publishing client, where the unique ID field in the event block object has been set by event publishing application 722 possibly after being requested from the created publishing client. In an illustrative embodiment, event publishing application 722 may wait to begin publishing until a "Ready" callback has been received from the created publishing client. The event block object is injected into the source window, continuous query, and project associated with the started publishing client.

In an operation 812, a determination is made concerning whether or not processing is stopped. If processing is not stopped, processing continues in operation 808 to continue creating and publishing event block objects that include measurement data values. If processing is stopped, processing continues in an operation 814.

In operation 814, the connection made between event publishing application 722 and ESPE 600 through the created publishing client is disconnected, and each started publishing client is stopped.

Figure 9:
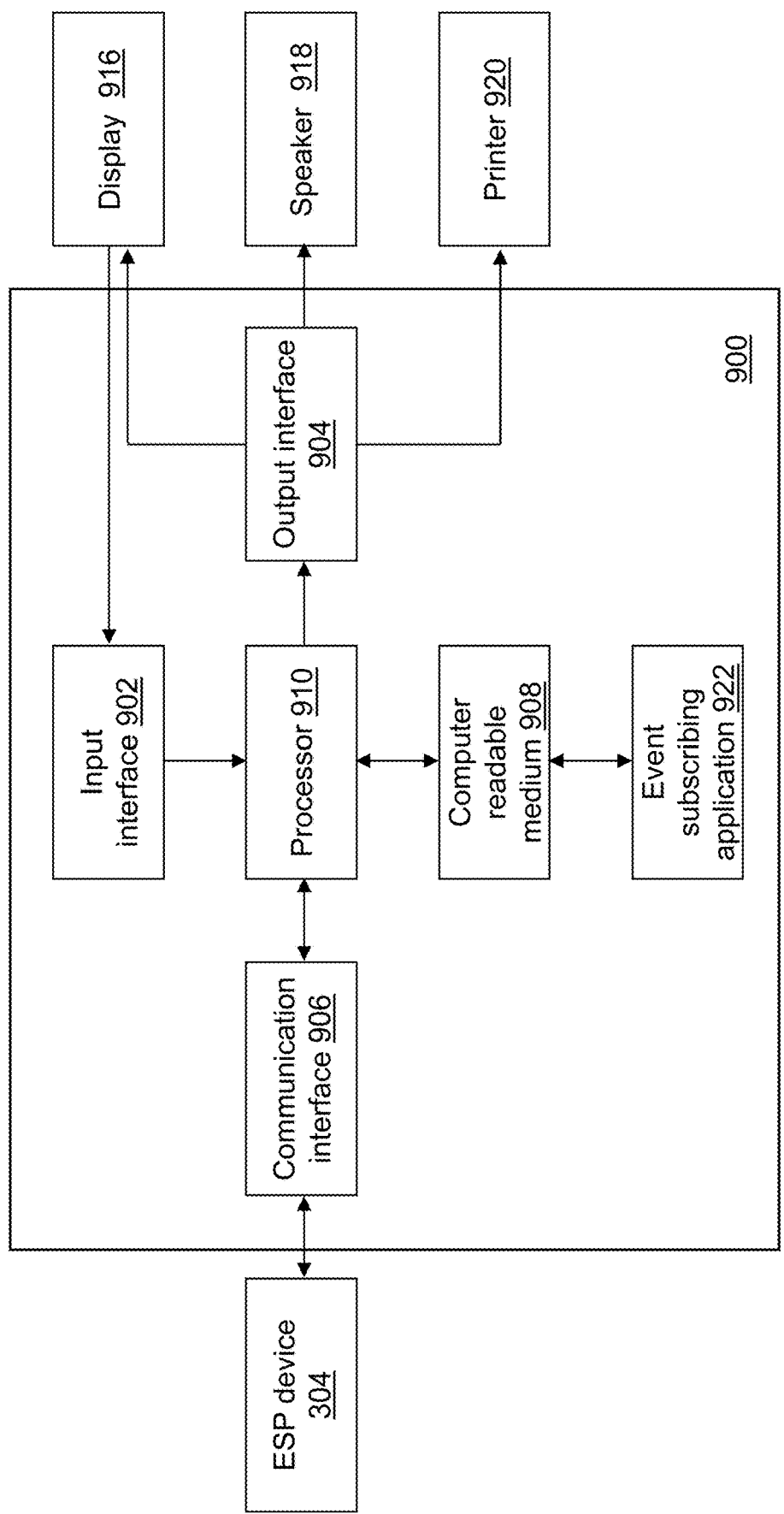
FIG. 9 depicts a block diagram of an event subscribing device of an event subscribing system of the ESP system of FIG. 3 in accordance with an illustrative embodiment.

Referring to FIG. 9, a block diagram of event subscribing device 900 is shown in accordance with an example embodiment. Event subscribing device 900 is an example computing device of event subscribing system 306. For example, each of smart phone 320, desktop 322, server computer 324, and laptop 326 may be an instance of event subscribing device 900. Event subscribing device 900 may include a fourth input interface 902, a fourth output interface 904, a fourth communication interface 906, a fourth computer-readable medium 908, a fourth processor 910, and event subscribing application 922. Fewer, different, and additional components may be incorporated into event subscribing device 900. Each event subscribing device 900 of event subscribing system 306 may include the same or different components or combination of components.

Fourth input interface 902 provides the same or similar functionality as that described with reference to input interface 102 of monitoring device 100 though referring to event subscribing device 900. Fourth output interface 904 provides the same or similar functionality as that described with reference to output interface 104 of monitoring device 100 though referring to event subscribing device 900. Fourth communication interface 906 provides the same or similar functionality as that described with reference to communication interface 106 of monitoring device 100 though referring to event subscribing device 900. Data and messages may be transferred between event subscribing device 900 and ESP device 304 using fourth communication interface 906. Fourth computer-readable medium 908 provides the same or similar functionality as that described with reference to computer-readable medium 108 of monitoring device 100 though referring to event subscribing device 900. Fourth processor 910 provides the same or similar functionality as that described with reference to processor 110 of monitoring device 100 though referring to event subscribing device 900.

Figure 10A:
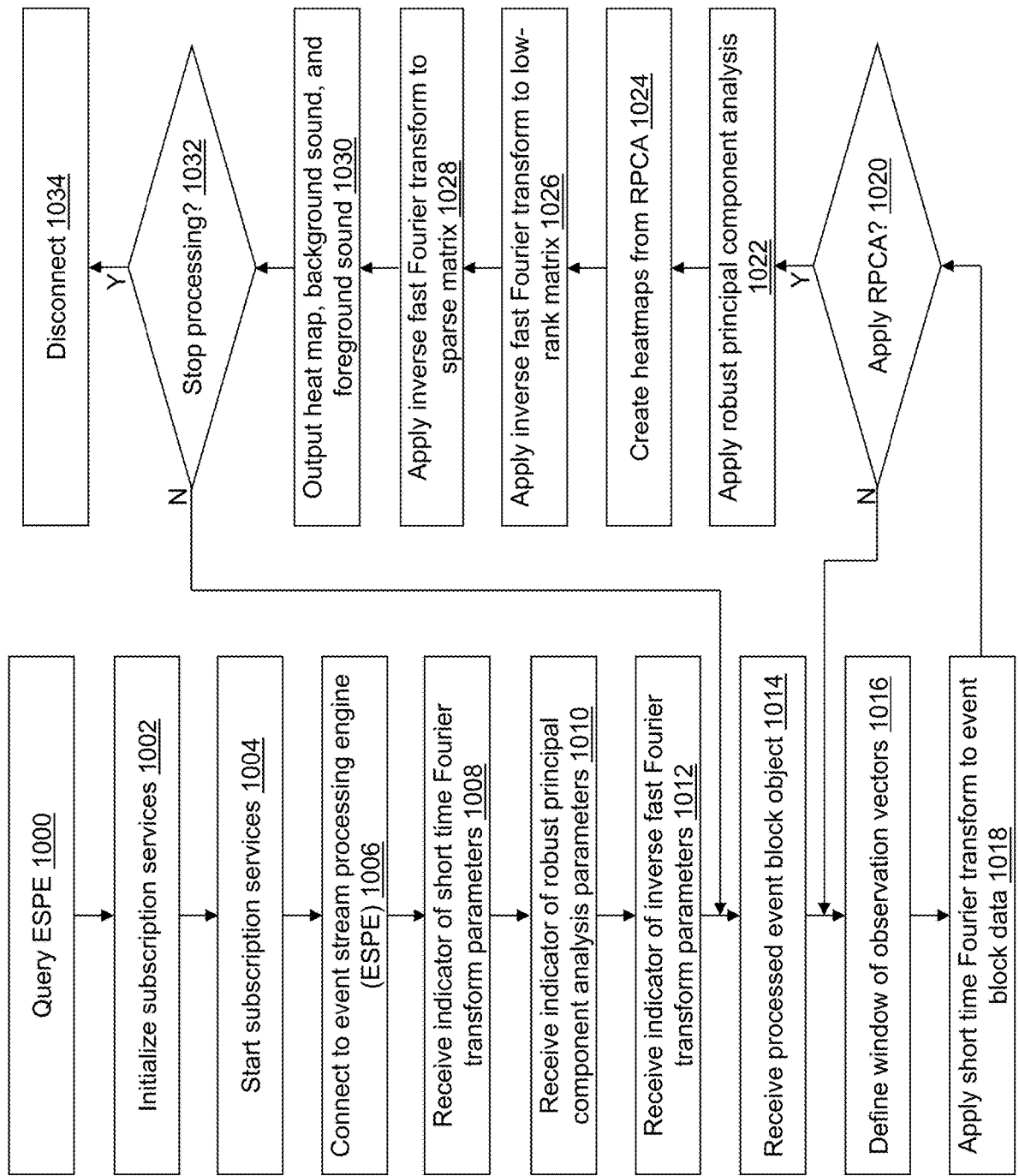
FIG. 10A depicts a flow diagram illustrating examples of monitoring operations performed by the event subscribing device of FIG. 9 in accordance with an illustrative embodiment.

Referring to FIG. 10A, example operations associated with event subscribing application 922 are described. Additional, fewer, or different operations may be performed depending on the embodiment. The order of presentation of the operations of FIG. 10A is not intended to be limiting.

Similar to operation 900, in an operation 1000, ESPE 600 is queried, for example, to discover names of projects 602, of continuous queries 604, of windows 606, 808, of window schema, and of window edges currently running in ESPE 600. The host name of ESP device 304, the engine name of ESPE 600, and the port number opened by ESPE 600 are provided as an input to the query and a list of strings may be returned with the names to the projects 602, continuous queries 604, windows 606, 808, window schema, and/or window edges.

In an operation 1002, subscription services are initialized.

In an operation 1004, the initialized subscription services are started, which may create a subscribing client on behalf of event subscribing application 922 at event subscribing device 900. The subscribing client performs the various pub/sub activities for event subscribing application 922. For example, a URL to ESPE 600 may be passed to a "Start" function. The "Start" function may validate and retain the connection parameters for a specific subscribing client connection and return a pointer to the subscribing client. For illustration, the URL may be formatted as "dfESP://<host>:<port>/<project name>/<continuous query name>/<window name>".

In an operation 1006, a connection may be made between event subscribing application 922 executing at event subscribing device 900 and ESPE 600 through the created subscribing client. To make the connection, the pointer to the created subscribing client may be passed to a "Connect" function and a mostly non-busy wait loop created to wait for receipt of event block objects.

Similar to operation 206, in an operation 1008, the fourth indicator is received that indicates a value for one or more parameters to define the STFT application.

Similar to operation 208, in an operation 1010, the fifth indicator is received that indicates one or more parameters to define the RPCA application.

Similar to operation 210, in an operation 1012, the sixth indicator is received that indicates a value for one or more parameters to define the IFFT application.

In an operation 1014, the processed event block object is received by event subscribing application 922 executing at event subscribing device 900 as a result of operation 520.

The received event block object is processed based on the operational functionality provided by event subscribing application 922. For example, similar to operation 215, in an operation 1016, a window of observation vectors is defined from the sampled data based on the values for the STFT window length and/or the STFT duration indicated in operation 1008.

Similar to operation 216, in an operation 1018, the vector of magnitude values V is computed for the defined window of observation vectors and added as a next column of a matrix of magnitude values M.

Similar to operation 218, in an operation 1020, a determination is made concerning whether to apply RPCA to the matrix of magnitude values M. When RPCA is to be applied, processing continues in an operation 1022. When RPCA is not yet to be applied, processing continues in operation 1016 to define another window of observation vectors and apply the STFT to add another column to the matrix of magnitude values M. For example, once a predetermined number of columns is added to the matrix of magnitude values M, processing continues in operation 1022

Similar to operation 220, in operation 1022, the RPCA is applied to the matrix of magnitude values M with the RPCA parameters indicated in operation 1010 to define a sparse matrix S and a low-rank matrix L, where M=L+S.

Similar to operation 222, in an operation 1024, one or more heatmaps may be created from the RPCA matrices.

Similar to operation 224, in an operation 1026, the IFFT is applied to the low-rank matrix L with the IFFT parameters indicated in operation 1012 to define, for example, sounds associated with the low-rank matrix that may be referred to as background sound.

Similar to operation 226, in an operation 1028, the IFFT is applied to the sparse matrix S with the IFFT parameters indicated in operation 1012 to define, for example, sounds associated with the sparse matrix that may be referred to as foreground sound.

Similar to operation 228, in an operation 1030, the heatmaps may be output, for example, by storing to fourth computer-readable medium 908, by presentation on a second display 916, by printing on a second printer 920, etc. The transformed low-rank matrix L and the transformed sparse matrix S may be output, for example, by storing to fourth computer-readable medium 908, by playing on a second speaker 918, etc.

In an operation 1032, a determination is made concerning whether or not processing is stopped. If processing is not stopped, processing continues in operation 1014 to continue receiving and processing event block objects. If processing is stopped, processing continues in an operation 1034. Of course, event block objects may be continually received as operations 1018 through 1030 are being performed. The window of observation vectors may be created from the continually received event block objects.

In operation 1034, the connection made between event subscribing application 922 and ESPE 600 through the subscribing client is disconnected, and the subscribing client is stopped.

Figure 10B:
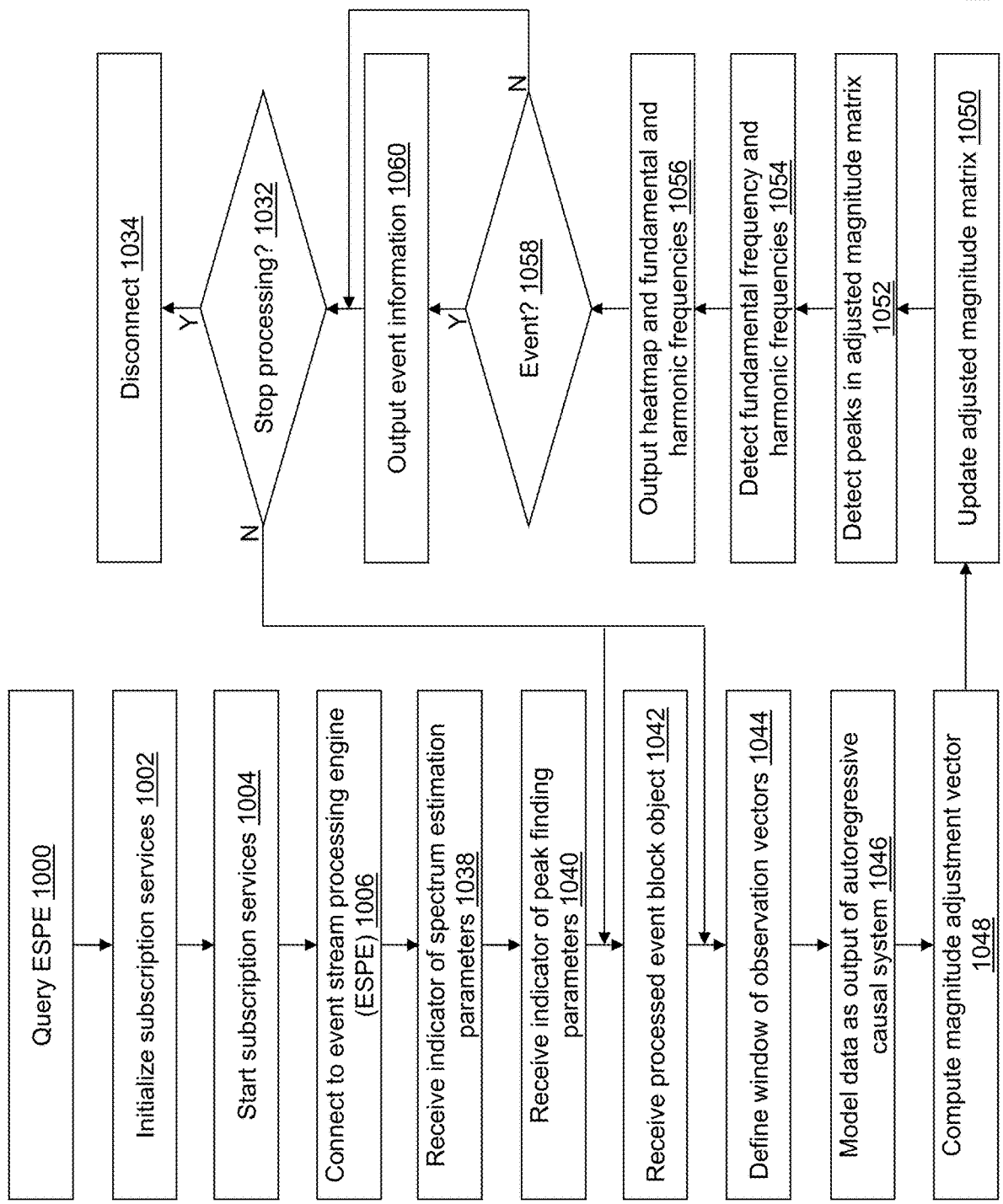
FIG. 10B depicts a flow diagram illustrating examples of detection operations performed by the event subscribing device of FIG. 9 in accordance with an illustrative embodiment.

Referring to FIG. 10B, example operations associated with event subscribing application 922 are described in accordance with another embodiment. Additional, fewer, or different operations may be performed depending on the embodiment. The order of presentation of the operations of FIG. 10B is not intended to be limiting.

In operation 1000, ESPE 600 is queried.

In operation 1002, subscription services are initialized.

In operation 1004, the initialized subscription services are started.

In operation 1006, a connection may be made between event subscribing application 922 executing at event subscribing device 900 and ESPE 600 through the created subscribing client.

Similar to operation 246, in an operation 1038, the seventh indicator is received that indicates the value for the one or more parameters to estimate the spectrum.

Similar to operation 248, in an operation 1050, the eighth indicator is received that indicates the value for one or more parameters to find peaks in the frequency spectrum.

In an operation 1042, the processed event block object is received by event subscribing application 922 executing at event subscribing device 900 as a result of operation 520.

The received event block object is processed based on the operational functionality provided by event subscribing application 922. For example, similar to operation 253, in an operation 1044, a window of observation vectors is defined from the sampled data based on the values for the STFT window length and/or the STFT duration indicated in operation 1008.

Similar to operation 254, in an operation 1046, the defined window of observation vectors is modeled as an output of an autoregressive (AR) causal system to estimate a power spectrum.

Similar to operation 256, in an operation 1048, a magnitude adjustment vector B is computed.

Similar to operation 258, in an operation 1050, an adjusted matrix of magnitude values $M_a$ is computed and updated, for example, using $M_a(:, i)=M(:, i)+B$, i=1, 2, . . . , numCols, where numCols is a number of columns of the matrix of magnitude values M.

Similar to operation 260, in an operation 1052, a peak finding algorithm is used to detect peaks in a most recently added column of the adjusted matrix of magnitude values $M_a$ that is associated with a spectral curve computed for the window of observation vectors defined in operation 1044.

Similar to operation 262, in an operation 1054, a fundamental frequency is detected by selecting a highest magnitude peak detected in the frequency range indicated in operation 248. A linear fit is used to find the harmonic frequencies of the fundamental frequency that are integer multiples of the fundamental frequency.

Similar to operation 264, in an operation 1056, the adjusted matrix of magnitude values $M_a$ and the fundamental and harmonic frequencies may be output, for example, by storing to fourth computer-readable medium 908, by presentation on second display 916, by printing on second printer 920, etc.

Similar to operation 266, in an operation 1058, a determination is made concerning whether an event has occurred. When an event has occurred, processing continues in an operation 1060. When an event has not occurred, processing continues in an operation 1032.

Similar to operation 268, in an operation 1060, the detected event is output. For example, the detected event may be stored on fourth computer-readable medium 908 in a variety of formats. The detected event further may be output to second display 916, to second speaker 918, to second printer 920, etc. A warning or alert associated with the detected event further may be output using fourth output interface 904 and/or fourth communication interface 906 so that appropriate action can be initiated in response to the detected event.

In operation 1032, a determination is made concerning whether or not processing is stopped. If processing is not stopped, processing continues in operation 1042 to continue receiving and processing event block objects or in operation 1044 to continue processing windows of observation vectors. If processing is stopped, processing continues in operation 1034. Of course, event block objects may be continually received as operations 1044 through 1060 are being performed. The window of observation vectors may be created from the continually received event block objects.

In operation 1034, the connection made between event subscribing application 922 and ESPE 600 through the subscribing client is disconnected, and the subscribing client is stopped.

Event subscribing application 922 and ESPE 600 provide real-time analysis of acoustic and/or vibration data for even a large volume of data. Event subscribing application 922 and ESPE 600 can detect fundamental frequencies of interest despite the presence of extraneous sounds that make it difficult to detect the sounds being monitored.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. A non-transitory computer-readable medium having stored thereon computer-readable instructions that when executed by a computing device cause the computing device to:
   (A) define a first window that includes a subset of a plurality of observation vectors, wherein each observation vector of the plurality of observation vectors includes a sensor value measured by a sensor, wherein the plurality of observation vectors includes the sensor value measured as a function of time;
   (B) model the subset of the plurality of observation vectors as an output of an autoregressive (AR) causal system to estimate a power spectrum for the subset of the plurality of observation vectors;
   (C) compute a magnitude adjustment vector from a mean computed for a matrix of magnitude values, wherein the matrix of magnitude values includes a column for each window of a plurality of windows, wherein the first window is stored in a next column of the matrix of magnitude values, wherein each cell of the matrix of magnitude values includes an estimated power spectrum value for a respective window and a respective frequency;
   (D) update a second matrix of magnitude values using the computed magnitude adjustment vector, wherein each cell of the second matrix of magnitude values includes an adjusted power spectrum value for the respective window and the respective frequency;
   (E) detect a peak in the next column of the second matrix of magnitude values;
   (F) determine whether the detected peak is within a predefined frequency range; and
   (G) when the detected peak is within the predefined frequency range, output an event indicator to indicate an event has occurred.

2. The non-transitory computer-readable medium of claim 1, wherein the subset of the plurality of observation vectors is selected to span a predefined length of time.

3. The non-transitory computer-readable medium of claim 1, wherein the subset of the plurality of observation vectors is selected to include a predefined number of observation vectors.

4. The non-transitory computer-readable medium of claim 1, further comprising repeating (A) through (G) with successive windows defined from the plurality of observation vectors until processing is stopped.

5. The non-transitory computer-readable medium of claim 4, wherein the successive windows include successive subsets selected from the plurality of observation vectors sequentially in time.

6. The non-transitory computer-readable medium of claim 5, wherein each successive subset includes an overlapping number of observation vectors selected from a previous subset in most recent time order based on a predefined overlap ratio.

7. The non-transitory computer-readable medium of claim 4, wherein after (F) and before (G), the computer-readable instructions further cause the computing device to:
   when the detected peak is within the predefined frequency range,
      detect a fundamental frequency of a highest magnitude peak detected within the predefined frequency range; and
      increment a counter of a number of peaks detected within the predefined frequency range and in consecutive of the successive windows;
   wherein the event indicator is output to indicate an event has occurred when the detected peak is within the predefined frequency range and when the incremented counter exceeds a predetermined threshold value.

8. The non-transitory computer-readable medium of claim 4, wherein after (F) and before (G), the computer-readable instructions further cause the computing device to:
   when the detected peak is within the predefined frequency range,
      detect a fundamental frequency of a highest magnitude peak detected within the predefined frequency range; and
      determine a number of harmonic peaks detected at an integer multiple of the detected fundamental frequency;
   wherein the event indicator is output to indicate an event has occurred when the detected peak is within the predefined frequency range and when the determined number of harmonic peaks exceeds a predetermined threshold value.

9. The non-transitory computer-readable medium of claim 4, wherein after (F) and before (G), the computer-readable instructions further cause the computing device to:
   when the detected peak is within the predefined frequency range,
      detect a fundamental frequency of a highest magnitude peak detected within the predefined frequency range;
      determine a number of harmonic peaks detected at an integer multiple of the detected fundamental frequency; and
      increment a counter of a number of peaks detected within the predefined frequency range and in consecutive of the successive windows when the determined number of harmonic peaks exceeds a first predetermined threshold value;
wherein the event indicator is output to indicate an event has occurred when the detected peak is within the predefined frequency range and when the incremented counter exceeds a second predetermined threshold value.

10. The non-transitory computer-readable medium of claim 1, wherein the subset of the plurality of observation vectors are modeled as an output of the AR causal system modeled driven by a white noise sequence.

11. The non-transitory computer-readable medium of claim 10, wherein a relationship between the white noise sequence and an output signal defined by the subset of the plurality of observation vectors is defined as $$x(n) + \sum_{i=1}^{N} a_i x(n-i) = e(n),$$

where x(n) is the subset of the plurality of observation vectors, n is a number of observation vectors included in the defined first window, $a_i$ is an $i^{th}$ coefficient of the AR causal system, e(n) is the white noise sequence, and N is a predefined AR model order.

12. The non-transitory computer-readable medium of claim 11, wherein the power spectrum of the subset of the plurality of observation vectors is estimated using $$\sigma^2 \left| \frac{1}{1 + a_1 e^{-j\omega} + a_2 e^{-2j\omega} + \ldots + a_n e^{-Nj\omega}} \right|^2,$$

where $\sigma^2$ is a spectrum of the white noise sequence, and $e^{-j\omega}$ defines a unit circle.

13. The non-transitory computer-readable medium of claim 10, wherein a transfer function of the AR causal system is defined as $$H(z) = \frac{1}{1 + a_1 z^{-1} + a_2 z^{-2} + \ldots + a_n z^{-N}},$$

where $a_i$ is an $i^{th}$ coefficient of the AR causal system, and N is a predefined AR model order.

14. The non-transitory computer-readable medium of claim 13, wherein the coefficients of the AR causal system are solved using a Yule-Walker method.

15. The non-transitory computer-readable medium of claim 1, wherein the magnitude adjustment vector is computed using B=max(A)−A, where B is the magnitude adjustment vector, and A is a column vector that contains a second mean computed for each respective row, wherein the column vector is the mean computed for the matrix of magnitude values.

16. The non-transitory computer-readable medium of claim 15, wherein the second matrix of magnitude values is updated using $M_a$(:, i)=M(:, i)+B, i=1, 2, . . . , numCols, where $M_a$ is the second matrix of magnitude values, M is the matrix of magnitude values, and numCols is a number of columns of M.

17. The non-transitory computer-readable medium of claim 1, wherein the subset of the plurality of observation vectors is selected from a stream of event block objects received by the computing device.

18. The non-transitory computer-readable medium of claim 1, wherein the next column of the matrix of magnitude values is selected as a next unused column of the matrix of magnitude values.

19. The non-transitory computer-readable medium of claim 18, wherein, when the matrix of magnitude values has no unused columns, the next column of the matrix of magnitude values is selected by discarding an oldest column and shifting one column to a left before a new column is appended to a last column of the matrix of magnitude values.

20. A computing device comprising:
a processor; and
a non-transitory computer-readable medium operably coupled to the processor, the computer-readable medium having computer-readable instructions stored thereon that, when executed by the processor, cause the computing device to
(A) define a first window that includes a subset of a plurality of observation vectors, wherein each observation vector of the plurality of observation vectors includes a sensor value measured by a sensor, wherein the plurality of observation vectors includes the sensor value measured as a function of time;
(B) model the subset of the plurality of observation vectors as an output of an autoregressive (AR) causal system to estimate a power spectrum for the subset of the plurality of observation vectors;
(C) compute a magnitude adjustment vector from a mean computed for a matrix of magnitude values, wherein the matrix of magnitude values includes a column for each window of a plurality of windows, wherein the first window is stored in a next column of the matrix of magnitude values, wherein each cell of the matrix of magnitude values includes an estimated power spectrum value for a respective window and a respective frequency;
(D) update a second matrix of magnitude values using the computed magnitude adjustment vector, wherein each cell of the second matrix of magnitude values includes an adjusted power spectrum value for the respective window and the respective frequency;
(E) detect a peak in the next column of the second matrix of magnitude values;
(F) determine whether the detected peak is within a predefined frequency range; and
(G) when the detected peak is within the predefined frequency range, output an event indicator to indicate an event has occurred.

21. A method of event detection, the method comprising:
(A) defining, by a computing device, a first window that includes a subset of a plurality of observation vectors, wherein each observation vector of the plurality of observation vectors includes a sensor value measured by a sensor, wherein the plurality of observation vectors includes the sensor value measured as a function of time;
(B) modeling, by the computing device, the subset of the plurality of observation vectors as an output of an autoregressive (AR) causal system to estimate a power spectrum for the subset of the plurality of observation vectors;
(C) computing, by the computing device, a magnitude adjustment vector from a mean computed for a matrix of magnitude values, wherein the matrix of magnitude values includes a column for each window of a plurality of windows, wherein the first window is stored in a next column of the matrix of magnitude values, wherein each cell of the matrix of magnitude values includes an estimated power spectrum value for a respective window and a respective frequency;
(D) updating, by the computing device, a second matrix of magnitude values using the computed magnitude adjustment vector, wherein each cell of the second matrix of magnitude values includes an adjusted power spectrum value for the respective window and the respective frequency;
(E) detecting, by the computing device, a peak in the next column of the second matrix of magnitude values;
(F) determining, by the computing device, whether the detected peak is within a predefined frequency range; and
(G) when the detected peak is within the predefined frequency range, outputting, by the computing device, an event indicator to indicate an event has occurred.

22. The method of claim 21, further comprising repeating (A) through (G) with successive windows defined from the plurality of observation vectors until processing is stopped.

23. The method of claim 22, further comprising, after (F) and before (G):
when the detected peak is within the predefined frequency range,
detect a fundamental frequency of a highest magnitude peak detected within the predefined frequency range; and
increment a counter of a number of peaks detected within the predefined frequency range and in consecutive of the successive windows;
wherein the event indicator is output to indicate an event has occurred when the detected peak is within the predefined frequency range and when the incremented counter exceeds a predetermined threshold value.

24. The method of claim 22, further comprising, after (F) and before (G):
when the detected peak is within the predefined frequency range,
detect a fundamental frequency of a highest magnitude peak detected within the predefined frequency range; and
determine a number of harmonic peaks detected at an integer multiple of the detected fundamental frequency;
wherein the event indicator is output to indicate an event has occurred when the detected peak is within the predefined frequency range and when the determined number of harmonic peaks exceeds a predetermined threshold value.

25. The method of claim 22, further comprising, after (F) and before (G):
when the detected peak is within the predefined frequency range,
detect a fundamental frequency of a highest magnitude peak detected within the predefined frequency range;
determine a number of harmonic peaks detected at an integer multiple of the detected fundamental frequency; and
increment a counter of a number of peaks detected within the predefined frequency range and in consecutive of the successive windows when the determined number of harmonic peaks exceeds a first predetermined threshold value;
wherein the event indicator is output to indicate an event has occurred when the detected peak is within the predefined frequency range and when the incremented counter exceeds a second predetermined threshold value.

26. The method of claim 21, wherein the subset of the plurality of observation vectors are modeled as an output of the AR causal system modeled driven by a white noise sequence.

27. The method of claim 26, wherein a relationship between the white noise sequence and an output signal defined by the subset of the plurality of observation vectors is defined as $$x(n) + \sum_{i=1}^{N} a_i x(n-i) = e(n),$$

where x(n) is the subset of the plurality of observation vectors, n is a number of observation vectors included in the defined first window, $a_i$ is an $i^{th}$ coefficient of the AR causal system, e(n) is the white noise sequence, and N is a predefined AR model order.

28. The method of claim 27, wherein the power spectrum of the subset of the plurality of observation vectors is estimated using $$\sigma^2 \left| \frac{1}{1 + a_1 e^{-j\omega} + a_2 e^{-2j\omega} + \ldots + a_n e^{-Nj\omega}} \right|^2,$$

where $\sigma^2$ is a spectrum of the white noise sequence, and $e^{-j\omega}$ defines a unit circle.

29. The method of claim 26, wherein a transfer function of the AR causal system is defined as $$H(z) = \frac{1}{1 + a_1 z^{-1} + a_2 z^{-2} + \ldots + a_n z^{-N}},$$

where $a_i$ is an $i^{th}$ coefficient of the AR causal system, and N is a predefined AR model order.

30. The method of claim 21, wherein the magnitude adjustment vector is computed using B=max(A)−A, where B is the magnitude adjustment vector, and A is a column vector that contains a second mean computed for each respective row, wherein the column vector is the mean computed for the matrix of magnitude values, and wherein the second matrix of magnitude values is updated using $M_a(:, i)$=M(:, i)+B, i=1, 2, . . . , numCols, where $M_a$ is the second matrix of magnitude values, M is the matrix of magnitude values, and numCols is a number of columns of M.

* * * * *

UNITED STATES PATENT AND TRADEMARK OFFICE
CERTIFICATE OF CORRECTION

PATENT NO. : 11,036,981 B1
APPLICATION NO. : 17/167633
DATED : June 22, 2021
INVENTOR(S) : Yuwei Liao et al.

It is certified that error appears in the above-identified patent and that said Letters Patent is hereby corrected as shown below:

In the Specification

Column 12, Line 41:
Delete the phrase "0.1512000 = 1800." and replace with --0.15*12000 = 1800.--.

In the Claims

Claim 12, Column 35, Line 33:
Delete the phrase "$\sigma^2 \left| \frac{1}{1+a_1e^{-j\omega}+a_2e^{-2j\omega}+\cdots+a_ne^{-Nj\omega}} \right|^2$" and replace with
--$\sigma^2 \left| \frac{1}{1+a_1e^{-j\omega}+a_2e^{-2j\omega}+\cdots+a_Ne^{-Nj\omega}} \right|^2$--.

Claim 13, Column 35, Line 43:
Delete the phrase "$H(z) = \frac{1}{1+a_1z^{-1}+a_2z^{-2}+\cdots+a_nz^{-N}}$" and replace with
--$H(z) = \frac{1}{1+a_1z^{-1}+a_2z^{-2}+\cdots+a_Nz^{-N}}$--.

Claim 28, Column 38, Line 35:
Delete the phrase "$\sigma^2 \left| \frac{1}{1+a_1e^{-j\omega}+a_2e^{-2j\omega}+\cdots+a_ne^{-Nj\omega}} \right|^2$" and replace with
--$\sigma^2 \left| \frac{1}{1+a_1e^{-j\omega}+a_2e^{-2j\omega}+\cdots+a_Ne^{-Nj\omega}} \right|^2$--.

Claim 29, Column 38, Line 44:
Delete the phrase "$H(z) = \frac{1}{1+a_1z^{-1}+a_2z^{-2}+\cdots+a_nz^{-N}}$" and replace with
--$H(z) = \frac{1}{1+a_1z^{-1}+a_2z^{-2}+\cdots+a_Nz^{-N}}$--.

Signed and Sealed this
Twenty-sixth Day of October, 2021

Drew Hirshfeld
*Performing the Functions and Duties of the
Under Secretary of Commerce for Intellectual Property and
Director of the United States Patent and Trademark Office*